United States Patent [19]

Valentine et al.

[11] Patent Number: 5,132,543

[45] Date of Patent: Jul. 21, 1992

[54] ELECTRONIC POCKET DOSIMETER

[75] Inventors: Kenneth H. Valentine, Del Mar; John M. Wettroth, San Diego, both of Calif.

[73] Assignee: Science Applications International Corporation, San Diego, Calif.

[21] Appl. No.: 640,216

[22] Filed: Jan. 11, 1991

[51] Int. Cl.[5] .......................... H01J 47/08; G01T 1/18
[52] U.S. Cl. .................................... 250/388; 250/374
[58] Field of Search .................. 250/388, 270.07, 374; 340/765; D18/26, 25

[56] References Cited

U.S. PATENT DOCUMENTS

| | | | |
|---|---|---|---|
| 3,925,977 | 12/1975 | Maezawa | 368/29 |
| 4,605,959 | 8/1986 | Dilanni et al. | 250/374 |
| 4,608,655 | 8/1986 | Wolf et al. | 364/569 |
| 4,631,411 | 12/1986 | Noback | 250/374 |
| 4,818,884 | 4/1989 | Saubolle | 250/388 |
| 4,857,739 | 8/1989 | Phelps | 250/388 |
| 4,996,429 | 2/1991 | Günter | 250/336.1 |

FOREIGN PATENT DOCUMENTS

| | | | |
|---|---|---|---|
| 54-107791 | 8/1979 | Japan | 250/388 |
| 2-19788 | 1/1990 | Japan | 250/370.07 |
| 645732 | 10/1984 | Switzerland | 250/388 |

OTHER PUBLICATIONS

"Computer Interfacing Automatic-Dosimetry Systems (CID)" Dosimeter Corp. (Cincinnati, OH 1983).
"Dosimeter corporation's Computer Interfacing Automatic Dosimeter (CID) System", Radition Protection Management, vol. 2, No. 4, pp. 67-73, (Jul. 1985).
"Personal Digital Dosimeter, Model 885"; Victoreen, Inc. (Cleveland, OH, 1989).
"Mini-Chirper", Xetex Inc. (Sunnyvale, CA) (1987).
"IMP Dosimeter, Model 444A", Xetex, Inc. (Sunnyvale, CA) (1988).
"Testing of the Alnot RAD-80R Against Specifications in Draft ANSI Standard N42.17A", Battelle, Pacific Northwest Laboratories (Richland, WA) (1987).
"Alarm Pocket Dosimeter (APD)", Panasonic, Matsushita Electric Trading, Co., Ltd. (Osake, Japan 1986).
"Digital Survey & Dosimeter PSD-6021A"; Nagase & Co., Ltd. (Tokyo, Japan).
Anon., "Research News: Computerized Wristwatch Dosimeter." HPS Newsletter (Jun. 1985) p. 6.
Anon., "Inductive coil used to charge batteries and read out data from $170 dosimeter." Electronics (Jan. 20, 1977) pp. 8E, 10E.
Kenneth F. Sinclair and Warren J. Heiman, "Subminiature Digital Ratemeter and Dosimeter Using MOS Technology." Health Physics, vol. 27, No. 1 (Jul. 1974) pp. 97-102.
"Electronic Personal Dosimeter", Plessey Controls, Ltd. (Dorset, UK, Oct. 1988).
"Stephen Digital Dosimetry System", Bicron Corporation (Newbury, OH, 1989).
"Rad-80 Pocket Dosimeter", Alnot Nuclear Corporation (Pittsburgh, PA).

Primary Examiner—Constantine Hannaher
Attorney, Agent, or Firm—Fitch, Even, Tabin & Flannery

[57] ABSTRACT

Small, light-weight portable radiation measurement apparatus provides accurate quantitative measurment of radiation dosage and dosage rates. Such apparatus, referred to as a dosimeter, is housed in a ruggedized housing that is only about ½ the volume of a package of cigarettes, may easily be clipped to clothing or carried in a shirt pocket, and is powered by a conventional alkaline AA-sized battery. Included in the housing are a geiger tube for detecting radiation, a high voltage power supply for providing power to the geiger tube, a counting circuit for counting geiger pulses generated by the geiger tube, a microprocessor circuit for processing the geiger pulses in accordance with a prescribed program to determine the does or dosage rate to which the geiger tube has been exposed, and a digital display that displays the dosage rates thus determined. The microprocessor program is stored in memory circuits, included as part of the microprocessor circuit. An audible alarm is generated whenever the dose or dosage rate exceeds a programmable threshold. The circuitry and display allow a wide range of radiation levels to be detected and displayed. All the circuits are designed for low power consumption, allowing 500-600 hours of continuous use before having to replace the battery. A dielectrically coupled communications port allows necessary data, e.g., calibration coefficients or dosage data, to be transferred to and from the dosimeter circuitry without direct physical contact.

18 Claims, 5 Drawing Sheets

ELECTRONIC POCKET DOSIMETER

BACKGROUND OF THE INVENTION

The present invention relates to radiation measurement apparatus, and more particularly to small, light-weight portable radiation measurement apparatus. Even more particularly, the present invention relates to a reliable, inexpensive, pocket sized, battery-powered dosimeter that provides an accurate, quantitative, digitally-displayed measure of radiation levels to which the device is exposed, and that can be easily and unobtrusively carried by an individual, e.g., in a shirt pocket.

In many occupations and/or environments, there is a need to monitor radiation levels to which personnel or equipment is exposed. In such instances, it is most useful to know actual (quantitative) radiation dosage. For example, variations and trends in radiation dosage may need to be quickly identified so that appropriate action can be taken, e.g., by removing personnel from areas where radiation is approaching (but not yet at) levels that could be hazardous to one's health; or by taking appropriate corrective action (such as shutting down or adjusting radiation-producing equipment) so that radiation levels are well below safe limits.

Unfortunately, radiation measurement devices of the prior art that provide accurate radiation dosage readings are typically large, expensive, bulky devices that consume more power than is generally available in small, portable, battery-powered devices. Hence, in order to monitor radiation dosages experienced by an ambulatory object, such as a person employed in an area where radioactive devices and/or material are used, it has been necessary to employ passive threshold-detection dosage indicators, i.e., non-power-consuming devices that have an indicator, usually a film, that changes color when exposed to radiation levels above a fixed threshold. Such passive indicators are advantageously light weight and can be easily carried by an individual, e.g., in a pocket or clipped to clothing, but they do not provide a quantitative measure of the radiation dosage. Further, passive indicators must be visually monitored to determine if the fixed radiation threshold has been exceeded. What is needed, therefore, is a light weight dosage indicator that can be carried as easily as the passive dosage indicators of the prior art, but that also provides an accurate quantitative measure of radiation dosage, as well as an audible alarm whenever a preset threshold of radiation dosage has been exceeded.

In order to provide an accurate quantitative measure of radiation dosage, it is known in the art to use a microprocessor within the radiation measurement device. In order to simplify the design of such microprocessor-based radiation apparatus, it is known to use the microprocessor itself to count the pulses from the radiation detector. The problem with this approach is that a microprocessor can accurately count pulses at only a small fraction of its clock frequency. Thus, the microprocessor can either be operated at a low frequency (and hence low power) and accept poor counting performance, or the microprocessor can be operated at a high clock frequency, to provide better counting performance, at the cost of much higher current drain on the battery. Neither choice is acceptable for portable battery-powered radiation apparatus. Hence, it is evident that what is needed is a microprocessor-based radiation measurement device that can operate at low power, yet still be able to accept high count rates.

Further, when microprocessor-based radiation measurement apparatus is employed, some means must be used to load data into such apparatus and read data out of such apparatus. Typically, this is accomplished using a serial communications port implemented with multi-pin connectors (which eventually wear out and fail), or with Light Emitting Diodes (LED's) and Photodetectors (which require an unobstructed optical path and relatively large amounts of power to function). Thus, where a light-weight, low-power microprocessor-based radiation measurement apparatus is employed, some means must be used to reliably enter data into and extract data from the microprocessor at low power levels.

SUMMARY OF THE INVENTION

The present invention provides a pocket dosimeter that advantageously addresses the needs identified above, as well as other needs. A "dosimeter" is a device that measures radiation dosage levels, including radiation dosage rates. The pocket dosimeter herein described is light weight and small, about ½ the volume of a package of cigarettes, and may easily be carried in a shirt pocket or clipped to one's clothing. It includes a digital readout of the measured radiation dosage, and is able to measure radiation dosage rates over a wide range. It is specifically designed for low-power consumption, thereby allowing it to be powered using a conventional battery.

In accordance with one aspect of the invention, the active pocket dosimeter includes all the essential components for a full-function radiation measurement apparatus. These components include a geiger tube for detecting radiation, a high voltage power supply for providing power to the geiger tube, means for counting geiger pulses generated by the geiger tube, means for processing the geiger pulses to determine the dosage or dosage rate to which the geiger tube has been exposed, and means for displaying the dosage or dosage rates thus determined. Further, an audible alarm is generated whenever the dosage or dosage rate exceeds a programmable threshold. The pocket dosimeter also includes a convenient, reliable and non-physical-contact means for programming or loading input data into the microprocessor, and for reading output data from the microprocessor.

In accordance with another aspect of the invention, there is included within the small, light-weight pocket dosimeter of the invention a regulated micropower high voltage power supply (HVPS). Such a HVPS is needed in order to generate the relatively high voltages, e.g., 550 volts, required for operation of the geiger tube used in the device. Advantageously, such HVPS is fully regulated and generates the high voltages only on demand, i.e., it only consumes power when a feedback circuit senses that its output voltage has dropped below a prescribed setpoint. Further, the HVPS requires very few parts. These parts include a ferrite pot core transformer that steps up an input voltage of around 10 VAC to about 125 VAC. A diode quadrupler then raises the voltage to the desired output value of 550 V. The transformer primary is driven by a pair of exclusive "OR" gates in a configuration which doubles the input excitation so the effective peak-to-peak primary drive is 10 V even though the supply voltage is only 5 VDC. Feedback control is accomplished with a micropower comparator which compares a fraction of the output voltage (obtained with a resistive voltage divider) to a specified reference voltage, and then controls the phase of the primary excitations (0° or 180°) to provide a regulated high voltage output.

In accordance with still another aspect of the invention, the pocket dosimeter advantageously utilizes a digital counter to count geiger tube pulses, rather than utilizing the microprocessor itself to do such counting. This allows the microprocessor to be clocked at a relatively low frequency (and hence consume less power), yet it still allows high count rates to be detected. In the preferred embodiment, for example, the pocket dosimeter of the present invention includes a microprocessor that is clocked at a low frequency (e.g., a clock frequency of 32,768 Hz, which is equal to an instruction frequency of 8192 Hz.) in order to conserve power. The microprocessor is coupled to a digital counter. The digital counter is configured to perform geiger pulse counting only when it is clocked by a Geiger pulse (i.e., only when it is actively counting), thereby consuming power only when necessary. Advantageously, the digital counter has the capability to count at frequencies up to the MHz range, thereby allowing the pocket dosimeter to detect a wide range of radiation levels.

In accordance with yet another aspect of the invention, the pocket dosimeter further includes a dielectrically coupled communications port. This communications port advantageously allows data to be loaded into the pocket dosimeter's microprocessor and/or memory circuits. Such input data may include, e.g., calibration coefficients. The communications port also allows output data to be extracted from the pocket dosimeter. Such output data may include, e.g., accumulated radiation dosage data and/or maximum dosage rate data. The communications link for extracting data from the pocket dosimeter is established by applying a modulated carrier signal to a set of conductive electrodes on the inside of the pocket dosimeter. The communications link is made by simply bringing the pocket dosimeter in close proximity to a set of matching electrodes in a readout device. To enter data into the pocket dosimeter, the process is reversed. That is, a modulated carrier signal is applied a set of electrodes in a suitable data generating device. These electrodes are then placed in close proximity to the set of conductive electrodes within the dosimeter. Advantageously, the communications link thus provided is a high impedance link and operates continuously on a few $\mu A$ of current. It is noted that this is not an RF (radio frequency) link. Rather, the data information is transferred via electric field fluctuations (i.e., via capacitive coupling between the sets of electrodes).

Yet another aspect of the invention provides an innovative custom display on the pocket dosimeter that allows flexibility in the information that is displayed, and yet keeps the parts count and power consumption to a minimum. In a preferred embodiment, the display is realized utilizing a 3-digit liquid crystal display (LCD). The desired LCD format for this display is a 3-digit floating point number with 1000X multipliers obtained through use of dosage units of $\mu R$, mR or R (corresponding to radiation dosages of microRads, milliRads, or Rads, respectively), and dosage rate units of $\mu R/h$, mR/h or R/h (corresponding to dosage rates of microRads/hour, milliRads/hour, and Rads/hour, respectively). As used herein, the abbreviation "R" is used as a shorthand notation for roentgens or rads, as the dosage under either unit may be considered equivalent for purposes of the present invention. To achieve this type of display requires that the "$\mu$" and "m" prefixes occupy the same physical position on the LCD. While this condition may be routinely achieved with dot matrix displays, the required display drivers become relatively large (with many pins), complex and expensive. Further, such dot matrix displays typically use high multiplexing ratios which provide poor performance at low temperatures. In the pocket dosimeter herein described, this problem is advantageously solved by using just three icons: (1) a first icon that consists of the top and middle leg of the "m"; (2) a second icon that consists of the left and right legs of the "m"; and (3) a third icon that consists of the bottom of the "$\mu$". Thus, an "m" is displayed by turning on the first and second icons, and the "$\mu$" is displayed by turning on the second and third icons. This approach advantageously permits the use a small, 20-pin display driver with a multiplexing ratio of only three (triplex), and provides satisfactory performance down to −20° C.

The pocket dosimeter of the present invention may thus be characterized as including: (1) detecting means for detecting radiation; (2) processing means coupled to the detecting means for determining radiation dosage and dosage rates; (3) display means coupled to the processing means for displaying radiation dosage and dosage rates determined by the processing means; and (4) power means for supplying operating power to the detecting means, processing means, and display means. Advantageously, the power means, detecting means, processing means, and display means are all housed within a housing that is no larger than approximately 70 cm$^3$ (60 cm$^3$ in the preferred embodiment). Further, the housing, including the power means, detecting means, processing means, and display means weigh no more than approximately 100 grams (90 grams in the preferred embodiment). To the four basic elements set forth above, the preferred embodiment of the invention further includes audible alarm means for sounding an audible alarm in the event the radiation dosage or dosage rate exceeds a prescribed threshold, and a dielectric communications port to allow data to be downloaded to or uploaded from the processing means.

It is thus a feature of the present invention to provide a portable, light-weight pocket dosimeter that provides an accurate quantitative measure of the radiation dosage to which the device has been exposed, or to the dosage rate to which the device is currently being exposed.

It is another feature of the invention to provide such a pocket dosimeter that may be set to automatically generate an audible alarm whenever the detected radiation dosage or dosage rate exceeds a preselected threshold.

It is still a further feature of the invention to provide such an active pocket dosimeter that is small enough to be easily carried by an individual, e.g., in a shirt pocket, and sufficiently light weight and small to enable it to be carried without being readily noticeable to such individual or others who come in contact with such individual. In accordance with this feature, the pocket dosimeter herein described provides a reduced package volume by a factor of 2 to 10, and a reduced weight by a factor of 2 to 5, over competitive, prior art products intended for the same application.

It is yet an additional feature of the invention to provide a pocket dosimeter that includes the above features and is also designed to minimize power consumption, thereby providing maximum battery life, and to minimize the number of components used therein, thereby providing a minimum size and cost, yet maximum reliability.

Another feature of the invention provides a small, light-weight pocket dosimeter that is powered using conventional batteries, and that provides an increased battery life, and therefore a longer operating time, between battery replacement.

A further feature of the invention provides a small, battery-powered, light-weight pocket dosimeter that is relatively simple in design, low in cost, and reliable in its operation.

BRIEF DESCRIPTION OF THE DRAWINGS AND APPENDIX

The above and other aspects, features and advantages of the present invention will be more apparent from the following more particular description thereof, presented in conjunction with the following drawings and Appendix wherein.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

The dosimeter of the present invention represents what is believed to be a break through in size and performance for electronic dosimeters and ratemeters. This is because the present invention provides a full-featured electronic dosimeter and ratemeter packaged in a very small, light-weight, ruggedized housing.

Figure 1A:
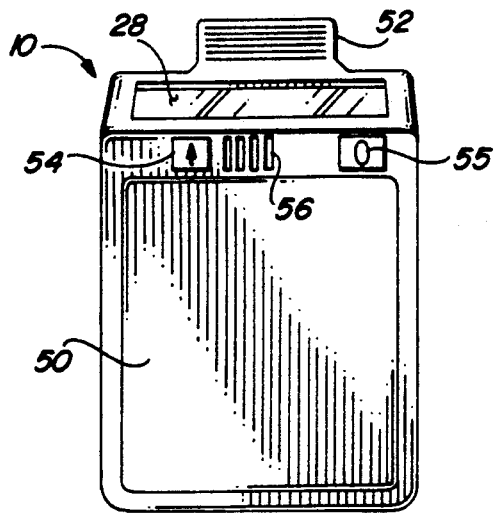
FIGS. 1A and 1B are front and top perspective views, respectively, of a pocket dosimeter made in accordance with a preferred embodiment of the present invention.
Figure 1B:
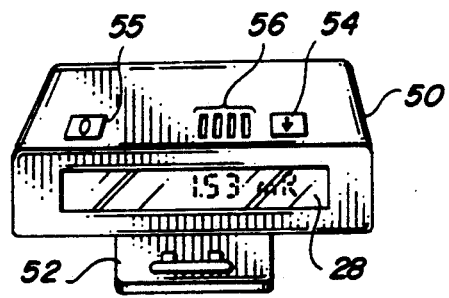

FIGS. 1A and 1B show front and top perspective views, respectively, of a pocket dosimeter 10 made in accordance with the present invention. Advantageously, the dosimeter 10 is housed within a ruggedized housing 50. In a preferred embodiment, the housing 50 has approximate dimensions of 48 mm wide by 72 mm long by 17 mm deep. The volume of such housing is thus only approximately 60 cm$^3$. Further, with all components installed, including a single AA battery, the dosimeter 10 weighs less than 90 grams.

For the embodiment shown in FIGS. 1A and 1B, a clip 52 is provided on the back of the housing 50 to allow the dosimeter 10 to be detachably secured to a desired location, e.g., to one's clothing. Because of the small, light-weight nature of the dosimeter 10, it can thus advantageously be secured to an individual in an unobtrusive manner, e.g., much as an employee badge might be secured to an individual.

The dosimeter 10 provides numerous advantages. Basically, however, with reference still being made to FIGS. 1A and 1B, it is noted that in addition to the clip 52, the dosimeter 10 includes an easy-to-access mode control button 54 that allows the user to select a dosimeter mode or a ratemeter mode. Further, an easy-to-read digital display 28 provides a quantitative measure of the radiation dosage or dosage rate to which the unit has been or is being exposed. A backlight button 55 may be depressed to improve, the visibility of the display 28. A suitable radiation sensor is also included within the unit. This radiation sensor receives radiation that passes through the housing 50. Also included in the design of the housing 50 are suitable slot openings 56, preferably hidden between ribs or contour lines molded into the housing 50, that allow an audible alarm, generated by an alarm circuit housed within the housing 50, to be readily heard.

While there are several different types of radiation sensors or detectors that may be used within the dosimeter 10 to sense radiation, the preferred sensor is a Geiger Mueller Tube (GMT). A GMT typically comprises a glass tube enclosing a metal cylinder, often made of copper. A thin metal wire, e.g. of tungsten, passes along the axis of the metal tube. The cylinder and wire are connected through an end wall of the glass tube to a source of electrical voltage. The tube is filled with a gas, usually a mixture of argon and a halogen, at a low pressure, e.g., a few centimeters of mercury. A high voltage, e.g. 500-600 volts, is set up between the cylinder (which functions as the negative electrode or cathode) and the wire (which functions as the positive electrode or anode). This voltage is just a little less than that needed to create an electrical discharge between the two electrodes.

When a photon of sufficient energy interacts with the cathode wall, it creates one or more high energy electrons which, in turn, knock electrons out of the atoms of the gas. These electrons, being negatively charged, are attracted towards the wire anode, and the atoms from which the electrons originated (which become positively charged ions) are attracted towards the cathode. The high voltage established between the anode and cathode creates a high voltage gradient that accelerates the liberated electrons sufficiently to knock further electrons out of atoms, which in turn are accelerated by the high voltage gradient to knock still further electrons out of other atoms, creating an "avalanche" of electrons. As the avalanche of electrons continues, the positive ions are also accelerated towards the cathode wall. Such charged particle motion inside the tube induces a signal charge, detected as a pulse of electric current. The occurrence of this pulse thus indicates that a charged particle (photon) has passed through the tube. The electrical pulses can then be amplified and counted, using appropriate electronic counting circuitry, to provide a user of the GMT a quantitative and/or qualitative measure of the number of photons encountered by the GMT.

A more complete description of the GMT, and some of the problems encountered in utilizing a single GMT to detect a wide range of radiation, may be found in co-pending U.S. patent application Ser. No. 07/553,208, filed Jul. 13, 1990, which application is assigned to the same assignee as is the present application, and which application is incorporated herein by reference.

Figure 2:
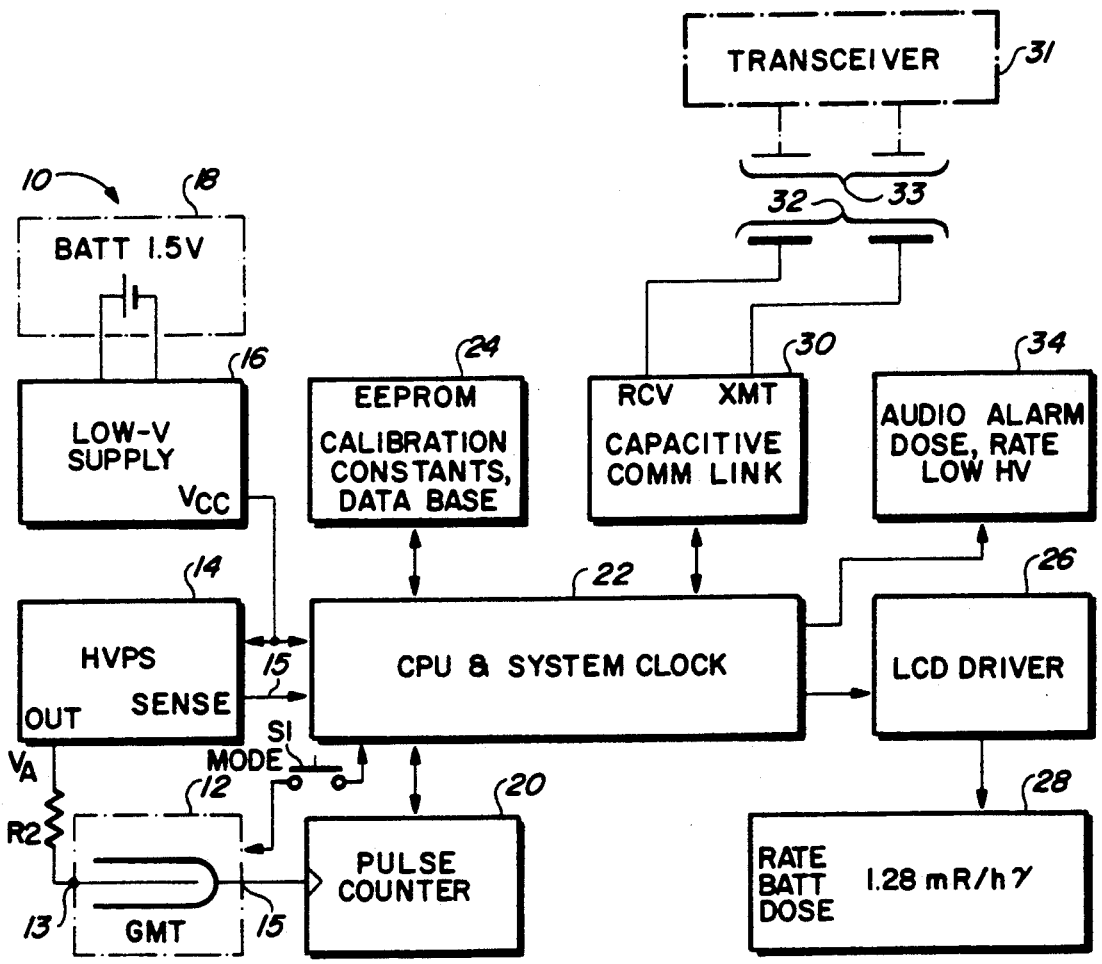
FIG. 2 is a block diagram of the pocket dosimeter.

Referring next to FIG. 2, a block diagram of the pocket dosimeter 10 of the present invention is shown. As seen in FIG. 2, the dosimeter 10 includes a GMT circuit 12 that detects radioactive charged particles as described above. To perform this function, a high voltage, e.g., 550 volts, is generated by a high voltage power supply (HVPS) 14. This high voltage is applied to an anode 13 of the GMT circuit 12 through a resistor R2. The HVPS 14 generates its high output voltage, labeled $V_A$ in FIG. 2, from a supply voltage $V_{cc}$. The supply voltage $V_{cc}$, in turn, is generated by a low voltage power supply 16. The low voltage power supply 16 generates the supply voltage $V_{cc}$ from energy stored in a battery 18. In the preferred embodiment, the battery 18 is realized with a conventional 1.5 V alkaline AA-sized battery. One of the remarkable features of the dosimeter 10 is that the 550 volt anode voltage required for operation of the GMT circuit 12 may be derived from the small 1.5 volt battery. The unique design of the HVPS 14, as described below, makes this voltage conversion possible. A conventional AA alkaline battery provides 500–600 hours of continuous operation of the dosimeter. Significantly longer battery life may be obtained by using a lithium battery (in excess of 1000 hours).

The output pulses from the GMT circuit 12 are counted in a pulse counter 20. The count maintained in the pulse counter 20 is monitored by a central processing unit (CPU) system 22. Advantageously, although the CPU system 22 could be configured to perform the counting function, as is known in the prior art, a separate counter 20 is used to allow the CPU system to operate at a relatively low clock speed (and hence consume less power), while still allowing fast count rates to be detected.

Included as part of the CPU system 22 in FIG. 2 is a clock circuit. The clock circuit generates a clock signal that is used to operate the CPU 22 (as well as for use within other circuits of the dosimeter). From this clock signal, for example, a basic alternating signal is derived that is used within the high voltage power supply 14 to provide transformer coupling. Also included in the CPU system 22 is a suitable read only memory (ROM), or equivalent (e.g., programmable ROM, or PROM), for storing a processing program that controls the manner in which the CPU system 22 processes the count data obtained from the counter 20. This processing program determines, for example, whether the CPU 22 operates the dosimeter unit 10 in a dosage mode or a dosage rate mode, as controlled by a manual button, or switch, S1. The switch S1 (button 54 in FIGS. 1A and 1B) is electrically connected to the CPU 22, and thus provides a convenient means for changing the mode of the unit 10.

In addition to the ROM or PROM memory internal to the CPU system 22, additional memory 24 is preferably utilized to store various calibration constants and other control parameters and/or data associated with operation of the dosimeter 10. In order to conserve power, it is preferred that this additional memory 24 be a non-volatile memory. However, it is also preferred that the data stored in the memory 24 be changeable from time to time to allow the dosimeter 10 to be calibrated or as other conditions change. Hence, the preferred type of memory for the memory 22 is an EEPROM (electrically erasable programmable read only memory).

To facilitate making changes to the calibration and other data stored in the memory 24, the dosimeter 10 further includes a suitable communications port 30 that allows data to be selectively and non-invasively written to, or read from, the CPU system 22. Because the CPU system 22 is in electrical contact with all of the other circuits used within the dosimeter 10, the communications port 30 thus effectively allows communicative contact, from a location external to the dosimeter, with all of the data generating or data storing circuits therein. Advantageously, the data is transferred through the communications port 30 through dielectric coupling. Hence, no physical contact need be made between an external reading or writing device, shown as a transceiver 31 in FIG. 2, and the dosimeter 10. Rather, all that is required is to align a set of electrodes 33 associated with the transceiver device 31 with a set of electrodes 32 associated with the communications port circuitry 30. A modulated carrier signal is then applied to one of these sets of electrodes (whichever set belongs to the transmitter). A modulated carrier signal is then coupled to the other set of the electrodes (whichever set belongs to the receiver), just as a charge applied to one plate of a capacitor is coupled to the other plate of the capacitor. The coupled modulated charge thus provides a receive signal that is appropriately amplified and demodulated in order to detect the data that has been transferred.

Advantageously, the dielectrically coupled communications link provided between the communications port 30 and an appropriate external transceiver device 31 represents a very high impedance. Such a high impedance communications link may operate continuously on only a few microamperes of current, thereby allowing the dosimeter 10 to consume minimal power even when data is being transferred. It should be noted that this type of communications link is not an RF (radio frequency) link. Rather, the information is coupled from one set of electrodes to the other via electric field fluctuations.

Still referring to the block diagram of FIG. 2, it is seen that the CPU system 22 is further connected to an audio alarm 34. Such an audio alarm generates an audible signal, e.g., a beeping tone, whenever the CPU system 22 determines that certain alarm conditions exist. These alarm conditions include either a dosage or dosage rate in excess of preselected limits, or a low "high voltage" associated with the high voltage power supply (HVPS) 14. In the preferred embodiment, the audio alarm 34 provides a sound level of 85 dBA at a distance of 30 cm. Thus, the alarm can be readily heard by the user of the dosimeter. As seen in FIG. 2, in order to sense when the output voltage of the HVPS 14 is low, a "sense" line is provided between the HVPS 14 and the CPU system 22. This sense line 15 includes a logic signal thereon that varies continuously when the HVPS output level is correct. Inactivity of this logic signal indicates that the HVPS is not regulating properly The audio alarm may further be used to provide an optional "chirp" readout, that is, an audible indication that radioactive elements have been sensed. In a preferred embodiment, the chirp readout may be set to one beep per preset dosage increment, which preset dosage increment is selectable to be in the range of 6 $\mu$R to 100 mR. Such selection is made by coupling the appropriate control parameters to the CPU system 22 for storage in the memory 24 through use of an appropriate external transceiver unit 31.

As also seen in FIG. 2, the CPU system 22 is further coupled to a display driver 26. A suitable display 28, such as a liquid crystal display (LCD), is driven by the display driver. Thus, after the CPU system has processed the count from the counter 20 in accordance with a desired operating mode, the results of this processing are sent through the driver 26 for display on the display 28. Advantageously, this display is a digital display, allowing the detected dosage or dosage rate to be readily quantified.

The display driver 26 and display 28, in the preferred embodiment, also display certain alarm conditions, such as RATE or DOSE (for indicating a dosage rate in excess of a set limit, or a dosage in excess of a set limit, respectively). Further, the driver 26 and display 28 include the ability to display an appropriate multiplier symbol and units symbol with the particular reading that is displayed in order to convey a wide range of readings using a minimum number of display elements (and thereby further conserving power and space). Thus, for example, a reading of 1.23 milliRads per hour (corresponding to a dosage rate reading) is displayed as "1.23 mR/h"; whereas a reading of 1.23 microRads (corresponding to a dosage reading) is displayed as "1.23 $\mu$R". Similarly, a reading of 1.23 Rads (corresponding to a dosage reading) is displayed as "1.23 R". The "m" and the "$\mu$" thus represent the preferred multiplier symbol, and the "R/h" or "R" represent the preferred units symbol. The manner in which the multiplier symbol and units symbols are generated is explained more fully below in connection with FIG. 3.

Figure 3:
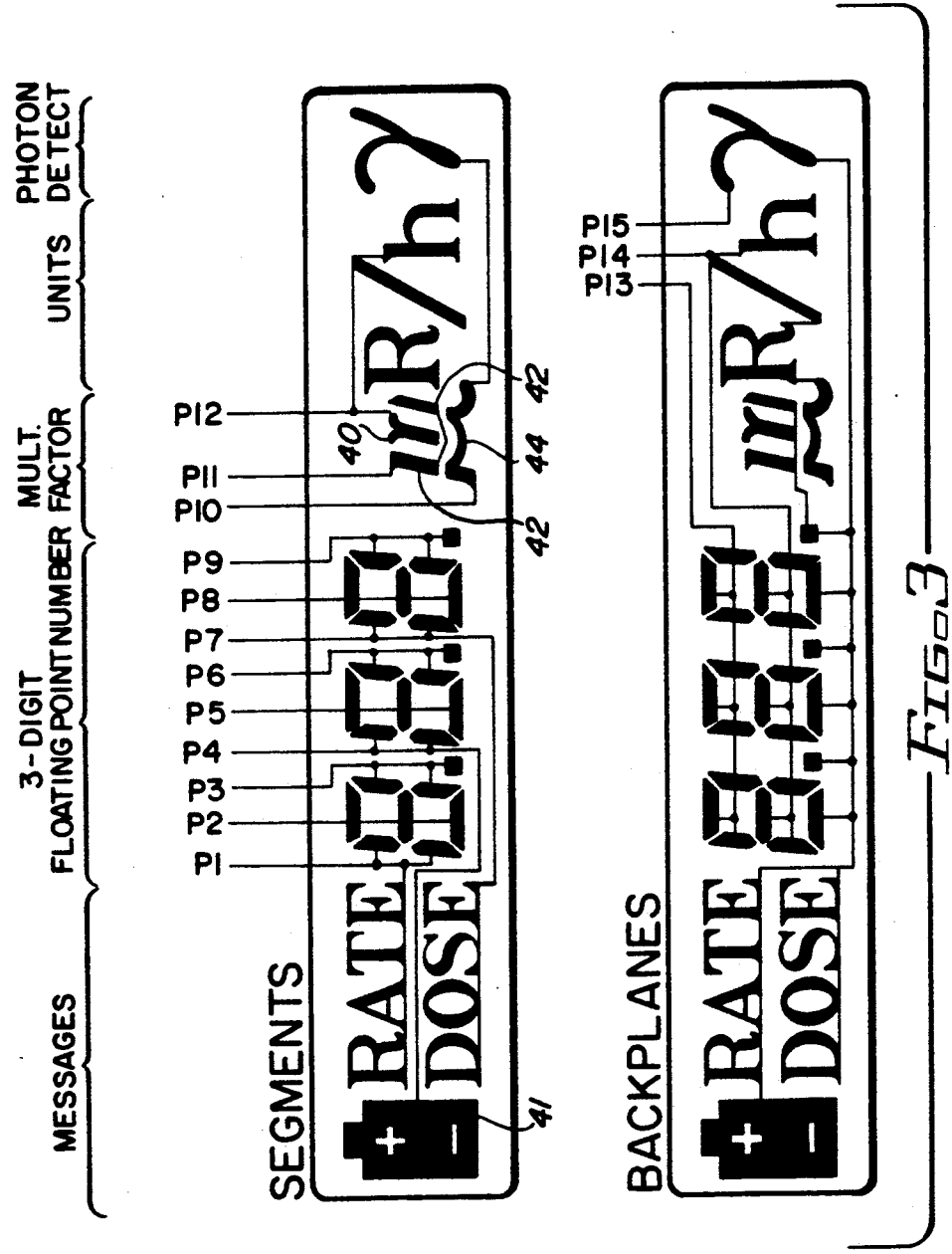
FIG. 3 illustrates the LCD display, both segments and backplanes, used with the present invention.

The LCD display 28 is preferably a custom LCD display configured to display at least the information shown in FIG. 3. FIG. 3 shows both the segments used in the display 28 (top portion) and the backplanes used with the display (bottom portion). To excite (light up) a particular area or segment of the display, an appropriate pin (P1-P12) of the segments and an appropriate pin (P13-P15) of the backplanes must be coupled to a suitable drive signal, as is known in the LCD display art. As seen in FIG. 3, the display is divided into five areas. A first area displays one of two messages: RATE or DOSE, and includes a battery icon 41. The message RATE flashes whenever the dosage rate alarm has been triggered. The message DOSE flashes whenever the dosage alarm has been triggered.

The battery icon 41 flashes whenever a low battery condition is detected. Further, if an automatic shutdown mode has been selected, which is a selectable option when the initial operating parameters are loaded into the EEPROM 24, the battery icon 41 stays on solid during the automatic shutdown period. The automatic shutdown period may be selected to be as short as a few seconds or as long as several days. Typically, the shutdown period will be selected to be in the range of 8-48 hours. During automatic shutdown, data is detected and stored in the memory of the pocket dosimeter. When a new battery is placed in the dosimeter, this stored data may be downloaded to an external transceiver device 31 (FIG. 2). At the conclusion of the shutdown period, the dosimeter is turned off completely.

A second area of the display 28 shows a 3-digit floating point number representative of the particular measurement that is displayed. Such numbers are displayed using a conventional seven segment display for each digit, plus a decimal point.

A third area of the display 28 shows a multiplication factor. This factor advantageously may assume a symbol representative of "$\mu$", "m" or blank, corresponding to a multiplication factor of $10^{-6}$, $10^{-3}$, or 1 respectively. An important feature of the invention permits the display of the $\mu$ or the m in the same space by selective control of three icons. A first icon 40 comprises the top and middle of the "m". A second icon 42 comprises the sides of the "m" or the "$\mu$". A third icon 44 comprises the bottom on the "$\mu$". The "$\mu$" is displayed by rendering visible the icons 42 and 44, i.e., the sides and bottom. The "m" is displayed by rendering visible the icons 40 and 42, i.e., the top and sides.

A fourth area of the display 28 shows the units of the measurement. These units may be either an "R" or an "R/h" for rads, or rads per hour, respectively, depending upon whether a dosage or dosage rate measurement is being displayed A fifth area of the display, shows the symbol "$\gamma$". This symbol flashes once per every geiger pulse that is detected.

Figure 4:
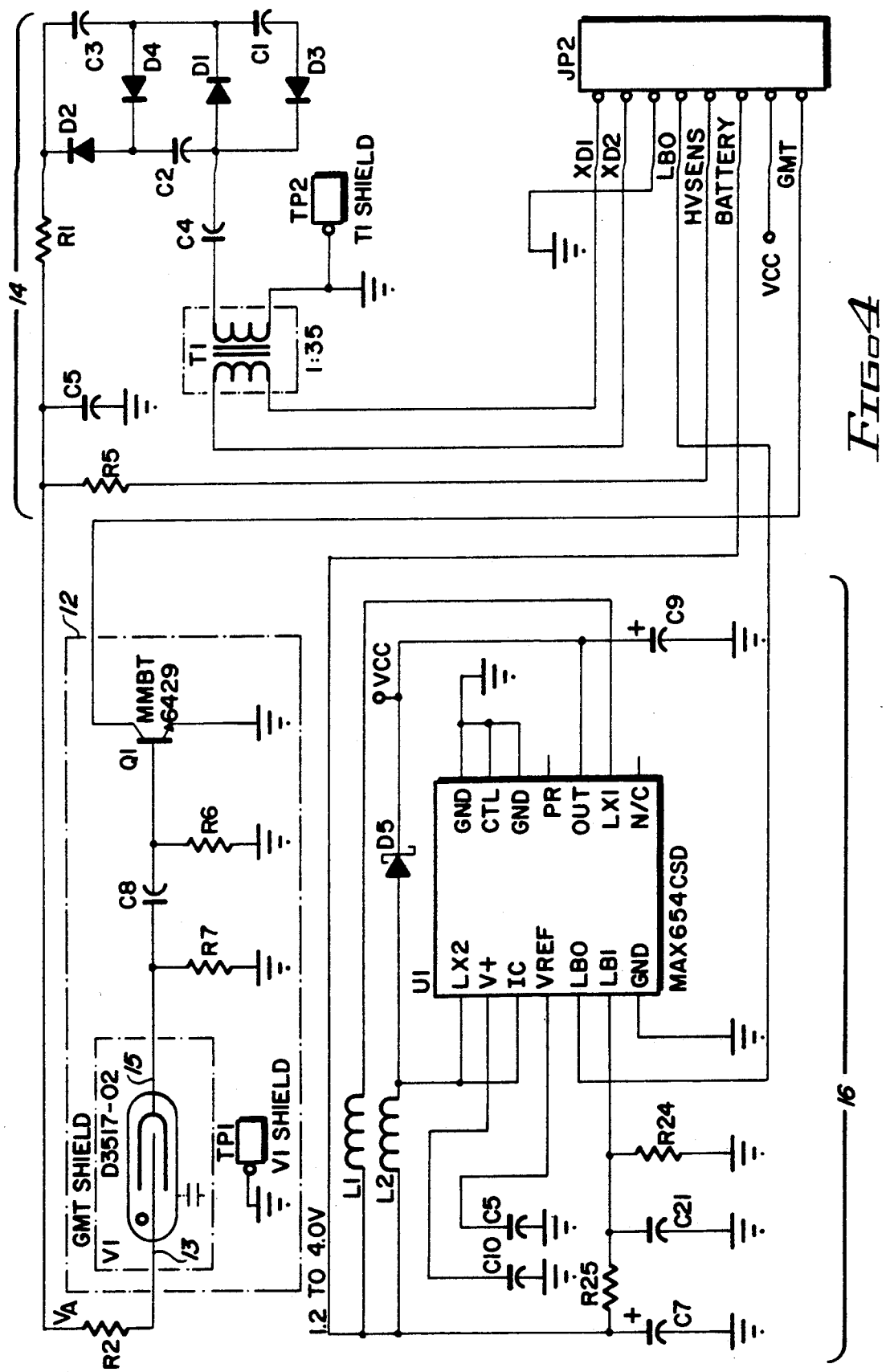
FIG. 4 is an electrical schematic diagram of power supply board used with the pocket dosimeter of FIGS. 1A and 1B.

Referring next to FIG. 4, there is shown an electrical schematic diagram of one of the two circuit boards used within the pocket dosimeter 10. The board shown in FIG. 4 is referred to as the power supply board and includes the Low Voltage Power Supply 16, the High Voltage Power Supply 14, and the GMT circuit 12 of FIG. 2. It is noted that FIG. 4, as well as the other electrical schematic diagrams presented herein, provide sufficient detail to allow one skilled in the electronic arts to readily understand the operation of and construct the respective circuits. This detail includes device types by generic model or part numbers, including pin numbers of integrated circuits (IC), and component values.

As seen in FIG. 4, the low voltage power supply 16 is realized using a MAX654 integrated circuit (IC), commercially available from MAXIM. This particular IC, identified in FIG. 4 as U1, is basically a DC-to-DC converter, converting the 1.5 volt output voltage from the battery 18, received through pin 6 of connector JP2, to a regulated $V_{cc}$ supply voltage of 5.0 volts. Inductors L1 and L2 combine with elements internal to the IC to provide voltage transformation via the "flyback" principle. Other types of low voltage power supplies could also be used.

Still with reference to FIG. 4, the anode voltage $V_A$ needed for operation of the GMT circuit 12 is generated by the high voltage power supply (HVPS) 14. As seen in FIG. 4, the HVPS 14 receives oscillating clock signals, XD1 and XD2, through pins 1 and 2 of connector JP2. (Note that connector JP2 on the power supply board of FIG. 4 connects with connector JP1 on the digital board of FIGS. 5A and 5B.) As explained more fully below, these signals XD1 and XD2 are substantially a 5-volt AC square waves.

The signals XD1 and XD2 are respectively connected to the ends of a primary winding of a transformer T1. A secondary winding of the transformer T1 has one end grounded and the other end connected to a coupling capacitor C4. The transformer preferably has a turns ratio between the primary winding and the secondary winding of about 1:35. The coupling capacitor C4 connects the secondary winding of the Transformer T1 to a diode quadrupler circuit, comprised of diodes D1, D2, D3 and D4, and capacitors C1, C2, and C3. The peak voltage output from the diode quadrupler circuit is captured and maintained in an output filter made from resistor R1 and capacitor C5. This captured peak voltage comprises the output voltage $V_A$ from the HVPS 14.

Still referring to FIG. 4, an electrical schematic diagram of the Geiger Muller Tube (GMT) circuit 12 is illustrated. The preferred circuit 12 uses a D3517-02 GMT available from Hamamatsu. Such GMT provides approximately 12 counts per minute (cpm) per milliRad per hour ($\approx$12 cpm/(mR/h)). The anode voltage $V_A$ is applied to the anode 13 of the GMT 12 through a resistor R2. The cathode 15 of the GMT 12 is connected to the base of pulse shaping NPN transistor Q1 through coupling capacitor C8. Transistor Q1 is biased with resistor R6. The collector terminal of Q1 is connected to pin 8 of connector JP2 and provides a GMT signal (pulse) whenever a photon is detected.

Figure 5A:
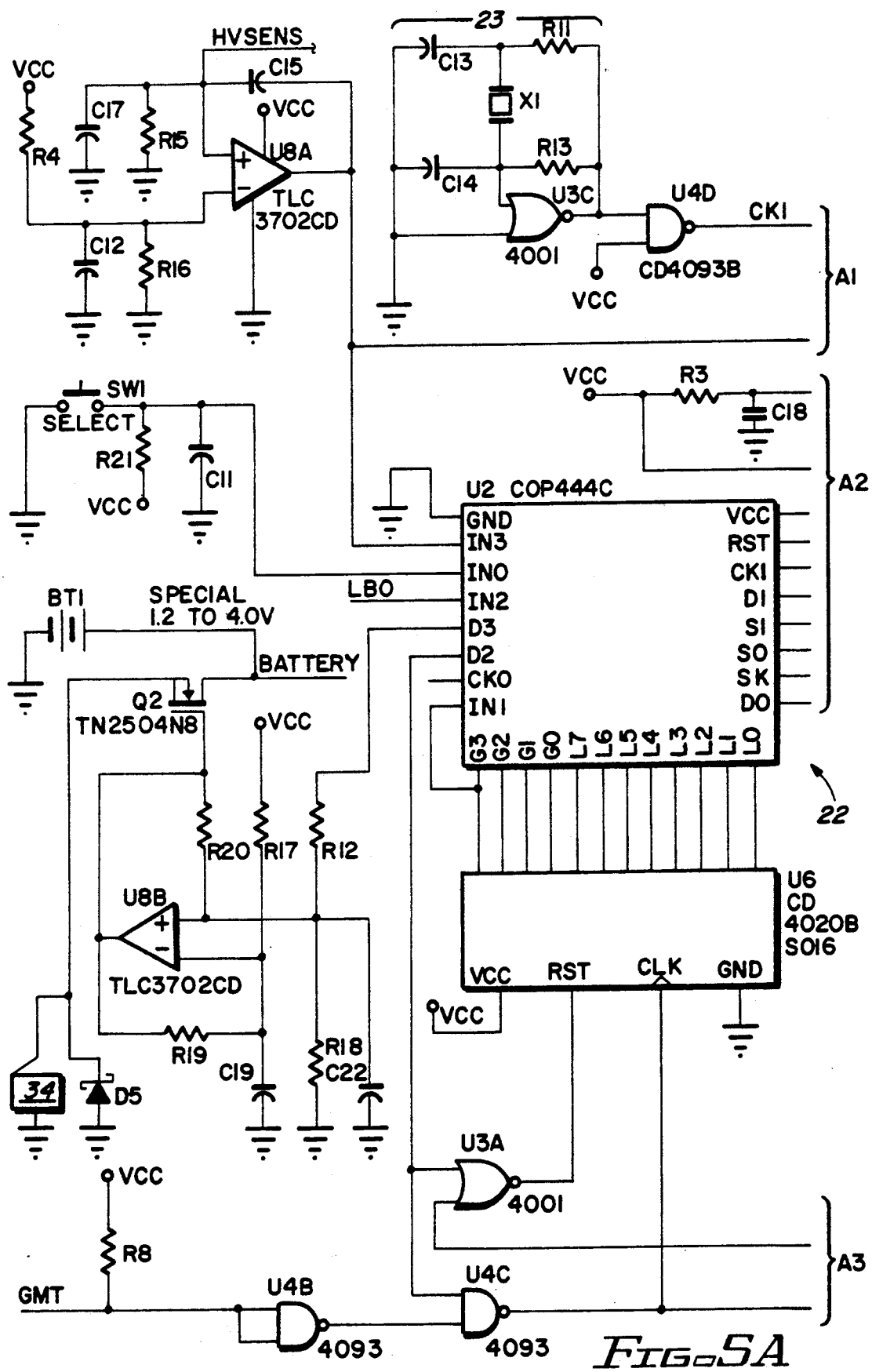
FIG. 5A and 5B are an electrical schematic diagram of a digital board used within the pocket dosimeter of FIGS. 1A and 1B; and Appendix A contains a program listing of the program used to control the CPU in accordance with the best mode presently contemplated for practicing the invention. Appendix A is incorporated herein by reference in its entirety.
Figure 5B:
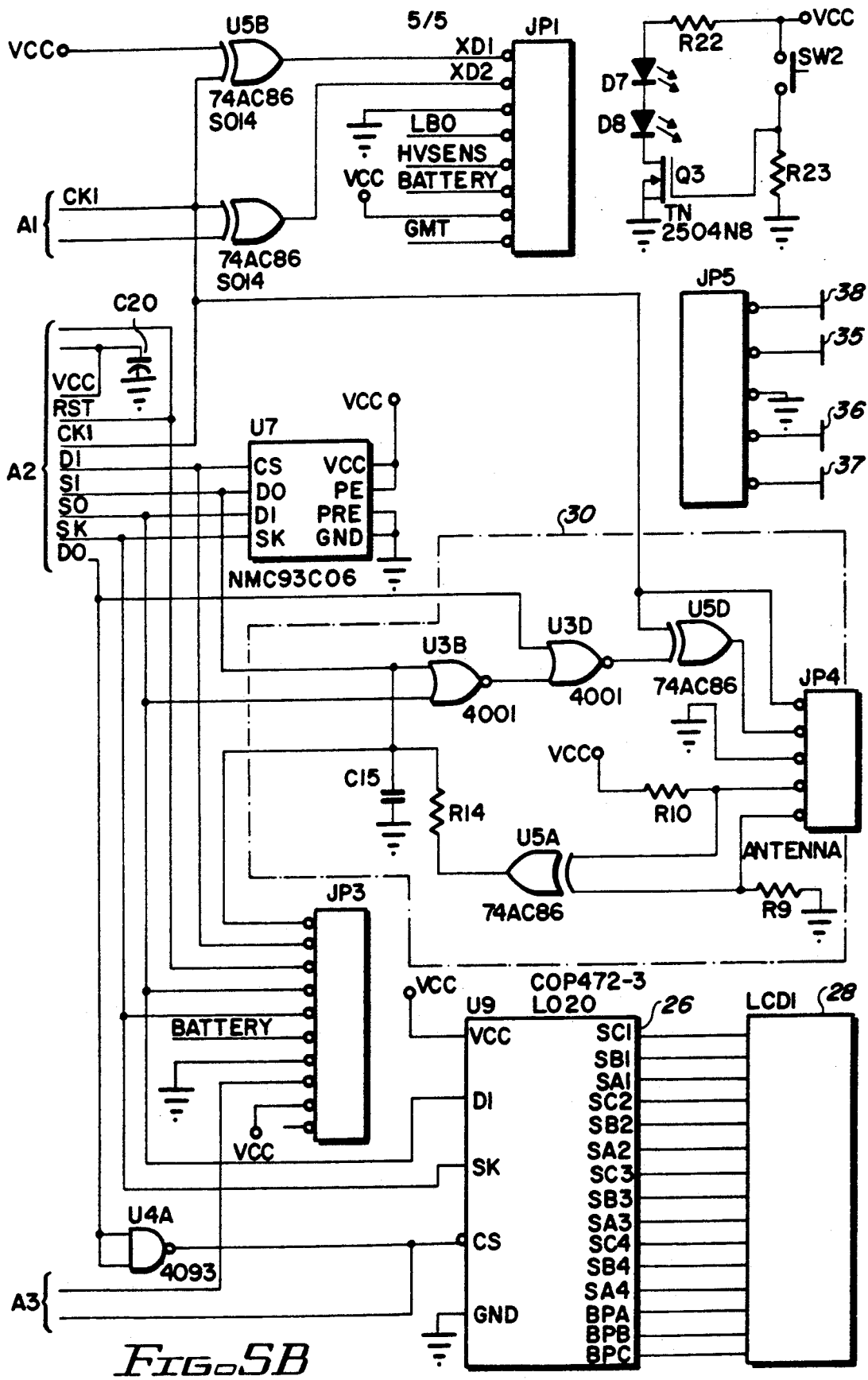

Referring next to FIGS. 5A and 5B, there is shown an electrical schematic diagram of the other board, referred to as the digital board, used within the pocket dosimeter 10. FIG. 5A represents the left half of the digital board schematic, and FIG. 5B represents the right half. The bracketed signal lines A1, A2 and A3 depict the interconnections between the two halves. The digital board includes the remaining elements of the pocket dosimeter 10 shown in FIG. 2 not included on the power supply board shown in FIG. 4.

A clock circuit 23 generates a basic clock signal CK1 that is used by the CPU system 22. As seen in FIG. 5A, this clock circuit includes a crystal X1 that drives one input (on pin 8) of a dual-input NOR gate U3C. The other input of the NOR gate (pin 9) is connected to ground. The output of the NOR gate (pin 10) is applied to one input (pin 12) of a NAND gate U4D. The other input (pin 13) of the NAND gate U4D is connected to $V_{cc}$. The output (pin 11) of the NAND gate U4D provides the CK1 signal, which is essentially a 5 volt peak-to-peak AC square wave signal. Positive feedback is provided through resistors R11 and R13 back to the crystal X1. The preferred operating frequency for the clock circuit 23 is 32.768 KHz.

As seen in FIG. 5B, the clock signal CK1 generated by the clock circuit 23 is applied to Exclusive OR gates, U5B and U5C. Exclusive OR gate U5B has inputs at pins 4 and 5, with an output at pin 6. Exclusive OR gate U5C has inputs at pins 9 and 10, with an output at pin 8. The clock signal CK1 is applied to pin 5 of Exclusive OR gate U5B, and to pin 9 of Exclusive OR gate U5C. The other input to Exclusive OR gate U5B (pin 4) is connected to $V_{CC}$ (e.g., +5 volts), thus making U5B function as a fixed invertor, or 180° phase shifter. The other input to Exclusive OR gate U5C (pin 10) is connected to a feedback reference signal obtained from the output (pin 1) of a differential comparator U8A (shown in FIG. 5A), thus making U5C function as a feedback controlled invertor, or 180° phase shifter.

The differential comparator U8A functions as a threshold detector, with a reference voltage being applied to its negative (−) input terminal (pin 2), and a voltage HVSENS representative of the output voltage $V_A$ being applied to its positive (+) input terminal (pin 3). The reference voltage applied to the negative input terminal is one half of $V_{cc}$, and is obtained through a resistive divider network made up of resistors R4 and R16. The voltage HVSENS is obtained through a resistive dividing network, comprising resistors R5 (FIG. 4) and R15. Capacitors C12 and C17 function to filter the negative input and the positive input, respectively, of the differential comparator U8A. Another capacitor, C16, connected between the output of U8A and the positive input of U8A, functions to provide momentary positive feedback for the differential comparator so that when it starts to change from one state to another, it does so quickly without oscillation.

In operation, and with reference to FIGS. 4, 5A and 5B, a 10 volt peak-to-peak AC square wave signal, comprising XD1 and XD2, is applied to the primary of the transformer T1 through the Exclusive OR gates U5B and U5C only when the output of the Exclusive OR gate U5B (pin 6) is out of phase relative to the output of the Exclusive OR gate U5C (pin 8). When the output of Exclusive OR gate U5B is in phase relative to the output of Exclusive OR gate U5C, there is no net voltage across the primary of transformer T1, i.e., XD1 and XD2 cancel each other out. Thus, application of the 10 volt peak-to-peak signal occurs only when the output (pin 1) of the differential comparator U8A is low. In turn, the output of the differential comparator U8A is low only when the HVSENS voltage applied to its positive input terminal (pin 3) (the voltage representative of the output voltage $V_A$) is less than the reference voltage applied to its negative input terminal (pin 2). This condition occurs only when the output voltage $V_A$ of the HVPS 14 is less than its desired level, e.g., less than about 550 volts. Hence, only when the output voltage $V_A$ is less than 550 volts is the 10 volt peak-to-peak signal applied to the primary of the transformer T1 i.e., there is no net voltage. (Note that the outputs of the Exclusive OR gates U5B and U5C comprise the signals XD1 and XD2, respectively.) As soon as the output voltage $V_A$ reaches 550 volts, the state of the differential comparator U8A changes (because the voltage applied to the positive input terminal exceeds the reference voltage applied to the negative input terminal) and the CK1 input signal is no longer applied to the primary of the transformer T1. In this manner, the input signal CK1 is thus applied to the transformer T1 only on demand, i.e., only when needed to maintain the output voltage $V_A$ at the desired level. In the preferred embodiment, the transformer T1 may be realized using a ferrite pot core with a primary-to-secondary turns ratio of approximately 1:35.

The GMT pulse signal (obtained from the GMT circuit 12 on the power supply board shown in FIG. 4) is connected to CMOS Schmitt logic gates U4B and U4C (to further shape the pulse generated by the GMT circuit 12), and is eventually connected to the clock input terminal (pin 10) of a pulse counter circuit U6. Pulse counter U6 counts the pulses generated by the GMT circuit 12. In the preferred embodiment, U6 is a conventional CMOS 14-bit Ripple-Carry Binary Counter/Divider, such as a CD4020B IC available from numerous IC manufacturers. Advantageously, these CMOS circuits (both U4 and U6) consume power only when changing from one state to another, i.e., only when a pulse from the GMT circuit is present. The count held in the pulse counter 20 is coupled directly into the CPU system 22.

The CPU System 22 comprises a suitable microprocessor and associated memory for processing the count held in the pulse counter U6 and converting it into an appropriate measure of the radiation dosage or dosage rate. The microprocessor also generates alarm signals whenever the dosage or dosage rate exceeds preset limits. The preferred microprocessor is realized using a COP444C micro-controller U2, available from National Semiconductor. This particular microprocessor is designed by its manufacturer for use in game and automotive controllers. It is used for this application because its onboard resources are barely adequate to meet the control and computational requirements of the dosimeter 10, and there is thus no non-functional circuitry therein that would tend to increase cost or decrease battery life. Advantageously, there is a significant amount of literature available in the art detailing the operation of such microprocessor, thereby enabling one skilled in the art to use such a device for any desired application, such as the one described herein.

It is noted that the microprocessor U2 includes a built-in 2K x 8 ROM, or equivalent memory circuit, for storing an appropriate processing program to control the microprocessor U2 as it performs the desired computations and conversions.

As further seen in FIG. 5B, an EEPROM (electrically erasable programmable read only memory) U7 is also connected to the microprocessor system 22. This EEPROM provides a convenient memory wherein certain parameters, utilized by the processing program of the microprocessor U2 as it determines dosage and dosage rates, may be programmably stored. For example, certain calibration constants, or other data, that may change from time to time as the pocket dosimeter 10 performs its measurement functions, may be conveniently stored in the EEPROM U7. In the preferred embodiment, U7 may be realized with an NMC93C06, having a capacity of 256 bits of memory.

The preferred processing program for use with the CPU system 22 as described above is included in Appendix A, filed herewith, and incorporated herein by reference. The processing program of Appendix A includes numerous "comment" statements that make it self-explanatory to one familiar with programming a COP444C or equivalent processor.

Advantageously, using the processing program included in Appendix A, the pocket dosimeter 10 is able to detect and display a wide range of dosages and dosage rates. For example, by employing a dead time correction algorithm, as detailed in Appendix A, dosage rages of 10 $\mu$R to 999 R, and dosage rates of 20 $\mu$R/h to 500 R/h, can be detected and displayed.

As further seen in FIG. 5B, the communications link 30 is coupled to a set of receive electrodes or plates 36 and 37; and to a set of transmit electrodes or plates 35 and 38. Collectively, these receive and transmit electrodes or plates comprise the electrodes 32 referenced above in connection with FIG. 2. It is to be understood that the electrodes 32 are not actually part of the digital board shown in FIG. 5B, but are rather included as part of the case or housing 50 of the pocket dosimeter 10 (FIG. 1A). These electrodes 32 are then connected through connector JP5 to connector JP4 on the digital board.

As seen in FIG. 5B, the receive electrode 36 is connected (through pin 2 of mating connectors JP4 and JP5) to one input (pin 2) of Exclusive OR gate U5A. A pull-up resistor R10 connects this same input of Exclusive OR gate U5A to $V_{cc}$. The other input of Exclusive OR gate U5A (pin 1) is connected to receive electrode 37 through pin 1 of mating connectors JP4 and JP5. This other input is also connected to ground through resistor R9. The output of Exclusive OR gate U5A (pin 3) is filtered through a low pass filter comprising resistor R14 and C15, and is then connected to the "SI" input of the microprocessor U2 and to the "D0" output of the EEPROM U7. It is important to physically isolate the receiver input pins, i.e., pins 1 and 2 of U5A, and all printed circuit board traces connected thereto, as much as possible.

In operation, when data is to be coupled to either the microprocessor system 22 or the EEPROM 24, such data is first capacitively coupled to electrodes 36 and 37 using a suitable transceiver 31, as described above in connection with FIG. 2. As the charge coupled to one electrode, e.g., electrode 36 or 37, changes relative to the charge coupled to the other electrode, a signal transition appears at the output of Exclusive OR gate U5A (pin 3). A series of such signal transitions thus represents the data to be transferred. These signal transitions, i.e., the desired data, are then selectively coupled to either the microprocessor U2 or the EEPROM U7.

As further seen in FIG. 5B, the transmit electrode 38 is connected through pin 5 of mating connectors JP5 and JP4 to the clock signal CK1. The other transmit electrode 35 is connected through pin 4 of connectors JP4 and JP5 to the output (pin 11) of Exclusive OR gate U5D. One input (pin 12) of Exclusive OR gate U5D is also connected to the clock signal CK1. The other input (pin 13) is a signal S_OUT. The signal S_OUT is obtained from the output (pin 11) of NOR gate U3D. One input (pin 12) of NOR gate U3D is obtained from the output "D0" (pin 28) of the microprocessor chip U2. The D0 output is used as a control bit to selectively disable NOR gate U3D. The other input (pin 13) of NOR gate U3D has data therein to be transmitted via electrode 35. Such data is obtained through NOR gate U3D from either the data output port "D0" (pin 4) of the EEPROM U7, or the data output port "S0" (pin 17) of the microprocessor U2. Hence, either data held in the microprocessor chip U2 or the EEPROM U7 may be selectively sent to the electrode 35, where it may be capacitively coupled to an appropriate transceiver device 31 (FIG. 2).

With reference to FIG. 5A, it is seen that the "D3" signal (obtained from the D3 output of microprocessor U2) is connected to a differential comparator U8B. This differential comparator U8B drives the audio alarm 34 whenever the signal D3 exceeds a reference voltage. The audio alarm 34 may be any suitable alarm or audio device, e.g., a speaker, that generates an audible sound whenever it is driven by an appropriate signal. A preferred alarm generates a beep (or single tone) at a rate controlled by the D3 signal, with a sound level of at least 85 dBA at a distance of 30 cm. An audio alarm device manufactured by, e.g., Motorola under model number 50-5030HOR, may be used for the alarm 34.

The LCD driver 26, as seen in FIG. 5B, is preferably realized with a COP472-3 LCD driver, manufactured by National Semiconductor. This driver 26 is further labeled in FIG. 5B as U9. The driver 26 drives an appropriate LCD display 28. The preferred LCD display is as shown in FIG. 3, discussed previously.

As described above, it is thus seen that the pocket dosimeter of the present invention provides an accurate quantitative measure of the radiation dosage to which the dosimeter is exposed. Further, the measured radiation dosage is displayed in an easy-to-read format. Further, the dosimeter includes audible alarm features the audibly signal, e.g., by issuing a series of audible beeps, whenever a programmable or selectable dosage threshold rate has been exceeded.

As also described above, it is seen that the described pocket dosimeter is small enough to be readily carried by an individual, e.g., in a shirt pocket, and sufficiently light weight and small to enable it to be carried in an unobtrusive manner. The volume associated with the dosimeter described is on the order of 60 cm³, and the weight is less than 90 grams, including the battery. The battery is a standard size AA alkaline battery and provides 500-600 hours of continuous operation. These specifications provide a significant improvement over competitive, prior art products intended for the same application.

While the invention herein disclosed has been described by means of a specific embodiment and application thereof, numerous modifications and variations could be made thereto by those skilled in the art without departing from the scope of the invention set forth in the claims.

ELECTRONIC POCKET DOSIMETER

Appendix A

```
0001 0000    ;*********************************************
0002 0000    ;********  SAIC/MPD POCKET DOSIMETER FIRMWARE  **********
0003 0000    ;********  K.H. Valentine    November 6, 1990  **********
0004 0000    ;***************  Copyright 1990 by SAIC  ***************
0005 0000    ;*********************************************
0006 0000
0007 0000    ;    The target processors for this source code are the
0008 0000    ;COP444C and COP444CP Piggyback EPROM Microcontroller
0009 0000    ;which has the same specifications as the COP404C:
0010 0000    ;    1. Execution frequency is the external clock
0011 0000    ;       frequency applied to CKI divided by 4
0012 0000    ;    2. The Microbus option is not selected
0013 0000    ;    3. The Dual-Clock option is not selected
0014 0000    ;    4. The Timer/Counter register is a timer
0015 0000    ;    5. 128 nibbles of RAM and 2 k-byte of onboard ROM
0016 0000    ;       are available
0017 0000    ;Since the G-PORT of the COP444CP has active pullups,
0018 0000    ;each G-PORT pin which is pulled low by the CD4020B
0019 0000    ;will sink about 0.25 mA from the 5 V supply when _C
0020 0000    ;code versions are run on _CP processors.
0021 0000
0022 0000
0023 0000    ;The COP444CP/444C port assignments are as follows:
0024 0000    ;
0025 0000    ;4-bit Output PORT (D) --- I/O level functions
0026 0000    ;    Pin D.0  ENABLE/!DISABL COP472-3 Triplex LCD driver
0027 0000    ;    Pin D.1  ENABLE/!DISABL NMC93C06 256-bit EEPROM
0028 0000    ;    Pin D.2  ENABLE/!DISABL CD4020B Counter used to
0029 0000    ;             count pulses from Geiger Tube
0030 0000    ;    Pin D.3  ENABLE/!DISABL AUDIO-Alarm
0031 0000    ;A CD4020B Reset is generated by enabling the COP472-3
0032 0000    ;while the CD4020B is disabled, i.e., D.0=1 and D.2=0.
0033 0000    ;This occurs only when code execution jumps to RESET
0034 0000    ;
0035 0000    ;4-bit Input PORT (IN)
0036 0000    ;    Pin IN.0 OPEN/!CLOSED momentary contact Push-Button
0037 0000    ;             MODE-Switch, polled at about 1 Hz
0038 0000    ;    Pin IN.1 Hi/Lo Transition = IRQ = CD4020B Overflow
0039 0000    ;             Pin IN.1 is tied to Pin G.3
0040 0000    ;    Pin IN.2 BATTOK/!BATTLO Battery Voltage Indicator
0041 0000    ;    Pin IN.3 HVOK/!MAYBE_HVLO HVPS Regulation Indicator
0042 0000    ;
0043 0000    ;2-bit Latch (IL.0=IN.0 latch and IL.3=IN.3 latch)
0044 0000    ;    Bit IL.0 MODE_ADVANCE/!SAME_MODE (PB Switch)
0045 0000    ;    Bit IL.3 HVOK/!HVLO Better HVPS Regulation Indicator
0046 0000    ;
0047 0000    ;8-bit I/O PORT (L, used as Input Port)
0048 0000    ;    Pin L.0  Bit-0 of Geiger Pulse Counter used as an
0049 0000    ;                   event detector at low dose rates.
0050 0000    ;    Pin L.1  Bit-3 of Geiger Pulse Counter
0051 0000    ;      ......        .....
0052 0000    ;      ......        .....
0053 0000    ;    Pin L.7  Bit-9   "     "     "     "
0054 0000    ;
0055 0000    ;4-bit I/O PORT (G, used as Input Port)
```

```
0056  0000      ; Pin G.0  Bit-10 of Geiger Pulse Counter
0057  0000      ; Pin G.1  Bit-11    "      "      "
0058  0000      ; Pin G.2  Bit-12    "      "      "
0059  0000      ; Pin G.3  Bit-13    "      "      "     (tied to IN.1)
0060  0000
0061  0000      ;
0062  0000      ;    MEMORY MAP FOR COP444C RAM REGISTERS (B=REG,DIGT)
0063  0000      ;
0064  0000      ;
0065  0000      ;                   Registers  0-3
```

| RAM   | REG0              | REG1                                    | REG2              | REG3                          |
|-------|-------------------|-----------------------------------------|-------------------|-------------------------------|
| DIGT_0 | ALRM             | TIME                                    | O_RAT             | N_RAT<br>D_RT                 |
| DIGT_1 | FLAG             | TIME+1                                  | O_RAT+1           | N_RAT+1<br>D_RT+1             |
| DIGT_2 | CNTR             | TIME+2                                  | O_RAT+2           | N_RAT+2<br>D_RT+2             |
| DIGT_3 | WARBLE           | TIME+3                                  | O_RAT+3           | N_RAT+3<br>D_RT+3             |
| DIGT_4 | RTAL             | LO_NIB<br>AXDSB                         | RAT_T             | MAXRT                         |
| DIGT_5 | RTAL+1           | GPR1                                    | RAT_T+1           | MAXRT+1                       |
| DIGT_6 | RTAL+2           | GPR2                                    | RAT_T+2           | MAXRT+2                       |
| DIGT_7 | RTAL+3           | BCD                                     | RAT_T+3           | MAXRT+3                       |
| DIGT_8 | L3_OLD           | BCD+1                                   | INPORT            | MD2TMR                        |
| DIGT_9 | FLGS             | BCD+2<br>AMTH<br>EEWBF                  | MATH              | D_REG                         |
| DIGT_A | MODE             | BCD+3<br>AMTH+1<br>EEWBF+1              | MATH+1<br>DEC_PT  | INTRVL                        |
| DIGT_B | MNTISA           | BCD+4<br>AMTH+2<br>EEWBF+2              | MATH+2<br>DSPBF   | SRCHR<br>DSPBF+1              |
| DIGT_C | MNTISA+1<br>SWAP | BCD+5<br>AMTH+3<br>EEWBF+3<br>IOBUF     | MATH+3<br>DSPBF+2 | FLAC<br>DSPBF+3<br>REG_NO     |
| DIGT_D | MNTISA+2<br>SWAP+1 | BCD+6<br>AMTH+4<br>EEWBF+4<br>IOBUF+1<br>EECBF | MATH+4<br>DSPBF+4 | FLAC+1<br>DSPBF+5<br>REG_NO+1 |
| DIGT_E | UNITS<br>SWAP+2  | BCD+7<br>AMTH+5<br>EEWBF+5<br>IOBUF+2<br>EECBF+1 | MATH+5<br>DSPBF+6 | FLAC+2<br>DSPBF+7<br>REG_NO+2<br>GPR3 |
| DIGT_F | ICONS<br>SWAP+3  | BCD+8<br>AMTH+6<br>EEWBF+6<br>IOBUF+3<br>EECBF+2 | MATH+6<br>DSPBF+8 | FLAC+3<br>DSPBF+9<br>GPR4     |

```
0066  0000
0067  0000
0068  0000
0069  0000
0070  0000
0071  0000
0072  0000
0073  0000
0074  0000
0075  0000
0076  0000
0077  0000
0078  0000
0079  0000
0080  0000
0081  0000
0082  0000
0083  0000
0084  0000
0085  0000
0086  0000
0087  0000
0088  0000
0089  0000
0090  0000
0091  0000
0092  0000
0093  0000
0094  0000
0095  0000
0096  0000
0097  0000
0098  0000
0099  0000
0100  0000
0101  0000
0102  0000
0103  0000
0104  0000
0105  0000
0106  0000
0107  0000
0108  0000
0109  0000
0110  0000
0111  0000
0112  0000
0113  0000
0114  0000
0115  0000
0116  0000
0117  0000
0118  0000
0119  0000
0120  0000
0121  0000
0122  0000
0123  0000
0124  0000
0125  0000
0126  0000
0127  0000
```

```
0128    0000    ;
0129    0000    ;
0130    0000    ;
0131    0000    ;
0132    0000    ;
0133    0000    ;
0134    0000    ;
0135    0000    ;
0136    0000    ;
0137    0000    ;
0138    0000    ;
0139    0000    ;
0140    0000    ;
0141    0000    ;
0142    0000    ;
0143    0000    ;
0144    0000    ;
0145    0000    ;
0146    0000    ;
0147    0000    ;
0148    0000    ;
0149    0000    ;
0150    0000    ;
0151    0000    ;
0152    0000    ;
0153    0000    ;
0154    0000    ;
0155    0000    ;
0156    0000    ;
0157    0000    ;
0158    0000    ;
0159    0000    ;
0160    0000    ;
0161    0000    ;
0162    0000    ;
0163    0000    ;
0164    0000    ;
0165    0000    ;
0166    0000    ;
0167    0000    ;
0168    0000    ;
0169    0000    ;
0170    0000    ;
0171    0000    ;
0172    0000    ;
0173    0000    ;
0174    0000    ;
0175    0000    ;
0176    0000    ;
0177    0000    ;
0178    0000    ;
0179    0000    ;
0180    0000    ;
```

Registers 4-7

| RAM    | REG4                   | REG5     | REG6    | REG7          |
|--------|------------------------|----------|---------|---------------|
| DIGT_0 | BG_ER                  | RAT_M    | O_DOS   | N_DOS<br>D_DS |
| DIGT_1 | PRSNLY<br>TB_EXP $D    | RAT_M+1  | O_DOS+1 | N_DOS+1<br>D_DS+1 |
| DIGT_2 | PRSNLY+1<br>TB_MNT $B  | RAT_M+2  | O_DOS+2 | N_DOS+2<br>D_DS+2 |
| DIGT_3 | PRSNLY+2<br>BKGD    $2 | RAT_M+3  | O_DOS+3 | N_DOS+3<br>D_DS+3 |
| DIGT_4 | PRSNLY+3<br>PRGOPT $8  | INCHRP   | DSAL    | GM_DT         |
| DIGT_5 | UPDATE                 | INCHRP+1 | DSAL+1  | GM_DT+1       |
| DIGT_6 | BATTRY                 | INCHRP+2 | DSAL+2  | GM_DT+2       |
| DIGT_7 | T_CNT-2                | INCHRP+3 | DSAL+3  | GM_DT+3       |
| DIGT_8 | T_CNT-1                | FLSH     | RTNPTR  | T_DSP         |
| DIGT_9 | T_CNT                  | CHRP     | SKRCH   | TARA          |
| DIGT_A | T_CNT+1                | CHRP+1   | SKRCH+1 | TARA+1        |
| DIGT_B | T_CNT+2                | CHRP+2   | SKRCH+2 | TARA+2        |
| DIGT_C | T_CNT+3                | CHRP+3   | SKRCH+3 | TARA+3        |
| DIGT_D | T_CNT+4                | CHRP+4   | SKRCH+4 | TARA+4        |
| DIGT_E | T_CNT+5                | CHRP+5   | SKRCH+5 | TARA+5        |
| DIGT_F | T_CNT+6                | CHRP+6   | SKRCH+6 | TARA+6        |

```
0181    0000            .DSEG           ;--- RAM Variables and Constants
0182    0000
0183    0000    ;"REG0":
0184    0000    ALRM    .EQU    $00     ;ICON-ALaRM Enable Bits:
0185    0000                            ; ALRM.0: GAMMA Detected
0186    0000                            ; ALRM.1: DOSE-Alarm
0187    0000                            ; ALRM.2: BATT-Alarm
0188    0000                            ; ALRM.3: RATE/HVPS-Alarm
0189    0000                            ;Final ALRM.3=ALRM.3&FLAG.3
0190    0000    FLAG    .EQU    $01     ;Extra ALARM and D-T-C Flags
0191    0000                            ; FLAG.0: T_CNT OVRFLW/!OK
0192    0000                            ; FLAG.1: RAT_M OLD/!NEW
0193    0000                            ; FLAG.2: AUDIO-Alr ENBL/!DISABL
0194    0000                            ; FLAG.3: Gamma RATE-Alarm bit
0195    0000                            ;    FLAG.2=ALRM.3|FLGS.1|(FLAG.3
0196    0000                            ;    &PRGOPT.3)    (&&&, 4/26/90)
0197    0000    CNTR    .EQU    $02     ;No. of CD4020B Overflows at
```

```
0198 0000                                ;    16384 Counts/Overflow which
0199 0000                                ;    is roughly 23 mR/Overflow
0200 0000         WARBLE  .EQU  $03      ;Cyclical index incremented each
0201 0000                                ;    125 ms to create WARBLE in
0202 0000                                ;    AUDIO Alarm (0,1,..,7,0,..).
0203 0000                                ;    A 125 ms beep is issued when
0204 0000                                ;    WARBLE = 0 or TOF2 (Timer
0205 0000                                ;    OverFlow)2
0206 0000         RTAL    .EQU  $04 ;$07  RaTe ALarm (level at which RATE
0207 0000                                ;    Icon turns on and AUDIO
0208 0000                                ;    Alarm is enabled) in units
0209 0000                                ;    of cnt's/(4096xRSI_MN) TOFPs
0210 0000                                ;    (Timer OverFlow Period)s @
0211 0000                                ;    RTCF (µR/h)/(cnt/4096 TOFPs)
0212 0000                                ;    where 1 cnt' = 4 cnts.
0213 0000                                ;    Format is 4-nibl FP-16:
0214 0000                                ;        RTAL=EXP16,W,V,U =
0215 0000                                ;        $W.VUx16^EXP16 =
0216 0000                                ;        (W+V/16+U/256)x16^EXP16
0217 0000                                ;    (base16 exponent with 3-
0218 0000                                ;    digit hex mantissa)
0219 0000         L3_OLD  .EQU  $08      ;Previous value of L3:0 (Lo byte
0220 0000                                ;    of PORT-L). Used for com-
0221 0000                                ;    parison with current value
0222 0000                                ;    of L3:0 for event detection
0223 0000         FLGS    .EQU  $09      ;Program FLaGS:
0224 0000                                ; FLGS.0: JMP/!RET from CK_TIM
0225 0000                                ;         after PB is pushed
0226 0000                                ; FLGS.1: DS-Alarm ENABL/!DISABL
0227 0000                                ; FLGS.2: DS-Alarm DSARMD/!ARMED
0228 0000                                ; FLGS.3: RATE-UDat ACTIVE/!IDLE
0229 0000                                ;FLGS.1,2 deal with AUDIO Alarm
0230 0000         MODE    .EQU  $0A      ;Cyclical Index for User Mode:
0231 0000                                ;    MODE=0,1,2,0,1,2,... Only
0232 0000                                ;    the PDR-1 can invoke MODE3
0233 0000         MNTISA  .EQU  $0B ;$0D  3-Digit Decimal LCD MaNTISsA
0234 0000         SWAP    .EQU  $0C ;$0F  4-Nibble Buffer to save a RAT_M
0235 0000                                ;    or COMAND copy temporarily
0236 0000         UNITS   .EQU  $0E      ;Units control nibl (R/h, etc.)
0237 0000         ICONS   .EQU  $0F      ;ICON Bits, loads directly into
0238 0000                                ;    COP472-3 Spcl. Seg. Reg.
0239 0000                                ; ICONS.0: "GAMMA"  ON/!OFF
0240 0000                                ; ICONS.1: "DOSE"   ON/!OFF
0241 0000                                ; ICONS.2: "BATT"   ON/!OFF
0242 0000                                ; ICONS.3: "RATE"   ON/!OFF
0243 0000
0244 0000
0245 0000         ;"REG1":
0246 0000         TIME    .EQU  $10 ;$13  No. of Timer Overflows:
0247 0000                                ;    Time = TIME/8 + 2x(TIME+1) +
0248 0000                                ;    32x(TIME+2) + 512x(TIME+3)
0249 0000                                ;    if using 2^13 instr. freq.
0250 0000         LO_NIB  .EQU  $14      ;LO-NIBble of Geiger Pulse Count
0251 0000                                ;    LO_NIB.2 --> N_RAT.0,N_DOS.0
0252 0000         AXDSB   .EQU  $14 ;$1F  Top of AuX DiSplay-Buffer, used
0253 0000                                ;    only for a 0≤i<12 loop index
0254 0000                                ;                 (&&&, 4/28/90)
0255 0000         GPR1    .EQU  $15      ;General Purpose Register #1
0256 0000         GPR2    .EQU  $16      ;    "       "       "     #2
0257 0000         BCD     .EQU  $17 ;$1F  Buffer for 9-nibble HEX-to-BCD
0258 0000                                ;    conversion result
0259 0000         AMTH    .EQU  $19 ;$1F  7-Nibble Auxiliary MATH Buffer
0260 0000         EEWBF   .EQU  $19 ;$1F  Top of EEPROM Write-BuFfer
0261 0000         IOBUF   .EQU  $1C ;$1F  Top of EEPROM & Serial Port
0262 0000                                ;    Input/Output BUFfer
0263 0000         EECBF   .EQU  $1D ;$1F  Top of EEPROM Command-BuFfer
0264 0000                                ;    for read instructions
0265 0000
0266 0000
0267 0000         ;"REG2":
```

```
0268  0000            O_RAT   .EQU  $20  ;$23   CD4020B/CNTR contents at last
0269  0000                                      ;   TIME reset (Old_RATe)
0270  0000            RAT_T   .EQU  $24  ;$27   DiSPlay RaTe (the True RATe for
0271  0000                                      ;   LCD in RATE-Mode). This
0272  0000                                      ;   value is DT-Corrected with
0273  0000                                      ;   same format as RTAL.
0274  0000            INPORT  .EQU  $28         ;Copy of IN-PORT for CK_TIM to
0275  0000                                      ;   perform Bit-Test
0276  0000            MATH    .EQU  $29  ;$2F   7-Nibble MATH-Buffer to receive
0277  0000                                      ;   Counter DATA and to serve as
0278  0000                                      ;   accumulator for FP-MULtiply
0279  0000                                      ;   and DIVide routines
0280  0000            DEC_PT  .EQU  $2A         ;Lo-Nibl Pntr to DECimal PoinT
0281  0000            DSPBF2  .EQU  $2B  ;$2F   Top of REG2 DiSPlay-BuFfer
0282  0000
0283  0000
0284  0000            ;"REG3":
0285  0000            N_RAT   .EQU  $30  ;$33   Current CD4020B/CNTR contents
0286  0000            D_RT    .EQU  $30  ;$33   Count Difference, N_RAT-O_RAT,
0287  0000                                      ;   used for RATE-Calculation
0288  0000            MAXRT   .EQU  $34  ;$37   MAXimum RaTe seen by PD-1 since
0289  0000                                      ;   last CPU reset. Same format
0290  0000                                      ;   as RTAL
0291  0000            MD2TMR  .EQU  $38         ;DSP (DiSplay Period) Counter
0292  0000                                      ;   for return to MODE0 after 16
0293  0000                                      ;   MODE2 DSPs
0294  0000            D_REG   .EQU  $39         ;RAM Copy of D-PORT Outputs
0295  0000                                      ;   (see D-PORT assignments)
0296  0000            INTRVL  .EQU  $3A         ;Base16 Log of RATE Sampling
0297  0000                                      ;   INTeRVaL in units of TOFPs.
0298  0000                                      ;   Actual number of TOFPs in an
0299  0000                                      ;   RSI is RSI_MNx16^INTRVL
0300  0000            DSPBF3  .EQU  $3B  ;$3F   Top of REG3 DiSPlay-BuFfer
0301  0000            SRCHR   .EQU  $3B         ;SeaRCH CHaR for Serial-Port CMP
0302  0000            FLAC    .EQU  $3C  ;$3F   5-Nibble Floating Point ACC
0303  0000                                      ;   (including FLAC-1)
0304  0000            REG_NO  .EQU  $3C         ;EEPROM REGister NO. Index
0305  0000            GPR3    .EQU  $3E         ;General Purpose Register #3
0306  0000            GPR4    .EQU  $3F         ;    "        "       "    #4
0307  0000
0308  0000
0309  0000            ;"REG4":
0310  0000            BG_ER   .EQU  $40         ;BackGround-ERror accumulator to
0311  0000                                      ;   subtract from D_DS
0312  0000                                      ;         (&&&, 4/19/90)
0313  0000            PRSNLY  .EQU  $41  ;$44   PD-1 PeRSoNaLitY Constants:
0314  0000                                      ; PRSNLY(0)- EXPonent of time to
0315  0000                                      ;            ASD after detection
0316  0000                                      ;            of Low Batt voltage
0317  0000                                      ;                (&&&, 5/06/90)
0318  0000                                      ; PRSNLY(1)- MaNTissa of time to
0319  0000                                      ;            ASD after detection
0320  0000                                      ;            of Low Batt voltage
0321  0000                                      ;                (&&&, 5/06/90)
0322  0000                                      ; PRSNLY(2)- Spurious GMT pulses
0323  0000                                      ;            in the maximum RSI
0324  0000                                      ;                (&&&, 4/19/90)
0325  0000                                      ; PRSNLY(3)- PRoGramable OPTions
0326  0000            TB_EXP  .EQU  $41         ;Alias for PRSNLY(1), EXPonent
0327  0000                                      ;   of δTbatt, time to Automatic
0328  0000                                      ;   ShutDown after Lo-Batt is
0329  0000                                      ;   detected       (&&&, 5/06/90)
0330  0000            TB_MNT  .EQU  $42         ;Alias for PRSNLY(2), MaNTisa of
0331  0000                                      ;   δTbatt=TB_MNTx16^(TB_EXP-9)
0332  0000                                      ;   in TOFP units. Eg, if
0333  0000                                      ;   TB_EXP=13 and TB_MNT=11,
0334  0000                                      ;   δTbatt = 11x16^4 TOFPs =
0335  0000                                      ;   90112 s = 25.0 h
0336  0000                                      ;               (&&&, 5/06/90)
0337  0000            BKGD    .EQU  $43         ;Alias for PRSNLY(0), spurious
0338  0000                                      ;   pulse rate from GMT in units
```

```
0339  0000                                     ;        of cnt's/RSImax. Eg, if the
0340  0000                                     ;        GMT generates 0.5 cnt/m and
0341  0000                                     ;        RSImax=1024 s, then BKGD =
0342  0000                                     ;        0.5 x 1024/60 x 1/4 = 2.133
0343  0000                                     ;        which rounds to 2. See
0344  0000                                     ;        4/19/90 CODE CHANGES.
0345  0000                                     ;                    (&&&, 4/19/90)
0346  0000          PRGOPT   .EQU  $44         ;Alias for PRSNLY(3),
0347  0000                                     ;    PRoGrammable OPTions:
0348  0000                                     ; PRGOPT.0: ENBL/!DISABL EEPROM
0349  0000                                     ;               Updating at each RSI
0350  0000                                     ;               See 5/13/90 CHANGES
0351  0000                                     ;                    (&&&, 11/9/90)
0352  0000                                     ; PRGOPT.1: DISABL/!ENBL MODE1
0353  0000                                     ;                    (&&&, 5/15/90)
0354  0000                                     ; PRGOPT.2: DISABL/!ENBL Auto-
0355  0000                                     ;               Shutdown Feature
0356  0000                                     ;                    (&&&, 5/06/90)
0357  0000                                     ; PRGOPT.3: ENBL/!DISABL Audio
0358  0000                                     ;               RATE-Alarm
0359  0000                                     ;                    (&&&, 4/26/90)
0360  0000          UPDATE   .EQU  $45         ;UPDATE.0 = RAM-Copy of PRGOPT.0
0361  0000                                     ;    on exit from I/O routines.
0362  0000                                     ;    Reset to 0 on powerup.
0363  0000                                     ;    Bits 1 to 3 used for GMT
0364  0000                                     ;    diagnostic
0365  0000                                     ;                    (&&&, 5/13/90)
0366  0000          BATTRY   .EQU  $46         ;Counter for consecutive DSPs
0367  0000                                     ;    with BATT-Alarm (ALRM.2=1)
0368  0000          T_CNT    .EQU  $49  ;$4F    7-Nibble accumulator for true,
0369  0000                                     ;    corrected cnt's, Ctrue.
0370  0000                                     ;    At any time, the true dose
0371  0000                                     ;    is DSCFxT_CNT
0372  0000
0373  0000
0374  0000          ;"REG5":
0375  0000          RAT_M    .EQU  $50  ;$53    Measured-RATe is the output
0376  0000                                     ;    from RATE-Calc. FLAG.1 is
0377  0000                                     ;    set for new value in buffer.
0378  0000                                     ;    Same format as RTAL
0379  0000          INCHRP   .EQU  $54  ;$57    Dose INCrement per CHiRP (see
0380  0000                                     ;    E_INCP below)
0381  0000          FLSH     .EQU  $58         ;RAM-copy of BLNK, ICON control
0382  0000                                     ;                    (&&&, 4/19/90)
0383  0000          CHRP     .EQU  $59  ;$5F    7-Nibble DOSE-Value at which
0384  0000                                     ;    next CHiRP is generated
0385  0000
0386  0000
0387  0000          ;"REG6":
0388  0000          O_DOS    .EQU  $60  ;$63    CD4020B/CNTR contents at last
0389  0000                                     ;    DSP, LSN 1st ($60-$63)
0390  0000          DSAL     .EQU  $64  ;$67    DoSe ALarm Level (see E_DSAL)
0391  0000          RTNPTR   .EQU  $68         ;ReTurn PoinTeR for LD_NDS,
0392  0000                                     ;    LD_NRI, and LD_NRR
0393  0000          SKRCH    .EQU  $69  ;$6F    7-Nibble SKRatCH-Buffer
0394  0000
0395  0000
0396  0000          ;"REG7":
0397  0000          N_DOS    .EQU  $70  ;$73    Current CD4020B/CNTR contents,
0398  0000                                     ;    LSN 1st ($70-$73)
0399  0000          D_DS     .EQU  $70  ;$73    Count difference, N_DOS-O_DOS,
0400  0000                                     ;    used for DOSEtrue
0401  0000          GM_DT    .EQU  $74  ;$77    Dead-Time/Event (see E_GMDT)
0402  0000          T_DSP    .EQU  $78         ;TOFPs/DSP Accumulator for TARA
0403  0000                                     ;    (Time Above Rate Alarm)
0404  0000                                     ;    feature         (&&&, 4/28/9r
0405  0000          TARA     .EQU  $79  ;$7F    Time Above Rate Alarm in TOF
0406  0000                                     ;    (1/8 s)         (&&&, 4/2f
0407  0000
0408  0000
```

```
0409    0000
0410    0000
0411    0000
0412    0000
0413    0000
0414    0000
0415    0000
0416    0000
0417    0000
0418    0000
0419    0000
0420    0000
0421    0000              .XSEG           ;--- EEPROM Registers  (4 nibls)
0422    0000                              ;Reassignment      (&&&, 10/14/90)
0423    0000      ; NOTE:  RSI4 = 4096 x RSI_MN where RSI_MN is an
0424    0000      ; assembler constant.  From the PDR-1 standpoint,
0425    0000      ; EEPROM Regs 0 thru 10 are R/W whereas Regs 11 thru
0426    0000      ; 15 are Read-Only.
0427    0000      ;
0428    0000      ZER_DT  .EQU    $0              ;DaTe when last ZERoed with the
0429    0000                                      ;   the following format:
0430    0000      ;
0431    0000      ;       | CD(0)  |  CD(1)  |  CD(2)  |  CD(3)  |   1≤mmmm=MONTH≤12
0432    0000      ;                                                  1≤ddddd=DAY≤31
0433    0000      ;       |m|m|m|m|d|d|d|d|d|y|y|y|y|y|y|y|          0≤yyyyyyy=YEAR≤99
0434    0000      ;
0435    0000      ; The user is responsible for correct century; eg, the
0436    0000      ; date, 4/23/90 would be %0100/%10111/%1011010 = %0100,
0437    0000      ; %1011,%1101,%1010 = $4BDA where the EEPROM register
0438    0000      ; is interpreted assuming that ZER_DT(0) is the MSN.
0439    0000      ;
0440    0000      E_DSAL  .EQU    $1              ;DoSe ALarm level in cnt' units
0441    0000                                      ; @ DSCF µR/cnt' (4-nib FP-16)
0442    0000                                      ;    DSAL=EXP16,W,V,U =
0443    0000                                      ;      $W.VUx16^EXP16
0444    0000                                      ;    (base16 exponent and 3-digit
0445    0000                                      ;    hex mantissa).  Eg, 343A =
0446    0000                                      ;    (4+3/16+10/256)x16^3 =
0447    0000                                      ;    17312 cnt's = 100409 µR =
0448    0000                                      ;    100 mR
0449    0000      E_RTAL  .EQU    $2              ;RaTe ALarm Level in units of
0450    0000                                      ;    cnt's/(RSI4 TOFPs) (same as
0451    0000                                      ;    E_DSAL format).  Eg, 3BBF =
0452    0000                                      ;    (11+11/16+15/256)x16^3 =
0453    0000                                      ;    48112 cnts'/(8192 TOFPs) =
0454    0000                                      ;    1000729 µR/h = 1.00 R/h.
0455    0000                                      ;    E_RTAL varies as RSI_MN.
0456    0000      E_INCP  .EQU    $3              ;Dose INcrement/ChirP in cnt's @
0457    0000                                      ;    DSCF µR/cnt' (same format as
0458    0000                                      ;    E_DSAL).  Eg, 1AD0 =
0459    0000                                      ;    (10+13/16+0/256)x16^1 =
0460    0000                                      ;    173 cnt's = 1003 µR = 1 mR
0461    0000      E_PRSN  .EQU    $4              ;EEPROM PeRSoNality Nibbles -
0462    0000                                      ;    See PRSNLY for definitions
0463    0000      ID_STR  .EQU    $5              ;2-Reg (4-byte) ID-STRing (maybe
0464    0000                                      ;    user's initials or Social
0465    0000                                      ;    security number). ID_STR
0466    0000                                      ;    can hold a HEX integer<16^8,
0467    0000                                      ;    a BCD integer<1E8, or 6
0468    0000                                      ;    alphanumeric chrs (A-Z,0-9,
0469    0000                                      ;    " ",".","*","#") using a
0470    0000                                      ;    BASE-40 format.
0471    0000      DSCF    .EQU    $7              ;DoSe Conversion Factor in units
0472    0000                                      ;    of µR/cnt' (4-nibl FP-10)
0473    0000                                      ;    DSCF=EXP,Z,Y,X = Z.YXx10^EXP
0474    0000                                      ;    (base10 exponent and 3-digit
0475    0000                                      ;    decimal mantissa).  Eg,
0476    0000                                      ;    0580 = 5.80E0 µR/cnt'.
0477    0000                                      ;    Above number assumes Geiger
0478    0000                                      ;    tube having 12 cpm/(mR/h).
0479    0000      RTCF    .EQU    $8              ;RaTe Conversion Factor in units
0480    0000                                      ;    of (µR/h)/(cnt'/RSI4 TOFPs),
```

```
0481  0000                                  ;     same format as DSCF. Eg,
0482  0000                                  ;     1208 = 2.08E1 if using 8192
0483  0000                                  ;     Hz instr. frequency with
0484  0000                                  ;     RSI_MN=2. RTCF varies
0485  0000                                  ;     inversely with RSI_MN.
0486  0000          E_GMDT   .EQU  $9       ;Geiger Mueller tube Dead-Time
0487  0000                                  ;     for counting loss correction
0488  0000                                  ;     in units of RSI4 TOFPs/cnt'=
0489  0000                                  ;     (1024 s)/(4 cnts)= 256 s/cnt
0490  0000                                  ;     (same form as E_DSAL except
0491  0000                                  ;     EXP16 is negative) eg, T =
0492  0000                                  ;     20 µs/cnt = 7.81E-8 256s/cnt
0493  0000                                  ;     = $1.4F/16^6 so DT_CM=A14F.
0494  0000                                  ;     E_GMDT varies inversely with
0495  0000                                  ;     RSI_MN.
0496  0000          CAL_DT   .EQU  $A       ;DaTe when last CALibrated with
0497  0000                                  ;     same format as ZER_DT
0498  0000          E_TARA   .EQU  $B       ;Total time with RATE≥RTAL in
0499  0000                                  ;     TOFPs (1/8 s), same format
0500  0000                                  ;     as E_DSAL       (&&&, 4/28/90)
0501  0000          E_DOSE   .EQU  $C       ;Current DOSE in cnt's, same
0502  0000                                  ;     format as E_DSAL (must mult-
0503  0000                                  ;     iply by DSCF to obtain µR).
0504  0000                                  ;     Eg, 5234=(2+3/16+4/256)x16^5
0505  0000                                  ;     cnt's = 5.8 x 2.31E6 =
0506  0000                                  ;     1.34E7 µR = 13.4 R
0507  0000          E_MXRT   .EQU  $D       ;Current MaX Dose-RaTe in cnt's/
0508  0000                                  ;     (RSI4 TOFPs), same format as
0509  0000                                  ;     E_DSAL (must multiply by
0510  0000                                  ;     RTCF to obtain µR/h)
0511  0000          SER_NO   .EQU  $E       ;2-Reg SAIC Unit SERial NO.,
0512  0000                                  ;     0≤SN<16^8
0513  0000
0514  0000                   .NSEG          ;--- Assembler Constants
0515  0000          BG_AVG   .EQU  2        ;1/10 x Average Terrestrial
0516  0000                                  ;     photon background in µR/h
0517  0000                                  ;     (BG_AVG=2 was consensus at
0518  0000                                  ;     10/02/90 Design Review)
0519  0000                                  ;                   (&&&, 4/20/90)
0520  0000          BLNK     .EQU  %1101    ;Icon BLiNK Control Bits:
0521  0000                                  ; BLNK.0: GAMMA ON/!ON during
0522  0000                                  ;           alternate DSPs
0523  0000                                  ; BLNK.1: DOSE  ON/!OFF     "
0524  0000                                  ; BLNK.2: BATT  ON/!OFF     "
0525  0000                                  ; BLNK.3: RATE/HVPS ON/!OFF "
0526  0000                                  ;ICONS.n=ALRM.n&BLNK.n and BLNK
0527  0000                                  ;     are "XOR"ed with %1110 each
0528  0000                                  ;     DSP. BLNK.0 must be set for
0529  0000                                  ;     GAMMA-Event Indicator to
0530  0000                                  ;     work (BLNK=$B was consensus
0531  0000                                  ;     at 10/02/90 Design Review
0532  0000                                  ;     but changed with LCD Icon
0533  0000                                  ;     layout to $D) (&&&, 12/6/90)
0534  0000          CHRPLN   .EQU  6        ;CHiRP-Length in units of 7.8 ms
0535  0000                                  ;     (1/16 of a TOFP)
0536  0000          CYCL2    .EQU  2        ;The WARBLE consists of a 1st
0537  0000                                  ;     Beep at the 0th TOF and a
0538  0000                                  ;     2nd Beep during CYCL2 where
0539  0000                                  ;     CYCL2<PERIOD
0540  0000          E2EWEN   .EQU  %0011    ;NMC93C06 WRITE-ENABLE Instr.
0541  0000          E2EWDS   .EQU  %0000    ;NMC93C06 WRITE-DISABLE Instr.
0542  0000                                  ;                   (&&&, 4/17/90)
0543  0000          EE_RI    .EQU  %1000    ;NMC93C06 READ Instruction
0544  0000          EE_WI    .EQU  %0100    ;NMC93C06 WRITE Instruction
0545  0000          LIM12    .EQU  4        ;LIM12 is the cnt's/RSI limit
0546  0000                                  ;     for changing INTRVL from 1
0547  0000                                  ;     to 2 or from 2 to 1. See
0548  0000                                  ;     4/21/90 CODE CHANGES.
0549  0000                                  ;                   (&&&, 4/21/90)
0550  0000          LIM23    .EQU  1        ;LIM23 is the cnt's/RSI limit
```

```
0551  0000                                  ;   for changing INTRVL from 2
0552  0000                                  ;   to 3 or from 3 to 2.  See
0553  0000                                  ;   4/21/90 CODE CHANGES.
0554  0000                                  ;           (&&&, 4/21/90)
0555  0000         LSTNB2  .EQU  $2F        ;Last nibble of REG2
0556  0000         LSTNB7  .EQU  $7F        ;Last nibble of REG7
0557  0000         LSTREG  .EQU  $70        ;First nibble of last REG
0558  0000         PERIOD  .EQU  5          ;# of TOFPs in a WARBLE period
0559  0000         R_EXP   .EQU  4          ;R_EXP is the EXPonent of the
0560  0000                                  ;   smallest RAT_M/T-Value which
0561  0000                                  ;   will be DT-Corrected
0562  0000         R_MNT   .EQU  8          ;R_MNT is the MaNTissa of the
0563  0000                                  ;   smallest RAT_M/T-Value which
0564  0000                                  ;   will be DT-Corrected (eg, if
0565  0000                                  ;   R_MNT=8 and R_EXP=4, 8x16^4
0566  0000                                  ;   x RTCF is the lowest RATE
0567  0000                                  ;   corrected).  With RTCF=20,
0568  0000                                  ;   RATEdt is 10.5 R/h and
0569  0000                                  ;   varies inversely with RSI_MN
0570  0000                                  ;   (10/02/90 Design Review
0571  0000                                  ;   consensus was not to let
0572  0000                                  ;   uncorrected error exceed 5%)
0573  0000                                  ;           (&&&, 5/11/90)
0574  0000         RSI_MN  .EQU  2          ;MiNimum RSI in 0.125 s units.
0575  0000                                  ;   RSI_MN=1,2 are the only
0576  0000                                  ;   values that are safe from
0577  0000                                  ;   δCm overflow with a 32768 Hz
0578  0000                                  ;   clock.  RSI_MN=1,2,3,4 are
0579  0000                                  ;   usable with a 65536 Hz clock
0580  0000                                  ;   (RSI_MN=2 was consensus at
0581  0000                                  ;   10/02/90 Design Review).
0582  0000                                  ;           (&&&, 5/10/90)
0583  0000         SAMODE  .EQU  %1100      ;"Stand-Alone" MODE Code for
0584  0000                                  ;   COP472-3 LCD Display Driver
0585  0000
0586  0000         ;************** EEPROM DEFAULT VALUES ***************
0587  0000         ; E_DSAL=$343A   DSCF ≤ E_DSAL < 1000 R
0588  0000         ; E_RTAL=$3BBF   RTCF ≤ E_RTAL < 1000 R/h
0589  0000         ; E_INCP=$1AD0   DSCF ≤ E_INCP < 65536xDSCF ≈ 380 mR
0590  0000         ; E_PRSN=$DB28   δTbatt/BDGD/PRSNLY (0≤δTbatt≤9321 h)
0591  0000         ;   DSCF=$0580   Calibration Constant
0592  0000         ;   RTCF=$1208            "            "
0593  0000         ; E_GMDT=$A178            "            "
0594  0000         ;
0595  0000         ;Since the PD-1 does no internal limit checking, the PC
0596  0000         ;program which controls PD-1/PDR-1 Communications should
0597  0000         ;perform the limit checks and never allow values outside
0598  0000         ;the above limits to be downloaded to the PD-1.
0599  0000
0600  0000         ;----------------------- MODES -----------------------
0601  0000         ;
0602  0000         ;   Modes are selected with a pushbutton connected to
0603  0000         ;IN0.  When the MODE Pushbutton (PB) is pressed, the
0604  0000         ;PD-1 AUDIO Alarm is beeped and the LCD is blanked to
0605  0000         ;acknowledge the PB.  MODE-assignments are as follows:
0606  0000         ;
0607  0000         ;       MODE0 - Update LCD-DOSE every 7-8 Timer Overflows
0608  0000         ;       MODE1 - Update LCD-RATE every 7-8 TOFs.  RATE
0609  0000         ;               sampling interval is reset to INTRVL=0
0610  0000         ;               (RSI_MN TOFs) on entering MODE1
0611  0000         ;       MODE2 - Display DOSE ALARM LEVEL (DSAL) for 4
0612  0000         ;               DSPs (about 3 s), RATE ALARM LEVEL (RTAL)
0613  0000         ;               for 4 DSPs, LCD BIT for 8 DSPs, and then
0614  0000         ;               return to MODE0
0615  0000         ;       MODE3 - Communicate with the PDR-1 through serial
0616  0000         ;               link to upload/download data and to zero
0617  0000         ;               the PD-1.  MODE3 also allows the user to
0618  0000         ;               program PeRSoNaLitY bits and nibbles.
0619  0000         ;               This mode is not reachable via the PB and
0620  0000
```

```
0621 0000    ;                      can be activated only by the PDR-1.
0622 0000    ;
0623 0000    ;    In MODE2, the display holds for 16 DSPs and then
0624 0000    ;returns to DOSE display (MODE0).  If the switch is
0625 0000    ;pushed again while the PD-1 is still in MODE2, code
0626 0000    ;execution returns immediately to MODE0.  If enabled,
0627 0000    ;the DS-Alarm is disarmed and disabled by the next
0628 0000    ;closure of the switch (i.e., it cannot be enabled again
0629 0000    ;until rearmed by the PDR-1 via RESET or by interruption
0630 0000    ;of supply power).
0631 0000
0632 0000
0633 0000    ;------------------ OPTIONS SUMMARY -------------------
0634 0000    ;
0635 0000    ;Assembly Time Options:
0636 0000    ;    1. BG_AVGx10 µR/h is displayed for RATE for the two
0637 0000    ;       longest RSIs whenever cnt's/RSI=0.  "00.0" is
0638 0000    ;       still displayed for the two shorter RSIs when
0639 0000    ;       cnt's/RSI=0
0640 0000    ;    2. 1≤LIM12≤15 and 1≤LIM23≤15, RSI shift limits in
0641 0000    ;       cnt's/RSI for INTRVL=1,2 and INTRVL=2,3.  Eg, if
0642 0000    ;       LIM12=4 and RSI_MN=2,  the RSI will decrease from
0643 0000    ;       64 to 4 s if the data rate exceeds 4x16 cnt's/64s
0644 0000    ;       (4 cnts/s) and will increase from 4 to 64 s if
0645 0000    ;       the data rate is less than 4 cnt's/4s (4 cnts/s)
0646 0000    ;    3. RATEdt=RTCF x R_MNTx16^R_EXP is the mininum RATE-
0647 0000    ;       Value that will be Dead-Time corrected and
0648 0000    ;       probably should be chosen such that RATEdt is in
0649 0000    ;       the 5 to 10 R/h range where the DT-Correction is
0650 0000    ;       only a few percent
0651 0000    ;    4. 1≤RSI_MN≤2 is the mininum Rate Sampling Interval
0652 0000    ;       in TOFPs.  RSI_MN=1/2 for RSImin=.125/.250 s
0653 0000    ;
0654 0000    ;Programmable Options:
0655 0000    ;    1. BKGD should be considered a calibration
0656 0000    ;       coefficient rather than an option, and typically
0657 0000    ;       has a value of 2 for the Hamamatsu D3517-02 GMTs
0658 0000    ;       used in the PD-1                      (1 Nibble)
0659 0000    ;    2. TB_EXP and TB_MNT define the time interval to ASD
0660 0000    ;       after Low Battery voltage is detected in TOFP
0661 0000    ;       units.  Note that TB_EXP is a biased exponent
0662 0000    ;       such that δTbatt=TB_MNTx16^(TB_EXP-9)/8 s.
0663 0000    ;                                             (2 Nibbles)
0664 0000    ;    3. a) Option to Enable EEPROM updating at each RSI
0665 0000    ;       b) Option to Disable RATE Display Mode  (MODE1)
0666 0000    ;       c) Option to Disable Automatic Shut Down Feature
0667 0000    ;       d) Option to Enable Audio RATE Alarm
0668 0000    ;                                             (1 Nibble)
0669 0000
0670 0000
0671 0000    ;-------------- COP444C HARDWARE OPTIONS --------------
0672 0000    ;At the present time, these appear to be the proper
0673 0000    ;choices for the Production Model Pocket Dosimeter.
0674 0000    ;These are the same options specified for the β-units
0675 0000    ;except for Option 19 where we are removing the load
0676 0000    ;device to Vcc in favor of a Hi-Z input which gives us
0677 0000    ;control of the pulldown current via selection of the
0678 0000    ;pullup resistor.
0679 0000    ;
0680 0000    ;Option 1=0:  Ground Pin, no options available
0681 0000    ;       2=2:  CKO, Gen. Purp. input, load device to Vcc
0682 0000    ;       3=5:  CKI, external oscillator input /4
0683 0000    ;       4=1:  -RESET, Hi-Z input
0684 0000    ;       5 thru 8=0: L7:4 Drivers, Open-drain TRI-STATE
0685 0000    ;       9 thru 10=1: IN2:1, Hi-Z input
0686 0000    ;       12 thru 15=0: L3:0 Drivers, Open-drain TRI-STATE
0687 0000    ;       16=1: SI, Hi-Z input
0688 0000    ;       17=0: SO, Standard push/pull output
0689 0000    ;       18=0: SK, Standard push/pull output
0690 0000    ;       19=1: IN0, Hi-Z input (must also add 1 MΩ pullup
```

```
0691  0000    ;            to Vcc and reduce debouncing cap value to
0692  0000    ;            0.1 μF;                          &&&, 4/17/90)
0693  0000    ;   20=1:    IN3, Hi-Z input
0694  0000    ;   21 thru 24=2: G3:0 Drivers, Open-drain
0695  0000    ;   25 thru 28=0: D3:0 Drivers, Standard push/pull
0696  0000    ;   29=1:    No Internal initialization logic
0697  0000    ;   30=0:    Normal operation, no dual clock
0698  0000    ;   31=0:    Time-base counter
0699  0000    ;   32=0:    No Microbus
0700  0000    ;   33=0:    COP bonding, 28-pin package
0701  0000
0702  0000
0703  0000    ;$$$ PROGRAMMER'S NOTES $$$
0704  0000    ;
0705  0000    ;    Remember that the stack consists of only three
0706  0000    ;registers so subroutine calls can be nested three deep
0707  0000    ;when IRQs are disabled and only two deep when IRQs are
0708  0000    ;enabled.  Don't forget that MOV Q,@(A@B) [LQID] pushes
0709  0000    ;the stack and don't call a subroutine from within an
0710  0000    ;ISR because it will hammer the saved skip status.
0711  0000    ;    The character-string, (?.?), denotes code that is
0712  0000    ;sensitive to variable positions in the Memory Map and
0713  0000    ;difficult to find.  So, when the MM is changed, some of
0714  0000    ;these instructions may have to be altered slightly.
0715  0000    ;They can easily be found using the string-search
0716  0000    ;utility of a text editor.
0717  0000    ;    (@@@) denotes code that will not be necessary when
0718  0000    ;COP444Cs are substituted for the COP444CP emulators.
0719  0000    ;(&&&) denotes changes made to hardware/firmware after
0720  0000    ;code for the β-site test units was finalized.
0721  0000    ;-------- PROTOCOLS for PD-1/PDR-1 COMMUNICATIONS --------
0722  0000    ;
0723  0000    ;    The PDR-1 signals the PD-1 to enter I/O Mode (MODE3)
0724  0000    ;by asserting a low logic level (ie, a binary zero) at
0725  0000    ;its serial input port (by driving both input electrodes
0726  0000    ;in phase).  Since the PD-1 polls its input port (SI)
0727  0000    ;once per DSP (DiSplay Period, ≈800 ms), on the average
0728  0000    ;it will take about 400 ms for the PD-1 to recognize
0729  0000    ;that the PDR-1 is sending the signal.  After the PD-1
0730  0000    ;detects the first Null-Nibble (NN=%0000), it goes into
0731  0000    ;a loop looking for 15 more consecutive NNs.  Detection
0732  0000    ;of a single 1-Bit prior to the 16th NN causes the PD-1
0733  0000    ;to return to MAIN program execution.  Reception of 16
0734  0000    ;NNs takes about 55 ms making the PD-1 immune to EMI
0735  0000    ;and, in particular, to 50-60 cycle pickup.  If 16
0736  0000    ;consecutive NNs are detected, the PD-1 writes "I-O" to
0737  0000    ;the LCD and then transmits an Acknowledge Pulse (AP≥33
0738  0000    ;Baud periods of logic 1) on SO to inform the PDR-1 that
0739  0000    ;it has entered I/O Mode.  At the end of the AP, the
0740  0000    ;PD-1 tests SI once more: if SI=0 it begins transmitting
0741  0000    ;EEPROM register data to the PDR-1 and if SI<>0 it jumps
0742  0000    ;to the data reception routine.
0743  0000    ;
0744  0000    ;    The PD-1 first transmits EEPROM Register No.'s 11
0745  0000    ;thru 15 [TARA, DOSE, MAXRT, FACTORY S/N (2 Regs)].  It
0746  0000    ;will continue to transmit these 5 Regs in a loop until
0747  0000    ;SI<>0 at which point code execution returns to MAIN if
0748  0000    ;SI=1 or proceeds with uploading by write-enabling the
0749  0000    ;EEPROM, copying RAM values of DOSE, MAXRT and TARA into
0750  0000    ;the EEPROM and then transmitting all 16 EEPROM Regs
0751  0000    ;(if SI=1/2).  This loop will also be repeated until
0752  0000    ;SI<>0.  As before, code execution returns to MAIN if
0753  0000    ;SI=1 or jumps to the downloading routines if SI=1/2.
0754  0000    ;The EEPROM WEN instruction consists of a Start-Bit
0755  0000    ;(SB), a Command Nibble (#3) and a Don't Care Nibble
0756  0000    ;(DCN).  The RAM value of UPDATE is transmitted as the
0757  0000    ;DCN and the PDR-1 should pick up this Data Nibble (DN)
0758  0000    ;and save it since comparison of UPDATE.0 and PRGOPT.0
0759  0000    ;is the test for unauthorized battery removal.  If both
0760  0000    ;of these bits are set, it may be assumed that the
```

```
0761 0000
0762 0000
0763 0000
0764 0000
0765 0000
0766 0000
0767 0000
0768 0000
0769 0000
0770 0000
0771 0000
0772 0000
0773 0000
0774 0000
0775 0000
0776 0000
0777 0000
0778 0000
0779 0000
0780 0000
0781 0000
0782 0000
0783 0000
0784 0000
0785 0000
0786 0000
0787 0000
0788 0000
0789 0000
0790 0000
0791 0000
0792 0000
0793 0000
0794 0000
0795 0000
0796 0000
0797 0000
0798 0000
0799 0000
0800 0000
0801 0000
0802 0000
0803 0000
0804 0000
0805 0000
0806 0000
0807 0000
0808 0000
0809 0000
0810 0000
0811 0000
0812 0000
0813 0000
0814 0000
0815 0000
0816 0000
0817 0000
0818 0000
0819 0000
0820 0000
0821 0000
0822 0000
0823 0000
0824 0000
0825 0000
0826 0000
0827 0000
0828 0000
0829 0000
0830 0000
```

```
;battery has not been removed after UPDATE.0 was set by
;a PDR-1 (since the powerup routines would have cleared
;it).  If PRGOPT.0 is set and UPDATE.0 is clear, then it
;may be assumed that the battery was removed at least
;once.  If PRGOPT.0 is clear, then the automatic EEPROM
;updating option was not enabled and UPDATE.0 will
;necessarily be clear also.  So if UPDATE.0^PRGOPT.0=1,
;one may assume that the current EEPROM values of DOSE,
;MAXRT and TARA have significance; otherwise they can be
;ignored.
;
;    Each 4-Nibl Register transmission is preceded by a
;Start-Nibble consisting of 3 0-Bits followed by a
;single 1-Bit (the Start-Bit).  The SB is followed by an
;EEPROM control-byte (8 CBs), 10 Wait Bits (WBs), and
;then 4 Data-Nibls (4 DNs = 16 DBs).  Although the SB,
;CBs, WBs and DBs of an individual EEPROM Reg are
;transmitted synchronously, the individual Regs are
;transmitted asynchronously so the reader must re-
;synchronize on each SB.  This is required because the
;PD may need to service ISR and RATE routines between
;register transmissions.  After completion of data
;transmission, PD-1 code execution falls into the
;receive (downloading) routines.
;
;    Protocols for data reception are somewhat more
;complicated now than in the β-model firmware to reduce
;the probability of entering erroneous data into the
;EEPROM.  As before, when SI=0, the PD-1 sends 3 Ready-
;to-Receive-Nibls (RRNs = %0001,%1001,%0001) to which
;the PDR-1 must respond with 4 DNs (16 DBs).  This
;entire process is synchronous although there must be 10
;WBs between the RRNs and the DNs.  The DNs are moved to
;a temporary buffer and the process is then repeated
;(asynchronously): the PD-1 transmits 3 RRNs (%0001,
;%1101,%0001) to which the PDR-1 responds with 4 Valid-
;Communication-Nibls (VCNs).  If all four VCNs have the
;value, REG_NO+1 (where REG_NO is the current PD-1 value
;for the EEPROM Register No.), an EEPROM Write-Cycle is
;initiated.  If the EEPROM is currently "BUSY" with the
;last WRITE cycle, the program will loop until it's
;finished and then automatically initiate the next WRITE
;cycle.  If the EEPROM is not "BUSY" and has been
;clocked with a SB after completion of the most recent
;WRITE cycle (e.g., a READ command was issued), its
;output will be Tri-Stated and the PD-1 code execution
;will hang until the PDR-1 momentarily sets SI=1 (for
;about 16 Baud Periods) - this is the case for REG0.
;The PDR-1 now has the opportunity to eavesdrop on the
;EEPROM Write-Cycle and compare what the PD-1 writes
;with what the Reader instructed it to write.  As in
;uploading, transmission of individual registers is
;asynchronous and proceeds from REG0 to REG10 and then
;to REG11'= COMAND which is a program control code that
;is not written into the EEPROM.
;
;    If, for any value of REG_NO, one or more of the
;VCNs!=REG_NO+1, the PD-1 then compares each VCN to 12.
;If all 4 VCNs=12, the 1st DN is assumed to be COMAND
;and data reception is terminated.  Otherwise, data
;reception is terminated anyway and PD-1 code execution
;returns to MAIN with UPDATE.0=PRGOPT.0.  This permits
;the PDR-1 to update from 0 to 11 EEPROM registers and
;then terminate I/O with the option for RESET.  It also
;permits RESETting of the PD-1 without EEPROM updating.
;Finally, there is a simple path through the I/O
;routines which performs only the function, UPDATE.0 =
;PRGOPT.0.  This path can be used after RESET to enable
;the automatic EEPROM updating feature (if PRGOPT.0=1).
;
```

```
0831 0000   ;The COMAND-Value affects PD-1 branching as follows:
0832 0000   ;     COMAND(0)=%1001 causes a jump to RESET after I/O
0833 0000   ;     with UPDATE.0=0.  COMAND(1 thru 3) are ignored.
0834 0000   ;       Any other values for COMAND result in a jump to
0835 0000   ;       MAIN, MODE0 after I/O with UPDATE.0=PRGOPT.0.
0836 0000
0837 0000
0838 0000
0839 0000
0840 0000
0841 0000   ;------- THE SAIC/MPD POCKET DOSIMETER RATEMETER -------
0842 0000   ;
0843 0000   ;    The Pocket Dosimeter is an integrating ratemeter
0844 0000   ;primarily intended to provide an integrated dose value.
0845 0000   ;However, since the dose rates are available, it seemed
0846 0000   ;like a good idea to provide a mode where they could be
0847 0000   ;read by the user.  Note that the Geiger Tube sensitiv-
0848 0000   ;ity is relatively low [12 cpm/(mR/h) = 0.2 cps/(mR/h)]
0849 0000   ;to reduce dead time losses in high fields of several
0850 0000   ;hundred R/h so at low dose rates the RSI (Rate Sampling
0851 0000   ;Interval must be relatively long to accumulate enough
0852 0000   ;counts for acceptable statistics.  Eg, at 1 mR/h the
0853 0000   ;count rate is 0.2 cps which requires an RSI of 320 s to
0854 0000   ;acquire the 64 counts required for σ=12.5% statistics.
0855 0000   ;Also, note that there is a 2-bit hardware prescale
0856 0000   ;which causes all counts to be modulo-4 (e.g., the μP
0857 0000   ;reads 60, 64, 68, etc.)
0858 0000   ;
0859 0000   ;   In higher fields, the counts accumulate faster so
0860 0000   ;the RSI is automatically decreased to provide more
0861 0000   ;rapid time response.  To minimize code space, a simple
0862 0000   ;algorithm was used in the prototypes which worked as
0863 0000   ;follows (assuming that RSI_MN=1):
0864 0000   ;
0865 0000   ;    The RSI is preset at 2 s when RATE MODE is
0866 0000   ;    entered via the pushbutton.  The most recent dose
0867 0000   ;    rate value is continuously displayed during the
0868 0000   ;    2 s interval while new data is being accumulated.
0869 0000   ;    The count is tested every 125 ms and if it exceeds
0870 0000   ;    1023, the interval is decreased to 2/16=125 ms and
0871 0000   ;    the count is restarted.  Otherwise, the rate is
0872 0000   ;    computed and displayed at the end of 2 s.  If the
0873 0000   ;    total count is < 64, the RSI is increased from 2 to
0874 0000   ;    16x2=32 s; otherwise, the RSI remains at 2 s.  If
0875 0000   ;    the RSI was reduced to 125 ms due to high data rate,
0876 0000   ;    an intermediate value based on 1024 cnts and the 2 s
0877 0000   ;    RSI will be displayed for about 1 s while the
0878 0000   ;    correct rate is computed from the 125 ms sample.  In
0879 0000   ;    any case, a new dose rate value will be displayed
0880 0000   ;    within 2 to 3 s following entrance to RATE MODE.
0881 0000   ;
0882 0000   ;    Subsequent action of the algorithm is the same.
0883 0000   ;    If any total count exceeds 1023, an intermediate
0884 0000   ;    value based on 1024 counts and the present sampling
0885 0000   ;    time is computed and displayed, the interval is
0886 0000   ;    divided by 16, and the count is restarted (unless
0887 0000   ;    the interval is already 125 ms in which case it
0888 0000   ;    remains constant).  If any total count is less than
0889 0000   ;    64, the rate is computed and displayed but the
0890 0000   ;    interval is then multiplied by 16 to improve the
0891 0000   ;    statistics.  The maximum possible interval length is
0892 0000   ;    512 s.  Thus, the algorithm autoranges over the four
0893 0000   ;    intervals, (.125, 2, 32, 512) s, in an attempt to
0894 0000   ;    satisfy the inequality, 64 ≤ COUNT < 1024.
0895 0000   ;
0896 0000   ;NOTE:
0897 0000   ;   The algorithm described above was changed slightly
0898 0000   ;to improve time response (at the cost  of statistical
0899 0000   ;accuracy) during 4/90 (see CODE CHANGES) by lowering
0900 0000   ;the RSI shifting limits to 16 and 256 cnts (4 and 64
```

```
0901   0000       ;cnt's) for the two longest RSIs.  Thus, the new
0902   0000       ;algorithm autoranges over the four intervals,
0903   0000       ;RSI_MNx(.125, 2, 32, 512) s, in an attempt to satisfy
0904   0000       ;the inequality, LOLIM(INTRVL) ≤ COUNT < HILIM(INTRVL).
0905   0000       ;
0906   0000       ;    Time intervals whose ratios are all powers of 16 are
0907   0000       ;used to simplify the time division which is necessary
0908   0000       ;in the rate computation.  In a 4-bit system, the
0909   0000       ;divisions are accomplished by right-shifting nibbles.
0910   0000       ;The base interval (125 ms) is the overflow period of
0911   0000       ;the COP's internal timer.
0912   0000       ;
0913   0000       ;    If the PD-1 displays a rate of zero, it simply means
0914   0000       ;that bit-1 of the count has not rolled over into bit-2
0915   0000       ;during the past sampling period.  The hardware counters
0916   0000       ;are never reset (except at power-on or in response to a
0917   0000       ;reader command) so eventually, the accumulated count
0918   0000       ;must exceed 3 and a non-zero RATE reading will be
0919   0000       ;obtained (i.e., data-bits 1 and 2 exist in hardware,
0920   0000       ;they just aren't connected to CPU port pins).  The
0921   0000       ;table below shows the probabilities for displaying a
0922   0000       ;particular RATE-value for several different true rates.
0923   0000       ;It assumes that the Pocket Dosimeter has been powered
0924   0000       ;for a long enough time that the correlation with the
0925   0000       ;initial power-on counter-reset has vanished and that
0926   0000       ;the dose rate was present for the entire duration of
0927   0000       ;the 512 s sampling intervals.  It further assumes that
0928   0000       ;there are no non-radiation related GMT pulses and that
0929   0000       ;RTCF = 40 (μR/h)/(cnt'/512 s).
0930   0000       ;
```

| True RATE (μR/h) | Disp RATE 00.0 | 40.0 | 80.0 | 120 | 160 | 200 | 240 |
|---|---|---|---|---|---|---|---|
| 20  | .5270 | .4556 | .0173 |       |       |       |       |
| 50  | .1157 | .5699 | .2876 | .0262 | .0006 |       |       |
| 100 | .0039 | .1181 | .4183 | .3523 | .0963 | .0104 | .0005 |
| 200 | .0000 | .0004 | .0116 | .0932 | .2677 | .3345 | .2072 |

```
                  ;    If RSI_MN is increased to 2 so RSImax is 1024 s and
                  ;RTCF is decreased to 20 (μR/h)/(cnt'/1024 s), then
                  ;the corresponding probabilities are as follows:
```

| True RATE (μR/h) | Disp RATE 00.0 | 20.0 | 40.0 | 60.0 | 80.0 | 100 | 120 |
|---|---|---|---|---|---|---|---|
| 20  | .2037 | .6190 | .1699 | .0073 | .0001 |       |       |
| 50  | .0039 | .1181 | .4183 | .3523 | .0963 |       |       |
| 100 | .0000 | .0004 | .0116 | .0932 | .2677 | .3345 | .2072 |

```
                  ;PROBLEM: A user has an SAIC PD-1 in his pocket which is
                  ;            already in RATE MODE.  He has been working in
                  ;            an area where the background radiation levels
                  ;            are normal so the PD-1 is operating with an
                  ;            RSI of 512 s.  The user then enters contain-
                  ;            ment where the dose rate is 1 R/h.  How long
                  ;            will it take for the PD-1 to respond?
                  ;
                  ;  OLD       The audio alarm and visual icon will probably
                  ;ANSWER:     respond in about 5 s (depends on preset RATE
                  ;            ALARM level).  The RATE display will take
                  ;            somewhat longer because the following sequence
                  ;            of events will occur:
                  ;               1 R/h corresponds to 200 cnts/s.  It will
                  ;               therefore take at most 5.12 s to accumulate
```

```
0971 0000         ;              ≥1024 cnts at which time the PD-1 computes
0972 0000         ;              and displays a RATE estimate based on ≥1024
0973 0000         ;              cnts/512 s = 10 mR/h, decreases the RSI to
0974 0000         ;              32 s and begins the 32 s acquisition. The
0975 0000         ;              count will exceed 1023 in another 5.12 s at
0976 0000         ;              which time the PD-1 computes and displays a
0977 0000         ;              RATE estimate based on ≥1024 cnts/32 s =
0978 0000         ;              160 mR/h, decreases the RSI to 2 s and
0979 0000         ;              begins the 2 s acquisition. After 2 s, the
0980 0000         ;              PD-1 computes a true rate of 400 cnts/2 s
0981 0000         ;              (within the limits of statistics) and
0982 0000         ;              displays 1 R/h.
0983 0000         ;
0984 0000         ;   NEW        With the new limits for changing the RSI
0985 0000         ;ANSWER:       length described above in CODE CHANGES, the
0986 0000         ;              previous scenario becomes:
0987 0000         ;              1 R/h corresponds to 200 cnts/s. It will
0988 0000         ;              therefore take at most .32 s to accumulate
0989 0000         ;              64 cnts at which time the PD-1 computes and
0990 0000         ;              displays a RATE estimate based on ≥64
0991 0000         ;              cnts/1024 s = 320 µR/h, decreases the RSI
0992 0000         ;              to 64 s and begins the 64 s acquisition.
0993 0000         ;              The count will exceed 256 in 1.28 s at
0994 0000         ;              which time the PD-1 computes and displays
0995 0000         ;              a RATE estimate based on 256 cnts/64 s = 20
0996 0000         ;              mR/h, decreases the RSI to 4 s and begins
0997 0000         ;              the 4 s acquisition. After 4 s, the PD-1
0998 0000         ;              computes a true rate of 800 cnts/4 s
0999 0000         ;              (within the limits of statistics) and
1000 0000         ;              displays 1 R/h.
1001 0000         ;
1002 0000         ;
1003 0000         ;---------------- Dead Time Correction -----------------
1004 0000         ;    Code has been implemented to correct RATE for dead-
1005 0000         ;time losses at high RATEs. It is an exact
1006 0000         ;implementation of the simple Dead-Time Correction:
1007 0000         ;
1008 0000         ;               Rt = Rm/(1-Rmτ) .
1009 0000         ;
1010 0000         ;The associated true DOSE-Increment is given by
1011 0000         ;
1012 0000         ;   δDt = δDm/(1-Rmτ) = δDm x (1+Rtτ) = δDm + δDdt ,
1013 0000         ;
1014 0000         ;where sub-t, sub-m and sub-dt denote "true", "measured"
1015 0000         ;and "dead-time"; R=RATE, D=DOSE, and τ=Dead-time/count.
1016 0000         ;The last form is especially useful because δDm is the
1017 0000         ;uncorrected increment which automatically goes into the
1018 0000         ;dose accumulator so δDdt = δDmRtτ is the correction
1019 0000         ;which must be added.
1020 0000
1021 0000         ;------------------ PROGRAM SEQUENCE -------------------
1022 0000         ;    The code consists of a MAIN foreground program which
1023 0000         ;performs most of the basic tasks such as reading the
1024 0000         ;counter for the DOSE-Calculation, testing for alarm and
1025 0000         ;chirp conditions, writing to the LCD, etc. Calls to a
1026 0000         ;subroutine called CHKTIM are liberally sprinkled
1027 0000         ;through-out MAIN which controls synchronous tasks like
1028 0000         ;warbling the AUDIO Alarm and ensuring that the counters
1029 0000         ;are read at the proper times for the RATE-Calculation.
1030 0000         ;CHKTIM might be thought of as a background task. There
1031 0000         ;is also one external hardware interrupt input which is
1032 0000         ;tied to the MSb of the 14-Bit CD4020B ripple counter.
1033 0000         ;The ISR simply increments a RAM register to count
1034 0000         ;overflows and so, in conjunction with the CD4020B
1035 0000         ;outputs, forms a 4-Nibble accumulator for total uncor-
1036 0000         ;rected counts, δCm. This accumulator is read once each
1037 0000         ;DSP (0.8 s w/o DT-Cor and about 1.4-1.6 s w/ DT-Cor) so
1038 0000         ;that it cannot possibly overflow more than once between
1039 0000         ;DSPs. The counts are then added directly into a 7-Nibl
1040 0000         ;accumulator in RAM, and at high rates, a correction
```

```
1041  0000    ;term (δCdt) is computed and added at each DSP.
1042  0000    ;
1043  0000    ;    The following basic procedures performed by MAIN (in
1044  0000    ;order of execution) are marked in the code as follows:
1045  0000    ;
1046  0000    ;      "I."  - Update the LCD according to current MODE-
1047  0000    ;              value.  If DSPOPT.2=1, test the BATT-Alarm
1048  0000    ;              Flag (ALRM.2) and take appropriate action
1049  0000    ;              when the BATTery Voltage goes low.
1050  0000    ;
1051  0000    ;      "II." - Start a new RATE-Calculation if one is not
1052  0000    ;              currently in progress [ie, zero the TIME-
1053  0000    ;              Regs and save the current uncorrected count
1054  0000    ;              (Crate) so the incremental count and hence
1055  0000    ;              the RATE can be computed later when the RSI
1056  0000    ;              ends].  If a new RSI is started, write DOSE,
1057  0000    ;              MAXRT and TARA to EEPROM if UPDATE.0 is set.
1058  0000    ;
1059  0000    ;      "III."- Compute the incremental uncorrected dose
1060  0000    ;              (δCm) accumulated since the last DiSplay
1061  0000    ;              Period (DSP) by subtracting (Cm)old from
1062  0000    ;              Cm.  Add δCm (with appropriate background
1063  0000    ;              correction if INTRVL=3) to the Total-
1064  0000    ;              Corrected-Count (T_CNT) Buffer.
1065  0000    ;
1066  0000    ;      "IV." - Check FLAG.1 to see if the current RAT_M is
1067  0000    ;              a new one.  If not, then test the value of
1068  0000    ;              True RATE (RAT_T) and if RAT_T<16^EXLM then
1069  0000    ;              skip the entire DT-CORrection.  If RAT_M is
1070  0000    ;              a new value and RAT_M≥16^EXLM, then do
1071  0000    ;              RATE-COR, set FLAG.0=OLD, and update RAT_T.
1072  0000    ;              Otherwise, skip entire DT-COR.
1073  0000    ;
1074  0000    ;      "V."  - If the current value of RAT_T≥16^EXLM, then
1075  0000    ;              compute the dead-time losses associated with
1076  0000    ;              δCm (δCdt) and add δCdt to T_CNT.
1077  0000    ;
1078  0000    ;      "VI." - Compare RAT_T to MAXRT and set MAXRT=RAT_T
1079  0000    ;              if RAT_T>MAXRT.  Compare RAT_T to RTAL: set
1080  0000    ;              RATE-Alarm-Flag if RAT_T≥RTAL and add T_DSP
1081  0000    ;              to TARA.  Compare T_CNT to DSAL and set
1082  0000    ;              DOSE-Alarm-Flag if T_CNT>DSAL.  Also, issue
1083  0000    ;              an AUDIO-Chirp if T_CNT≥CHRP and update
1084  0000    ;              CHRP=CHRP+INCHRP.
1085  0000    ;
1086  0000    ;      "VII."- Check BATTery Voltage and HVPS Regulation
1087  0000    ;              and set flags accordingly for AUDIO and/or
1088  0000    ;              VISUAL Alarms.
1089  0000    ;
1090  0000    ;      "VIII."- Poll the Push-Button (PB) to determine if it
1091  0000    ;              was pushed by User.  If so, then permanently
1092  0000    ;              disarm the AUDIO DOSE-Alarm (if enabled) and
1093  0000    ;              increment the modulo-3 MODE Select Index.
1094  0000    ;              Also, reset the RSI to RSI_MN TOFs (.25 s
1095  0000    ;              for RSI_MN=2) if the MODE changed from 0 to
1096  0000    ;              1.  If the incremented MODE-Value is 3, then
1097  0000    ;              wrap it around to MODE=0.  If PB wasn't
1098  0000    ;              pressed, Look for 16 consecutive Null-
1099  0000    ;              Nibbles on SI (Serial In).  If found, enter
1100  0000    ;              I/O Mode (MODE3) and take additional PDR-1
1101  0000    ;              Read/Write instructions from SI.  Return to
1102  0000    ;              "IX." with MODE=0 at completion of I/O.
1103  0000    ;
1104  0000    ;      "IX." - Compute new values for the ICON Control
1105  0000    ;              Bits so, if enabled, they flash on alternate
1106  0000    ;              DSPs.
1107  0000    ;
1108  0000    ;      "X."  - Jump to and perform the selected MODE-Task
1109  0000    ;              as determined by the current MODE-Value.
1110  0000    ;              Return to MAIN when MODE-Task is complete
```

```
1111  0000      ;                and repeat the cycle.
1112  0000
1113  0000
1114  0000
1115  0000
1116  0000
1117  0000
1118  0000
1119  0000
1120  0000
1121  0000
1122  0000
1123  0000
1124  0000
1125  0000
1126  0000
1127  0000
1128  0000
1129  0000
1130  0000
1131  0000
1132  0000
1133  0000
1134  0000
1135  0000
1136  0000
1137  0000
1138  0000
1139  0000
1140  0000
1141  0000      ;--------- CODE CHANGES (as of latest date) -----------
1142  0000
1143  0000      ; 04/17/90 - Changed NMC93C06 EEPROM WRITE-Enabling so
1144  0000      ;            it is Write-enabled only during WRITE-
1145  0000      ;            Operations in I/O Mode.  This was done to
1146  0000      ;            reduce probability of hammering EEPROM
1147  0000      ;            contents during Vbatt and Vcc transients.
1148  0000      ;            Also, changed from EEPROM to COP472-3 ENBL
1149  0000      ;            for generation of CD4020B Reset Pulse so
1150  0000      ;            EEPROM is not chip enabled during powerup.
1151  0000      ;            This code modification must be accompanied
1152  0000      ;            by an associated hardware change.
1153  0000
1154  0000      ; 04/19/90 - Incorporated subtraction of spurious GMT
1155  0000      ;            pulse contributions from both RATE and DOSE
1156  0000      ;            calculations.  If INTRVL=3 (maximum RSI)
1157  0000      ;            at the end of an RSI, BKGD is subtracted
1158  0000      ;            from D_RT before calculating the new RATE-
1159  0000      ;            value (but D_RT≥0); it is also loaded into
1160  0000      ;            BG_ER.  At each DSP for which D_DSxBG_ER>0,
1161  0000      ;            D_DS and BG_ER are decremented.  This
1162  0000      ;            strategy prevents the displayed DOSE-value
1163  0000      ;            from ever decreasing.  BKGD is a program-
1164  0000      ;            mable EEPROM constant with typical values
1165  0000      ;            in the range 0≤BKGD≤5 (BKGD increases with
1166  0000      ;            RSI_MN).
1167  0000
1168  0000      ; 04/20/90 - Modified RATE-routine so displayed values
1169  0000      ;            cannot be less than 10 x BG_AVG μR/h where
1170  0000      ;            BG_AVG is an assembler constant.  This
1171  0000      ;            modification is active only for the longest
1172  0000      ;            two RSIs (2≤INTRVL≤3).
1173  0000
1174  0000      ; 04/21/90 - Changed criterion for shifting the length
1175  0000      ;            of the RSI.
1176  0000      ;            The original cnt'-limits were as follows:
1177  0000      ;              0≤D_RT<256,         INTRVL=3   (512,1024 s)
1178  0000      ;              16≤D_RT<256,        INTRVL=2   (32,64 s)
1179  0000      ;              16≤D_RT<256,        INTRVL=1   (2,4 s)
1180  0000      ;              16≤D_RT,            INTRVL=0   (1/8,1/4 s)
```

```
1181  0000   ;
1182  0000   ;              The new limits are as follows:
1183  0000   ;              0≤D_RT<16xLIM23,      INTRVL=3    (512,1024 s)
1184  0000   ;              LIM23≤D_RT<16xLIM12,  INTRVL=2    (32,64 s)
1185  0000   ;              LIM12≤D_RT<256,       INTRVL=1    (2,4 s)
1186  0000   ;              16≤D_RT,              INTRVL=0    (1/8,1/4 s)
1187  0000   ;
1188  0000   ;              where the listed RSIs assume that RSI_MN=
1189  0000   ;              1,2. LIM12/LIM23 are assembler constants.
1190  0000   ; 05/26/90 - Provided capability for LIM12<>LIM23.
1191  0000
1192  0000   ; 04/26/90 - Incorporated PRGOPT.3 as a personality
1193  0000   ;              control bit to enable/disable audio rate
1194  0000   ;              alarm. PRGOPT.3=1/0 to ENABLE/!DISABLE
1195  0000   ;              audio. The visual alarm (blinking RATE
1196  0000   ;              Icon) is not affected but the RATE Icon
1197  0000   ;              blinks during MODE2 LCD-BIT if PRGOPT.3=0.
1198  0000
1199  0000   ; 04/28/90 - Incorporated TARA (Time Above Rate Alarm)
1200  0000   ;              feature. The value, E_TARA is written to
1201  0000   ;              EEPROM with E_DOSE and E_MXRT and is in
1202  0000   ;              units of TOFPs. Conversion to time is
1203  0000   ;              accomplished as T=TOFPxINT(E_TARA) s.
1204  0000
1205  0000   ; 05/04/90 - Modified method for clearing CHIRP windup.
1206  0000   ;              Previously, CHIRP windup (persistence of
1207  0000   ;              DOSE-Increment BEEPS after removal from
1208  0000   ;              high radiation field) was cleared on next
1209  0000   ;              closure of MODE-PushButton. Now, windup is
1210  0000   ;              nulled at each DSP. Average BEEP intervals
1211  0000   ;              are still accurate for RATE ≤ INCHRP/DSP.
1212  0000
1213  0000   ; 05/05/90 - Modified procedure for writing DOSE, MAXRT,
1214  0000   ;              and TARA to EEPROM. Previously, they were
1215  0000   ;              copied from RAM to EEPROM on entering I/O
1216  0000   ;              MODE. Now, they are copied to EEPROM only
1217  0000   ;              on command from the PDR-1 (see PROTOCOLS
1218  0000   ;              for PD-1/PDR-1 COMMUNICATIONS) or at start
1219  0000   ;              of ASDP (Automatic Shut Down Procedure)
1220  0000   ;              which is enabled when PRGOPT.2=1.
1221  0000
1222  0000   ; 05/06/90 - Incorporated PRGOPT.2 as a personality
1223  0000   ;              control bit to enable/disable ASDP when low
1224  0000   ;              battery voltage is detected. If PRGOPT.2
1225  0000   ;              is clear and the PD-1 has detected !BATTLO
1226  0000   ;              during 8 consecutive DSPs, it initiates the
1227  0000   ;              ASDP by copying RAM-Values of DOSE, MAXRT
1228  0000   ;              and TARA to EEPROM and clearing the TARA
1229  0000   ;              Registers so they can be used as the δTbatt
1230  0000   ;              timer. The PD-1 displays a solid "BATT"
1231  0000   ;              Icon on LCD until TARA≥δTbatt at which
1232  0000   ;              point it blanks the LCD except for "BATT"
1233  0000   ;              and enters an infinite do-nothing loop.
1234  0000   ;              "BATT" will typically show for another 2 to
1235  0000   ;              4 days until the battery is almost totally
1236  0000   ;              discharged. δTbatt derives from PRSNLY(1)=
1237  0000   ;              TB_EXP and PRSNLY(2)=TB_MNT (programmable
1238  0000   ;              EEPROM constants) according to δTbatt =
1239  0000   ;              TB_MNTx16^(TB_EXP-9). Eg, if TB_EXP = $D
1240  0000   ;              and TB_MNT = $A, then δTbatt = 10x16^4
1241  0000   ;              TOFPs = 655360/8 s = 22.7 h ≈ 1 day.
1242  0000
1243  0000   ; 05/09/90 - Entering MODE1 (RATE) now resets INTRVL to
1244  0000   ;              0 rather than 1 to avoid the erroneously
1245  0000   ;              low RATE estimate that was displayed at
1246  0000   ;              high rates when the PD-1 automatically
1247  0000   ;              shifts to INTRVL=0 after 16xLIMIT is
1248  0000   ;              exceeded during the INTRVL=1 RSI.
1249  0000
1250  0000   ; 05/10/90 - Removed RSI_MN from PRSNLY and made it an
```

```
1251 0000    ;            assembler constant.  RSI_MN should be set
1252 0000    ;            to either 1 or 2 during assembly.
1253 0000
1254 0000    ; 05/11/90 - Added R_MNT (an assembler constant) to
1255 0000    ;            provide finer control of RATE-Limit for DT-
1256 0000    ;            Correction.  RATEdt is now R_MNTx16^R_EXP x
1257 0000    ;            RTCF.  R_EXP and R_MNT should be set for
1258 0000    ;            maximum uncorrected RATEs of ≈ 10 R/h where
1259 0000    ;            there is about a 5% DT-loss if GM_DT=25 μs.
1260 0000
1261 0000    ; 05/13/90 - Incorporated PRGOPT.0 (EEPROM) and UPDATE.0
1262 0000    ;            (RAM) as control bits to enable updating of
1263 0000    ;            EEPROM at beginning of each RSI with RAM-
1264 0000    ;            Values of DOSE, MAXRT, and TARA (TARA is
1265 0000    ;            written only if ASD is not pending).  If
1266 0000    ;            PRGOPT.0 is set on exit from I/O Mode, then
1267 0000    ;            UPDATE.0 is also set.  UPDATE.0 can only be
1268 0000    ;            set by the PDR-1 and will remain set only
1269 0000    ;            as long as the PD-1's power is continuous.
1270 0000    ;            If the PD-1's battery is removed, EEPROM
1271 0000    ;            updating is automatically disabled since
1272 0000    ;            UPDATE.0 will be cleared during POWER-ON
1273 0000    ;            RESET, thus preserving the last DMT values
1274 0000    ;            (prior to battery removal) in the EEPROM.
1275 0000
1276 0000    ; 05/15/90 - Incorporated PRGOPT.1 as a personality
1277 0000    ; 10/09/90   control bit to DISABLE/!ENABLE the RATE
1278 0000    ;            Display Mode (MODE1).  All RATE functions
1279 0000    ;            of the PD-1 are performed regardless of the
1280 0000    ;            value of PRGOPT.1 (eg, RATE Alarm, Time
1281 0000    ;            Above Rate Alarm, etc.).  However, when the
1282 0000    ;            MODE PushButton is pressed to advance the
1283 0000    ;            PD-1 from DOSE Mode (MODE=0) to RATE Mode
1284 0000    ;            (MODE=1), MODE is automatically incremented
1285 0000    ;            again if PRGOPT.1=1; thus, the PD-1 skips
1286 0000    ;            directly to MODE2 (Display Alarm levels and
1287 0000    ;            LCD BIT).
1288 0000
1289 0000    ; 05/20/90 - Rearranged the order in which CD4020 and
1290 0000    ;            CNTR Regs are read.  CNTR is now read last
1291 0000    ;            to allow time for a pending IRQ to be
1292 0000    ;            serviced.  The problem occurred when the
1293 0000    ;            CD4020 was disabled just as its MSb rolled
1294 0000    ;            over - if CNTR was read before the ISR
1295 0000    ;            increments CNTR, the value on the CD4020
1296 0000    ;            pins was inconsistent with CNTR and the
1297 0000    ;            apparent δC was in error by about 16^4.
1298 0000    ;            The probability of occurrence of this
1299 0000    ;            problem was rate dependent and occurred
1300 0000    ;            about twice an hour at 500 R/h.
1301 0000
1302 0000    ; 05/22/90 - Inserted double MOV EN,#? instructions to
1303 0000    ;            disable IRQs for the case where IRQ occurs
1304 0000    ;            while 1st disable instruction is being
1305 0000    ;            executed which results in reenabling of
1306 0000    ;            IRQs by the MOV EN,#2 instruction at the
1307 0000    ;            end of the ISR.
1308 0000
1309 0000    ; 10/02/90 - Design Review with attendees including
1310 0000    ;            Rob Benson, Dan Dehaan, Dave DeLesdenier,
1311 0000    ;            Lew Devigili, Ken Valentine, John Wettroth,
1312 0000    ;            and Jim Winso.  Resulting code changes are
1313 0000    ;            flagged with this date.  As a result of
1314 0000    ;            this meeting, the following changes were
1315 0000    ;            implemented:
1316 0000    ;
1317 0000    ;            1. Default background set at 20 μR/h
1318 0000    ;            2. Rate displayed with 3 Significant Digits
1319 0000    ;            3. "BATT" Icon stays on during ASDP even if
1320 0000    ;               battery voltage recovers (non-blinking)
```

```
1321  0000   ;
1322  0000   ;
1323  0000   ;
1324  0000   ;
1325  0000   ;
1326  0000
1327  0000   ;
1328  0000   ;
1329  0000   ;
1330  0000   ;
1331  0000   ;
1332  0000   ;
1333  0000   ;
1334  0000   ;
1335  0000   ;
1336  0000   ;
1337  0000   ;
1338  0000   ;
1339  0000   ;
1340  0000   ;
1341  0000
1342  0000   ;
1343  0000   ;
1344  0000
1345  0000   ;
1346  0000   ;
1347  0000   ;
1348  0000   ;
1349  0000   ;
1350  0000   ;
1351  0000   ;
1352  0000   ;
1353  0000   ;
1354  0000
1355  0000   ;
1356  0000   ;
1357  0000   ;
1358  0000   ;
1359  0000   ;
1360  0000   ;
1361  0000   ;
1362  0000   ;
1363  0000   ;
1364  0000   ;
1365  0000   ;
1366  0000   ;
1367  0000   ;
1368  0000   ;
1369  0000   ;
1370  0000   ;
1371  0000   ;
1372  0000   ;
1373  0000   ;
1374  0000   ;
1375  0000   ;
1376  0000   ;
1377  0000   ;
1378  0000   ;
1379  0000   ;
1380  0000   ;
1381  0000   ;
1382  0000   ;
1383  0000   ;
1384  0000   ;
1385  0000   ;
1386  0000   ;
1387  0000   ;
1388  0000   ;
1389  0000   ;
1390  0000   ;
```

4. LCD is blanked after ASD except for non-blinking "BATT" Icon
    5. Backlight should be AC coupled (this was tested and rejected by K. Valentine and J. Winso on or about 11/1/90).

10/09/90 - Removed MODE3 (I/O Mode) as a Push-Button selectable mode. Now, only the PDR-1 can control entry into I/O Mode by sending the PD-1 a string of 16 consecutive 0's. The PD-1 responds by sending a positive ACKnowledge PuLSe that is at least 33 Baud periods wide. Also, during downloading, the PD-1 now expects the PDR-1 to suffix register data with 4 copies of the current Register No. (+1) to insure that PD-1/PDR-1 communications are reliable. The PD-1 will return to the MAIN program task without writing to the EEPROM unless all 4 of these Verify Communication Nibbles (VCNs) match.

10/14/90 - EEPROM Registers reassigned in order of decreasing write access frequency.

10/20/90 - The PD-1 now pulls its serial output low for the duration of the EEPROM Busy Test to serve as a PDR-1 sync pulse. If the PD-1's EEPROM is Tri-Stated, this test can't be passed until the PDR-1 asserts a 1 on the PD-1's serial input which it must do anyway in order to see this pulse. Also, the SPeCiaL Character Set was abbreviated to provide space for more code.

10/27/90 - The PD-1 now keeps track of the number of consecutive, 1024 s RSIs (NRSIo) for which D_RT=0 (no cnt's). When NRSIo=7, the PD-1 copies RAM values of DOSE, MAXRT and TARA to EEPROM, enables the Audio Alarm, and then enters an infinite do-nothing loop with the LCD blanked except for "GAMMA", "DOSE" and "RATE" Icons.
    Consider first the number of RSIs per year with D_RT=0. At background (and ignoring spurious cnts), the GMT provides 0.2 cps/(mR/h) x 0.02 mR/h = 0.004 cps so the mean during an interval of 1024 s is m=4.096. The maximum probability that the PD-1 will not see a cnt' (4 cnts) occurs when the prescaling register is empty at the start of the sampling interval and is P4=P(0)+P(1)+P(2)+P(3) where P(N) is the Poisson probability for N cnts. Thus, P4 = (m^0/0!+m^1/1!+m^2/2!+m^3/3!)exp(-m) = 0.4149. The average probability for no cnt's is <P> = (P1+P2+P3+P4)/4 = (0.0166+0.0848+0.2244+0.4149)/4 = 0.1852 where it has been assumed that initial prescaler contents of 0, 1, 2 or 3 cnts are all equally probable. Of the 30,797 RSIs/year, 0.1852x30797 = 5703 will result in D_RT=0 (the countdown sequence will be initiated 5703 times/year).
    Using similar reasoning and noting that probabilities for 0, 1, 2 or 3 prescaler cnts at the end of the first interval are 0.01405, 0.0856, 0.2750 and 0.6253, we now compute the probability that the next 6 RSIs (ie, the next 6144 s for which m=24.6) also produce no cnt's. The result is <P> =

```
1391 0000            ;              0.6253x2.072E-11+0.2750x5.304E-10+0.0856x
1392 0000            ;              6.799E-9+0.01405x5.820E-8 = 1.559E-9.
1393 0000            ;              Thus, the probability that a functional
1394 0000            ;              PD-1 will shutdown in one year is 1 -
1395 0000            ;              (1-1.559E-9)^5703 = 8.888E-6. With 1000
1396 0000            ;              functional PD-1s in the field, the
1397 0000            ;              probability for 1 shutdown per year is
1398 0000            ;              1-(1-8.891E-6)^1000 = 0.008851. Similarly,
1399 0000            ;              the probabilities for 10,000 and 100,000
1400 0000            ;              units are 0.08507 and 0.5890, respectively.
1401 0000            ;                  Note that when spurious GMT pulses are
1402 0000            ;              considered (m≈10 for 1 RSI and 60 for 6
1403 0000            ;              RSIs), these probabilities vanish. For
1404 0000            ;              example, using Hamamatsu D3517-02 GMTs,
1405 0000            ;              there are only 105 RSIs/year resulting in
1406 0000            ;              no cnt's and the probability for 1 shutdown
1407 0000            ;              per year out of 100,000 functional units is
1408 0000            ;              about 6.52E-17.
1409 0000            ;                  Also, removed 2nd MOV A,IL for latch
1410 0000            ;              debouncing. It didn't seem to be necessary
1411 0000            ;              and sometimes resulted in a PB closure
1412 0000            ;              being acknowledged but not serviced.
1413 0000
1414 0000            ; 10/31/90 - The PD-1 now transmits UPDATE as the 2nd
1415 0000            ;              nibble of the Command/Reg No. byte when it
1416 0000            ;              executes EE_WEN (EEPROM write enable). The
1417 0000            ;              PDR-1 can easily pick off this nibble which
1418 0000            ;              previously was a "don't care". UPDATE.0 is
1419 0000            ;              the flag for unauthorized battery removal
1420 0000            ;              and INT(UPDATE/2) is the current number of
1421 0000            ;              consecutive 1024 s RSIs which resulted in
1422 0000            ;              no cnt's (see 10/27/90).
1423 0000
1424 0000            ; 12/01/90 - Reduced the number of consecutive SIO
1425 0000            ;              values required for I/O-Task branching from
1426 0000            ;              16 to 4 to shorten I/O-Task execution time.
1427 0000            ;              16 consecutive values of SIO=0 are still
1428 0000            ;              required to cause the PD-1 to enter MODE3.
1429 0000
1430 0000            ; 12/06/90 - Changed the assembler constant, BLiNK, from
1431 0000            ;              $B to $D (%1011 to %1101) to accommodate
1432 0000            ;              the new LCD Icon design which employs a
1433 0000            ;              battery symbol to the right of the "RATE"
1434 0000            ;              and "DOSE" Icons rather than "BATT" between
1435 0000            ;              the "RATE" and "DOSE" Icons. Thus, the
1436 0000            ;              "RATE" and "DOSE" Icons will flash
1437 0000            ;              alternately (180° out of phase) and the
1438 0000            ;              battery symbol will flash in phase with
1439 0000            ;              "RATE".
1440 0000
1441 0000                    .CSEG
1442 0000                    .ORG $000        ;Reset at PROM-Adr $000
1443 0000            ;*********************************************************
1444 0000            ;*********** ONE-TIME INITIALIZATION CODE ***********
1445 0000            ;*********************************************************
1446 0000            ;Initialize the D-PORT (External Hardware Control) and
1447 0000            ;Serial Port, clear all 128 nibbles of RAM, and copy
1448 0000            ;E_DSAL, E_RTAL, E_INCP, E_GMDT, and E_PRSN to RAM.
1449 0000            ;
1450 0000 00         RESET:  CLR   A          ;1st byte of code must be CLR A
1451 0001            ;       MOV   G,#%0000   ;Write 0's to all G-PORT outputs
1452 0001                                     ;...to insure that no coupling
1453 0001                                     ;...diodes are forward biased.
1454 0001                                     ;...Don't need this instruction
1455 0001                                     ;...with COP444Cs          (@@@)
1456 0001 335F       MOV   G,#%1111           ;Write 1's to all G-PORT outputs
1457 0003                                     ;...to reduce their input load.
1458 0003                                     ;...Don't need this instruction
1459 0003                                     ;...with COP444CPs
```

```
1460  0003 38          MVSK B,#D_REG      ;B-->D_REG
1461  0004 06          XCH  @B^#0         ;D_REG=ACC=0 (for warm RESET)
1462  0005 92          ACAL DPRT_R        ;Disable all external functions,
1463  0006                                ;...returns C=0
1464  0006 4F          XCH  SIO,C         ;Turn off SK-Clock
1465  0007 38          MVSK B,#D_REG      ;B-->D_REG        (&&&b, 4/17/90)
1466  0008 4D          SET  @B.0          ;Set COP472-3 LCD Driver
1467  0009                                ;...Enable-bit
1468  0009 92          ACAL DPRT_R        ;Enable the COP472-3 and
1469  000A                                ;...generate CD4020B ReSeT.
1470  000A 6936        CALL DS_472        ;Disable the COP472-3 Driver and
1471  000C                                ;...terminate RST.  IRQs enabled
1472  000C                                ;...on return so if RST pulse
1473  000C                                ;...generated an IRQ, it's
1474  000C                                ;...serviced before clearing RAM
1475  000C                                ;...             (&&&e, 4/17/90)
1476  000C 33F0        MVSK B,#LSTREG     ;B-->first nibble of LSTREG
1477  000E 80    LOOP1: ACAL ZERO         ;Clear entire register
1478  000F 12          XCH  BR            ;Get Reg Select in ACC
1479  0010 5F          ADSK #$F           ;Decrement Reg Select
1480  0011 D4          AJMP ALLCLR        ;  Done if no Carry (ACC=$F)
1481  0012 12          XCH  BR            ;Restore Reg Select
1482  0013 CE          JMP  LOOP1         ;Clear Regs LSTREG thru 0
1483  0014 B2   ALLCLR: ACAL LD_NDS       ;COUNT-Enable the CD4020B
1484  0015       ;
1485  0015       ;---------------- Copy E_DSAL into RAM -----------------
1486  0015 00   EE2RAM: CLR  A
1487  0016 51          ADSK #E_DSAL       ;ACC=EEPROM Reg No. of E_DSAL
1488  0017 AC          ACAL EE_RD         ;Lod E_PRSN from EEPROM to IOBUF
1489  0018 33E4        MVSK B,#DSAL       ;B-->DSAL(0)
1490  001A A6          ACAL CPY_IO        ;Copy IOBUF to DSAL
1491  001B       ;
1492  001B       ;---------------- Copy E_RTAL into RAM -----------------
1493  001B 00          CLR  A
1494  001C 52          ADSK #E_RTAL       ;ACC=EEPROM Reg No. of E_RTAL
1495  001D AC          ACAL EE_RD         ;Lod E_RTAL from EEPROM to IOBUF
1496  001E 3384        MVSK B,#RTAL       ;B-->RTAL(0)
1497  0020 A6          ACAL CPY_IO        ;Copy IOBUF to RTAL
1498  0021       ;
1499  0021       ;---------------- Copy E_INCP into RAM -----------------
1500  0021 00          CLR  A
1501  0022 53          ADSK #E_INCP       ;ACC=EEPROM Reg No. of E_INCP
1502  0023 AC          ACAL EE_RD         ;Lod E_INCP from EEPROM to IOBUF
1503  0024 22          SET  C             ;Set C for MATH Target-Buffer
1504  0025 B0          ACAL MV_FPH        ;Position IOBUF in MATH-Buffer
1505  0026 28          MVSK B,#MATH       ;B-->MATH(0)
1506  0027 A8          ACAL CPY2IO        ;Copy integer version of E_INCP
1507  0028                                ;...into IOBUF
1508  0028 33D4        MVSK B,#INCHRP     ;B-->INCHRP(0)
1509  002A A6          ACAL CPY_IO        ;Copy IOBUF to INCHRP
1510  002B       ;
1511  002B       ;---------------- Copy E_GMDT into RAM -----------------
1512  002B 00          CLR  A
1513  002C 59          ADSK #E_GMDT       ;ACC=EEPROM Reg No. of E_GMDT
1514  002D AC          ACAL EE_RD         ;Lod E_GMDT from EEPROM to IOBUF
1515  002E 33F4        MVSK B,#GM_DT      ;B-->GM_DT(0)
1516  0030 A6          ACAL CPY_IO        ;Copy IOBUF to GM_DT
1517  0031       ;
1518  0031       ;---------------- Copy E_PRSN into RAM -----------------
1519  0031 00          CLR  A
1520  0032 54          ADSK #E_PRSN       ;ACC=EEPROM Reg# of PeRSoNality
1521  0033 AC          ACAL EE_RD         ;Lod E_PRSN from EEPROM to IOBUF
1522  0034 33C1        MVSK B,#PRSNLY     ;B-->PRSNLY(0) (Pocket Dosimeter
1523  0036                                ;...PeRSoNaLiTy Constants)
1524  0036 A6          ACAL CPY_IO        ;Copy IOBUF to PRSNLY
1525  0037       ;---------------- Initialize FLSH to BLNK --------------
1526  0037 33D8        MVSK B,#FLSH       ;B-->FLSH         (&&&b, 4/19/90)
1527  0039 7D          MOVI @B,#BLNK      ;FLSH=BLNK        (&&&e, 4/19/90)
1528  003A 230A        MOV  A,MODE        ;ACC=MODE
1529  003C 5F          ADSK #$F           ;Skip if a JMP from IO_TSK
1530  003D                                ;...(MODE>0)      (&&&, 5/05/90)
```

```
1531  003D 64CE              JMP   MAIN1        ;   Jump to main program loop
1532  003F 67F9              JMP   BK2IO        ;Jump back to IO_TSK
1533  0041
1534  0041 44                NOP                ;NOP to adjust page boundaries
1535  0042
1536  0042         ;***********************************************************
1537  0042         ;******** COPY (SOURCE-->DESTINATION) ROUTINES *********
1538  0042         ;***********************************************************
1539  0042         ;
1540  0042         ;*********** COPY IOBUF into @B,@(B+3) ***********
1541  0042         ;INT*4-->INT*4 or FP*4-->FP*4: Call with B pointing at
1542  0042         ;LSN (INT*4) or EXP (FP*4) of DESTINATION.  SOURCE
1543  0042         ;remains intact.
1544  0042         ;
1545  0042 231C    COPYIO: MOV   A,IOBUF      ;ACC=IOBUF(0)
1546  0044 04              XISK  @B^#0        ;@B=ACC, B-->@(B+1)
1547  0045 231D            MOV   A,IOBUF+1    ;ACC=IOBUF(1)
1548  0047 04              XISK  @B^#0        ;@(B+1)=ACC, B-->@(B+2)
1549  0048 231E            MOV   A,IOBUF+2    ;ACC=IOBUF(2)
1550  004A 04              XISK  @B^#0        ;@(B+2)=ACC, B-->@(B+3)
1551  004B 231F            MOV   A,IOBUF+3    ;ACC=IOBUF(3)
1552  004D 06      EXCHNG: XCH   @B^#0        ;@(B+3)=ACC
1553  004E 6332    J_CKT1: JMP   CK_TIM       ;Service RATE-Task if necessary
1554  0050                                    ;...and RETurn
1555  0050
1556  0050         ;*********** COPY MATH+3,6 into @B,@(B+3) *************
1557  0050         ;INT*4-->INT*4 or FP*4-->FP*4: Call with B pointing at
1558  0050         ;LSN (INT*4) or EXP (FP*4) of DESTINATION.  SOURCE
1559  0050         ;remains intact.
1560  0050         ;
1561  0050 232C    CPY_M3: MOV   A,MATH+3     ;ACC=MATH(3)
1562  0052 04              XISK  @B^#0        ;@B=ACC, B-->@(B+1)
1563  0053 232D    CPY_M4: MOV   A,MATH+4     ;ACC=MATH(4)
1564  0055 04              XISK  @B^#0        ;@(B+1)=ACC, B-->@(B+2)
1565  0056 232E            MOV   A,MATH+5     ;ACC=MATH(5)
1566  0058 04              XISK  @B^#0        ;@(B+2)=ACC, B-->@(B+3)
1567  0059 232F            MOV   A,MATH+6     ;ACC=MATH(6)
1568  005B CD              JMP   EXCHNG       ;@(B+3)=ACC, Service RATE-Task
1569  005C                                    ;...if necessary and RETurn
1570  005C
1571  005C         ;************** COPY @B,@(B+3) into IOBUF **************
1572  005C         ;INT*4-->INT*4 or FP*4-->FP*4: Call with B pointing at
1573  005C         ;LSN (INT*4) or EXP (FP*4) of SOURCE.  SOURCE remains
1574  005C         ;intact.
1575  005C         ;
1576  005C 05      CPTOIO: MOV   A,@B^#0      ;ACC=@B
1577  005D 04              XISK  @B^#0        ;B-->@(B+1)
1578  005E 239C            XCH   IOBUF        ;IOBUF(0)=ACC
1579  0060 05              MOV   A,@B^#0      ;ACC=@(B+1)
1580  0061 04              XISK  @B^#0        ;B-->@(B+2)
1581  0062 239D            XCH   IOBUF+1      ;IOBUF(1)=ACC
1582  0064 05              MOV   A,@B^#0      ;ACC=@(B+2)
1583  0065 04              XISK  @B^#0        ;B-->@(B+3)
1584  0066 239E            XCH   IOBUF+2      ;IOBUF(2)=ACC
1585  0068 05              MOV   A,@B^#0      ;ACC=@(B+3)
1586  0069 239F            XCH   IOBUF+3      ;IOBUF(3)=ACC
1587  006B CE              JMP   J_CKT1       ;Service RATE-Task if necessary
1588  006C                                    ;...and RETurn
1589  006C
1590  006C         ;******** COPY @B,@(B+6) into @(B^1),@[(B+6)^1] ********
1591  006C         ;Call with B pointing at LSN (integer) or EXP (FP) of
1592  006C         ;SOURCE.  Data is copied so SOURCE remains intact.  The
1593  006C         ;Reg No. of DST is (SOURCE-Br)^1.
1594  006C         ;
1595  006C 15      CPYXR1: MOV   A,@B^#1      ;ACC=SRC(i), B-->DST(i)
1596  006D 14              XISK  @B^#1        ;DST(i)=ACC, B-->SRC(i+1)
1597  006E EC              JMP   CPYXR1       ;   Copy down to REG15
1598  006F CE              JMP   J_CKT1       ;Service RATE-Task if necessa'
1599  0070                                    ;...and RETurn
1600  0070
```

```
1601  0070         ;******** COPY @B,@(B+3) into @(B^3),@[(B+3)^3] ********
1602  0070         ;Call with B pointing at LSN (integer) or EXP (FP) of
1603  0070         ;SOURCE.  Data is copied so SOURCE remains intact.  The
1604  0070         ;Reg No. of DST is (SOURCE-Br)^3.
1605  0070         ;
1606  0070 35      CPYXR3: MOV  A,@B^#3      ;ACC=SRC(i), B-->DST(i)
1607  0071 34              XISK @B^#3        ;DST(i)=ACC, B-->SRC(i+1)
1608  0072 F0              JMP  CPYXR3       ;    Copy down to REG15
1609  0073 CE              JMP  J_CKT1       ;Service RATE-Task if necessary
1610  0074                                   ;...and RETurn
1611  0074
1612  0074         ;********** COMPARE RAT_T/M to R_MNTx16^R_EXP **********
1613  0074         ;Enter with B pointing at either RAT_T(1) or RAT_M(1).
1614  0074         ;On return, the instruction after CALL will be skipped
1615  0074         ;if RAT_T/M < R_MNTx16^R_EXP=RATEdt.
1616  0074         ;
1617  0074 22      CK_LIM: SET  C            ;              (&&&b, 5/11/90)
1618  0075 00              CLR  A
1619  0076 58              ADSK #R_MNT       ;ACC=R_MNT
1620  0077 10              SBSK @B-!C        ;ACC=RAT_T/M(1)-R_MNT
1621  0078 44              NOP               ;   Go ahead and !borrow
1622  0079 05              MOV  A,@B^#0
1623  007A 07              XDSK @B^#0        ;B-->RAT_T/M(0) (EXPonent)
1624  007B 00              CLR  A
1625  007C 54              ADSK #R_EXP       ;ACC=R_EXP
1626  007D 10              SBSK @B-!C        ;ACC=RAT_T/M(0)-R_EXP, skip if
1627  007E                                   ;...RAT_T/M ≥ RATEdt
1628  007E 49              RTSK              ;   ReTurn and SKip next
1629  007F                                   ;   instruction if
1630  007F                                   ;   RAT_T/M < RATEdt
1631  007F 48              RET               ;RETurn         (&&&e, 5/11/90)
1632  0080
1633  0080
1634  0080         ;       .ORG $080         ;Page 2 Sub-Calls are 1-byte
1635  0080         ;******************************************************
1636  0080         ;**************** PAGE 2 SUBROUTINES *****************
1637  0080         ;******************************************************
1638  0080         ;
1639  0080         ;********** CLEAR RAM TO BOTTOM OF REGISTER **********
1640  0080         ;Enter with B=BI pointing at first nibble to be cleared.
1641  0080         ;Exits with M(BI) to M(BF) = 0 where BF=BrI,$F.
1642  0080         ;
1643  0080 00      ZERO:   CLR  A            ;ACC=0 for Xchange
1644  0081 04              XISK @B^#0        ;@B=0, Bd=Bd+1, skip on overflow
1645  0082 80              JMP  ZERO         ;   Clear to bottom of Register
1646  0083 48              RET
1647  0084
1648  0084         ;********* SHIFT RAM 1 NIBBLE DOWN WITH 0-FILL *********
1649  0084         ;Enter with B=BI pointing at nibble to be 0-filled.
1650  0084         ;Exits with M(BI)=M(BrI,BdI)=0 and M(BrI,i+1)new=
1651  0084         ;M(BrI,i)old for BdI≤i<$F.
1652  0084         ;
1653  0084 00      SHFTD:  CLR  A            ;ACC=0 for 1st Xchange
1654  0085 04      LOOP2:  XISK @B^#0        ;@B=ACC, ACC=@B, Bd=Bd+1, skip
1655  0086                                   ;...on overflow
1656  0086 85              JMP  LOOP2        ;Shift to bottom of Register
1657  0087 48              RET
1658  0088
1659  0088         ;********* SHIFT RAM 1 NIBBLE UP WITH 0-FILL **********
1660  0088         ;Enter with B=BI=(BrI,BdI) pointing at 1st RAM-Dgt above
1661  0088         ;argument.  Exits with M(BrI,i)new=M(BrI,i+1)old for
1662  0088         ;BdI<i<$F and M(BrI,$F)=0.
1663  0088         ;
1664  0088 00      SHFTU:  CLR  A
1665  0089 04              XISK @B^#0        ;M(BI)=0, ACC=?,
1666  008A                                   ;...B-->M(BrI,BdI+1)
1667  008A 07      LOOP3:  XDSK @B^#0        ;ACC=M(BrI,i+1), M(BrI,i+1)=?,
1668  008B                                   ;...B-->M(BrI,i)
1669  008B 04              XISK @B^#0        ;ACC=M(BrI,i)=0,
1670  008C                                   ;...M(BrI,i)=M(BrI,i+1),
```

```
1671  008C                                          ;...B-->M(BrI,i+1)
1672  008C  04              XISK    @B^#0           ;ACC=?, M(BrI,i+1)=0,
1673  008D                                          ;...B-->M(BrI,i+2), skip if
1674  008D                                          ;...i+2>15
1675  008D  8A              JMP     LOOP3           ;   Loop until DIGT#15=0 (ie,
1676  008E                                          ;   until i+1=15)
1677  008E  44      DLY_3:  NOP                     ;A 1-byte call here provides 3
1678  008F                                          ;...Instruction Cycles of delay
1679  008F  48      DLY_2:  RET                     ;A 1-byte call here provides 2
1680  0090                                          ;...Instruction Cycles of delay
1681  0090
1682  0090                  ;************* EXTERNAL HARDWARE CONTROL *************
1683  0090                  ;
1684  0090                  ;Enter with B pointing at D_REG which contains value to
1685  0090                  ;be written to D-PORT. ACC, B, and C are all affected.
1686  0090                  ;
1687  0090  22      DPRT_J: SET     C               ;Entry for return through CK_TIM
1688  0091  20              SKP     C
1689  0092  32      DPRT_R: CLR     C               ;Entry for simple RETurn (used
1690  0093                                          ;...to enable EEPROM without
1691  0093                                          ;...resetting the CD4020B)
1692  0093  05              MOV     A,@B^#0         ;ACC=D_REG-Value
1693  0094  50              MOV     BD,A            ;Bd=ACC
1694  0095  333E            MOV     D,BD            ;Write D_REG-value to D-PORT
1695  0097  20              SKP     C               ;Skip if called at DPRT_J
1696  0098  48              RET                     ;   RETurn if called at DPRT_R
1697  0099  6332            JMP     CK_TIM          ;Service RATE-Task if necessary
1698  009B                                          ;...and RETurn
1699  009B
1700  009B                  ;**** SCAN SERIAL INPUT PORT FOR CHARACTER PATTERN *****
1701  009B                  ;SRCH_F Entry Loads ACC with a $F=%1111 Search-Character
1702  009B                  ;and S_PTRN Entry must be called with desired search-
1703  009B                  ;pattern in ACC. Both entries exit with B-->SRCHR and
1704  009B                  ;C=0. SRCH_F leaves a %1111 @SRCHR and S_PTRN leaves
1705  009B                  ;entry-value of ACC. The routine returns with serial-
1706  009B                  ;port input nibble in ACC.
1707  009B                  ;
1708  009B  00      SRCH_F: CLR     A
1709  009C  40              CPL     A               ;ACC=Search Character = %1111
1710  009D  3A      S_PTRN: MVSK    B,#SRCHR        ;B-->SRCHR (SeaRCH CHaRacter)
1711  009E  06              XCH     @B^#0           ;SRCHR=ACC
1712  009F  32              CLR     C               ;Don't want to enable SK-clock
1713  00A0  4F              XCH     SIO,C           ;ACC=Serial Input
1714  00A1  48              RET
1715  00A2
1716  00A2  6332    CHKTIM: JMP     CK_TIM          ;Just a Jump-Vector to make
1717  00A4                                          ;...CHKTIM a 1-byte call
1718  00A4
1719  00A4  613C    CONVRT: JMP     HEX2DK          ;Just a Jump-Vector to make
1720  00A6                                          ;...CONVRT a 1-byte call
1721  00A6
1722  00A6  6042    CPY_IO: JMP     COPYIO          ;Just a Jump-Vector to make
1723  00A8                                          ;...CPY_IO a 1-byte call
1724  00A8
1725  00A8  605C    CPY2IO: JMP     CPTOIO          ;Just a Jump-Vector to make
1726  00AA                                          ;...CPY2IO a 1-byte call
1727  00AA
1728  00AA  6209    EE_WT:  JMP     EEWRT           ;Just a Jump-Vector to make
1729  00AC                                          ;...EE_WT a 1-byte call
1730  00AC
1731  00AC  6200    EE_RD:  JMP     EEREAD          ;Just a Jump-Vector to make
1732  00AE                                          ;...EE_RD a 1-byte call
1733  00AE
1734  00AE  627B    FMUL16: JMP     HEXMLT          ;Just a Jump-Vector to make
1735  00B0                                          ;...FMUL16 a 1-byte call
1736  00B0
1737  00B0  62F0    MV_FPH: JMP     MOVFPH          ;Just a Jump-Vector to make
1738  00B2                                          ;...MV_FPH a 1-byte call
1739  00B2
1740  00B2                  ;************* GEIGER PULSE COUNTER DATA *************
```

```
1741  00B2              ;Move CD4020B/CNTR Data to N_DOS/N_RAT and test for
1742  00B2              ;EVENT. L3:0-->D/R, L7:4-->(D/R)+1, G-->(D/R)+2,
1743  00B2              ;CNTR-->(D/R)+3. The LD_NDS Entry updates both N_DOS
1744  00B2              ;and N_RAT, exits with a RET and therefore should be
1745  00B2              ;called. The LD_NRI/R entries exit via a direct jump
1746  00B2              ;with D_RT=N_RAT-O_RAT and do not disturb the N_DOS-
1747  00B2              ;Buffer. Note that it isn't necessary to disable IRQs
1748  00B2              ;because once the CD4020B is halted, IRQs cannot be
1749  00B2              ;generated.
1750  00B2              ;
1751  00B2  0F     LD_NDS: MVSK B,#0       ;Bd=0 ==>Load N_DOS-Buffer and
1752  00B3                                 ;...RETurn from SUB-Call
1753  00B3  08     LD_NRI: MVSK B,#$9      ;Bd=$9 ==>RATE-Calc active, jump
1754  00B4                                 ;...to INCTIM when finished
1755  00B4  09     LD_NRR: MVSK B,#$A      ;Bd=$A ==>RATE-Calc active, jump
1756  00B5                                 ;...to RTN2 when finished
1757  00B5  4E             MOV  A,BD       ;ACC=BdI, N_DOS/N_RAT Pointer
1758  00B6  23E8           XCH  RTNPTR     ;Save BdI at RTNPTR so return
1759  00B8                                 ;...conditions can be retrieved
1760  00B8                                 ;...later
1761  00B8  38             MVSK B,#D_REG   ;B-->D_REG
1762  00B9  42             CLR  @B.2       ;Clr CD4020B ENABLE/!DISABL-Bit
1763  00BA  05             MOV  A,@B^#0    ;The stack could be pushed twice
1764  00BB                                 ;...already so we can't use
1765  00BB                                 ;...a call to DPRT while IRQs
1766  00BB                                 ;...are still enabled
1767  00BB  50             MOV  BD,A       ;Bd=D_REG control nibble
1768  00BC  333E           MOV  D,BD       ;Write control nibble to D-PORT
1769  00BE                                 ;...and DISABL the CD4020B
1770  00BE              ;
1771  00BE              ;Now we can read CD4020B/CNTR data without worrying
1772  00BE              ;about overflow handling. However, execution time for
1773  00BE              ;the next 12 instructions constitute an RSI error of 25
1774  00BE              ;Instruction Cycles for the COP444CP and 17 ICs for the
1775  00BE              ;COP444C. When RSI_MN=1 and INTRVL=0, there are 1024
1776  00BE              ;ICs/RSI so the worst case error is 2x25/1024≈5.0%
1777  00BE              ;(remember that LD_NDS is called right after the RSI is
1778  00BE              ;initiated). This error is only 2.5% if RSI_MN=2 and is
1779  00BE              ;compensatable through the calibration coefficients,
1780  00BE              ;(DSCF, RTCF, GM_DT).
1781  00BE              ;
1782  00BE  3F             MVSK B,#N_RAT   ;B-->N_RAT(0) (Counter data must
1783  00BF                                 ;...always be Xferred to N_RAT)
1784  00BF                                 ;...         (&&&b, 5/20/90)
1785  00BF  332E           MOV  @BA,L      ;N_RAT(0)=L7:4, ACC=L3:0
1786  00C1  04             XISK @B^#0      ;N_RAT(0)=L3:0, ACC=L7:4,
1787  00C2                                 ;...B-->N_RAT(1)
1788  00C2  04             XISK @B^#0      ;NRAT(1)=ACC=L7:4, B-->N_RAT(2)
1789  00C3         ;      JMP  C444CP      ;Jump to special G-Port code for
1790  00C3                                 ;...COP444CPs. Don't need this
1791  00C3                                 ;...instruction with COP444Cs.
1792  00C3                                 ;...Returns to C444C    (@@@)
1793  00C3  332A           MOV  A,G        ;Get G=MSN from CD4020B. Don't
1794  00C5                                 ;...need this instruction with
1795  00C5                                 ;...COP444CPs
1796  00C5  04     C444C: XISK @B^#0       ;N_RAT(2)=G, B-->N_RAT(3)
1797  00C6  2302           MOV  A,CNTR     ;ACC=CNTR (Get CNTR last so a
1798  00C8                                 ;...pending IRQ is already
1799  00C8                                 ;...serviced and CNTR=CNTR+1)
1800  00C8  06             XCH  @B^#0      ;N_RAT(3)=CNTR   (&&&e, 5/20/90)
1801  00C9  38             MVSK B,#D_REG   ;B-->D_REG
1802  00CA  46             SET  @B.2       ;Set CD4020B ENABLE/!DISABL-Bit
1803  00CB  05             MOV  A,@B^#0    ;Stack-Level=2, a call to DPRT
1804  00CC                                 ;...would be vulnerable to SOF
1805  00CC                                 ;...for about 3 instr. periods,
1806  00CC                                 ;...worst at high event rates
1807  00CC  50             MOV  BD,A       ;Bd=D_REG control nibble
1808  00CD  333E           MOV  D,BD       ;Write control nibble to D-PORT
1809  00CF                                 ;...and re-enable the CD4020B.
1810  00CF                                 ;...By implication, IRQs will be
```

```
1811  00CF                                              ;...active again
1812  00CF  3388          MVSK  B,#L3_OLD     ;B-->L3_OLD
1813  00D1  2330          MOV   A,N_RAT       ;ACC=L3:0
1814  00D3  06            XCH   @B^#0         ;ACC=L3_OLD, update L3_OLD=L3:0
1815  00D4  02            XOR   @B            ;ACC=L3_OLD^L3:0
1816  00D5  5F            ADSK  #$F           ;Skip if ACC>0 (event detected)
1817  00D6  E4            AJMP  N_EVNT        ;  Jump if no event detected
1818  00D7                ;--- Event detected, set ICON and handle N_RAT(0).0 ----
1819  00D7  0F            MVSK  B,#ALRM       ;B-->ALRM
1820  00D8  4D            SET   @B.0          ;Set EVENT Icon flag
1821  00D9  3394          MVSK  B,#LO_NIB     ;B-->LO_NIB
1822  00DB  06            XCH   @B^#0         ;A=LO_NIB, LO_NIB=L3_OLD^L3:0-1
1823  00DC  51            ADSK  #1            ;ACC=LO_NIB+1, skip if ACC=0
1824  00DD  DF            AJMP  NCRY1         ;  Jump if no overflow
1825  00DE  5F            ADSK  #$F           ;Clamp ACC at $F.  LO_NIB can
1826  00DF                                              ;...only be decreased when
1827  00DF                                              ;...N_RAT(0) increments to
1828  00DF                                              ;...prevent negative rates
1829  00DF  06     NCRY1: XCH   @B^#0         ;Restore ACC and updated LO_NIB
1830  00E0  5F            ADSK  #$F           ;Skip if L.1, L.2 or L.3 changed
1831  00E1  E4            AJMP  N_EVNT        ;  Jump if only L.0 changed
1832  00E2  00            CLR   A
1833  00E3  06            XCH   @B^#0         ;Reset LO_NIB=0 (only after Q2
1834  00E4                                              ;...overflow of the CD4020B)
1835  00E4          ;
1836  00E4          ;   This should catch most events at low rates where the
1837  00E4          ;probability for an even, nonzero number of events is
1838  00E4          ;small.  When the Poisson mean is 2 events per sampling
1839  00E4          ;interval (about 4 TOFPs), a significant fraction (but
1840  00E4          ;less than .5) of events won't register 75% of the time.
1841  00E4          ;At high rates (>>4x16 events/TOFP) where L3:0 is uncor-
1842  00E4          ;related to L3_OLD, this event detector will fail 1 out
1843  00E4          ;of 16 times.
1844  00E4          ;
1845  00E4          ;----- Assign value to N_RAT(0).0 based on LO_NIB ------
1846  00E4  3F     N_EVNT: MVSK  B,#N_RAT     ;B-->N_RAT(0)
1847  00E5  4D            SET   @B.0          ;Set N_RAT(0).0
1848  00E6  2314          MOV   A,LO_NIB      ;ACC=LO_NIB
1849  00E8  5C            ADSK  #$C           ;Skip if LO_NIB>3
1850  00E9  4C            CLR   @B.0          ;  Clear N_RAT(0).0 if LO_NIB<4
1851  00EA  33E8          MVSK  B,#RTNPTR     ;B-->RTNPTR
1852  00EC  13            SKNB  @B.3          ;Skp if RTNPTR=0 (load N_DOS-
1853  00ED                                              ;...Buffer)
1854  00ED  6186          JMP   DELTA         ;  Jump for RATE-Task and
1855  00EF                                              ;    compute D_RT
1856  00EF          ;------ X-fer N_RAT to N_DOS for DOSE Calculation ------
1857  00EF  33F0          MVSK  B,#N_DOS      ;B-->N_DOS(0)
1858  00F1  2330          MOV   A,N_RAT       ;ACC=L3:0' (Bit0 handled)
1859  00F3  04            XISK  @B^#0         ;N_DOS(0)=ACC, B-->N_DOS(1)
1860  00F4  2331          MOV   A,N_RAT+1     ;ACC=L7:4
1861  00F6  04            XISK  @B^#0         ;N_DOS(1)=ACC, B-->N_DOS(2)
1862  00F7  2332          MOV   A,N_RAT+2     ;ACC=G
1863  00F9  04            XISK  @B^#0         ;N_DOS(2)=ACC, B-->N_DOS(3)
1864  00FA  2333          MOV   A,N_RAT+3     ;ACC=CNTR
1865  00FC  06            XCH   @B^#0         ;N_DOS(3)=ACC
1866  00FD  6332          JMP   CK_TIM        ;Service RATE-Task if necessary
1867  00FF                                              ;...and RETurn
1868  00FF
1869  00FF
1870  00FF          ;       .ORG $0FF         ;ISR Vector is at $0FF
1871  00FF          ;*******************************************************
1872  00FF          ;************** INTERRUPT SERVICE ROUTINE **************
1873  00FF          ;*******************************************************
1874  00FF  44            NOP                 ;1st byte of ISR must be NOP
1875  0100          ;Increment CNTR-Regs when CD4020B Counter Overflows.
1876  0100          ;Direct addressing eliminates need to save B and C and
1877  0100          ;reduces ISR execution time.  Successive Xchanges with
1878  0100          ;CNTR nibbles preserve ACC entry-value=ACC0.
1879  0100          ;
1880  0100  2382          XCH   CNTR          ;ACC=CNTR (CD4020B OverFlow
```

```
1881  0102                                      ;...CouNTeR), CNTR=ACC0
1882  0102  51              ADSK  #1            ;ACC=CNTR+1.  CNTR will over-
1883  0103  44              NOP                 ;   flow gracefully if addition
1884  0104                                      ;   generates a carry and ACC
1885  0104                                      ;   will still be restored
1886  0104  2382            XCH   CNTR          ;Restore CNTR and ACC0
1887  0106  3362            MOV   EN,#2         ;Re-enable IRQs
1888  0108  48              RET
1889  0109
1890  0109
1891  0109         ;******** CONTINUATION OF PAGE 2,3 SUBROUTINES ********
1892  0109         ;
1893  0109         ;***** TRANSLATE NUMERALS TO COP472-3 INSTRUCTIONS *****
1894  0109         ;******* AND TRANSMIT TO DRIVER FOR LCD UPDATING ******
1895  0109         ;Data consists of 5 numerals loaded at MNTISA.  The 1st
1896  0109         ;3 numerals are the 3 display digits, the 4th numeral is
1897  0109         ;unit control (u,m,R,/h, etc.), and the last numeral is
1898  0109         ;the Special Segments which control the icons.  E.g.,
1899  0109         ;123BF might result in a display of 12.3 mR with all
1900  0109         ;Special Segments on.  On entry, DEC_PT must contain the
1901  0109         ;value, n, to turn on the Decimal Point of the nth digit
1902  0109         ;from the left (e.g., DEC_PT=1 for a number like 12.3).
1903  0109         ;Entry at WTSPCL selects the Special Character Set which
1904  0109         ;includes BLANKS for blanking the unit display.
1905  0109         ;------------- Original data not destroyed -------------
1906  0109         ;
1907  0109  22    WRTDSP: SET   C             ;Use 7-Segment Character Set
1908  010A  20            SKP   C
1909  010B  32    WTSPCL: CLR   C             ;Use SPeCiaL Character Set
1910  010C  0A            MVSK  B,#MNTISA     ;B-->MNTISA
1911  010D  00    LOOP4:  CLR   A             ;Set ACC=MSN of PROM 7-Segment
1912  010E  5E            ADSK  #(NUMRAL/$10  ;...Numeral Pattern Address
1913  010F  20            SKP   C             ;Skip for 7-Segment Chrs
1914  0110  51            ADSK  #1            ;   Add-1 for Special Chrs
1915  0111  BF            MOV   Q,@(A@B)      ;Look up segment data
1916  0112  35            MOV   A,@B^#3       ;Br-->REG3
1917  0113  332C          MOV   @BA,Q         ;@B=MSN of data, ACC=LSN
1918  0115  16            XCH   @B^#1         ;ACC=MSN, @B=LSN, Br-->REG2
1919  0116  24            XISK  @B^#2         ;@B=MSN, ACC=trash, Br-->REG0
1920  0117                                    ;...Bd=Bd+1, Skip if Bd=16
1921  0117  CD            JMP   LOOP4         ;   Jump if Bd<16
1922  0118         ;----------- Turn on Indicated Decimal Point -----------
1923  0118  20            SKP   C             ;Skip for 7-Segment Chrs
1924  0119  E0            AJMP  NO_DP         ;   No DPs for SPeCiaL Chrs
1925  011A  25            MOV   A,@B^#2       ;B-->REG2 (MATH-Buffer)
1926  011B  232A          MOV   A,DEC_PT      ;ACC=0th,1st,2nd Numeral for DP
1927  011D  5B            ADSK  #MNTISA       ;ACC+MNTISA=Digit index for
1928  011E                                    ;...units digit
1929  011E  50            MOV   BD,A          ;B-->Xlated MSN of DP-numeral
1930  011F  4B            SET   @B.3          ;Set DP-Bit of MSN
1931  0120         ;--- 5th Numeral was mock translated.  Now overwrite ---
1932  0120         ;-------- with Special Segments & Control Code ---------
1933  0120  0E    NO_DP:  MVSK  B,#ICONS      ;B-->ICONS
1934  0121  25            MOV   A,@B^#2       ;ACC=ICONS, B-->DSPBF2+4   (?.?)
1935  0122  16            XCH   @B^#1         ;Save Spcl. Segs., B-->REG3
1936  0123  7C            MOVI  @B,#SAMODE    ;COP472-3 "Stand Alone" Code
1937  0124         ;-------- Buffer is Ready, Now Send to COP472-3 --------
1938  0124         ;-- REG2 Data Remains Intact, REG3 Data is Destroyed ---
1939  0124  38            MVSK  B,#D_REG      ;B-->D_REG
1940  0125  4D            SET   @B.0          ;Set COP472-3 ENABLE bit
1941  0126  92            CALL  DPRT_R        ;Move new D_REG to D-PORT
1942  0127  2A            MVSK  B,#DSPBF2     ;B-->top of 472-3 output buffer
1943  0128  22            SET   C             ;Get ready to turn on SK-Clock
1944  0129  3368          MOV   EN,#8         ;Disable IRQs, enable SO-output
1945  012B  3368          MOV   EN,#8         ;Disable IRQs, enable SO-output
1946  012D                                    ;...again in case IRQ occurred
1947  012D                                    ;...during execution of above
1948  012D                                    ;...instruction   (&&&, 5/22/90)
1949  012D  15    LOOP5:  MOV   A,@B^#1       ;ACC=MSN of data, Br-->REG3
1950  012E  4F            XCH   SIO,C         ;Output MSN of data
```

```
1951  012F 8F              CALL  DLY_2         ;Wait 2 Instruction Cycles
1952  0130 05              MOV   A,@B^#0       ;ACC=LSN of data
1953  0131 4F              XCH   SIO,C         ;Output LSN of data
1954  0132 14              XISK  @B^#1         ;@B=trash, Br-->REG2, Bd=Bd+1
1955  0133                                     ;...Skip if Bd=16
1956  0133 ED              AJMP  LOOP5         ;   Jump if Bd<16
1957  0134 32              CLR   C             ;Get ready to turn off SK-clock
1958  0135 4F              XCH   SIO,C         ;Turn off SK-clock
1959  0136 3362   DS_472:  MOV   EN,#2         ;Re-enable IRQs, disable SO-out
1960  0138 38              MVSK  B,#D_REG      ;B-->D_REG
1961  0139 4C              CLR   @B.0          ;Clear COP472-3 ENABLE bit
1962  013A 6090            JMP   DPRT_J        ;Return through DPRT_J
1963  013C
1964  013C           ;****** HEX-TO-DECIMAL CONVERSION OF MATH-BUFFER *******
1965  013C           ;Enter with hexadecimal integer in MATH to MATH+6 (LSN
1966  013C           ;first, zero fill higher nibbles if necessary). Exits
1967  013C           ;with decimal result in FLAC to FLAC+3 in the form,
1968  013C           ; EXP,Z,Y,X where EXP is the exponent and Z,Y,X is the
1969  013C           ;3-digit mantissa. The Floating Point result is
1970  013C           ;expressible as FPval = Z.YXx10^EXP. The original hex
1971  013C           ;integer is destroyed. The implemented conversion
1972  013C           ;algorithm is taken from AP-49 of INTEL Embedded Control
1973  013C           ;Applications, 1988.                     (KHV 10/16/89)
1974  013C           ;
1975  013C           ;-------- Initialize Data-Buffer and Bit-Counter --------
1976  013C 3D       HEX2DK: MVSK B,#GPR3       ;B-->GPR3
1977  013D 74              MOVI  @B,#4         ;GPR3=4 so GPR3(1).1 will set
1978  013E                                     ;...after 28 shifts
1979  013E 70              MOVI  @B,#0         ;GPR3(1)=0
1980  013F 3395            MVSK  B,#BCD-2      ;B-->BCD-2=GPR1
1981  0141 80              CALL  ZERO          ;Clear GPR1 and GPR2 (in case
1982  0142                                     ;...BCD result is less than 10)
1983  0142                                     ;...and BCD Conversion Buffer
1984  0142 A2       LOOP6:  CALL CHKTIM        ;Service RATE-Task if necessary
1985  0143           ;--------- Double the intermediate BCD result ----------
1986  0143 3397            MVSK  B,#BCD        ;B-->BCD(0)
1987  0145 32              CLR   C
1988  0146 05       LOOP7:  MOV  A,@B^#0       ;ACC=BCD(i)
1989  0147 56              ADSK  #6            ;Add BCD Correction Factor
1990  0148 30              ADSK  @B+C          ;ACC=2*BCD(i)+C
1991  0149 4A              ADD   10            ;Restore BCD(i)-value if correc-
1992  014A                                     ;...tion wasn't necessary
1993  014A 04              XISK  @B^#0         ;Update BCD(i), B-->BCD(i+1),
1994  014B                                     ;...skip if i>8 (Bd>15)
1995  014B C6              JMP   LOOP7         ;  Loop until BCD is doubled
1996  014C A2              CALL  CHKTIM        ;Service RATE-Task if necessary
1997  014D           ;-------- Shift the MSb of HEX argument into C ---------
1998  014D 32              CLR   C             ;Might as well shift in 0's
1999  014E 28              MVSK  B,#MATH       ;B-->MATH(0)
2000  014F 05       LOOP8:  MOV  A,@B^#0       ;ACC=MATH(i)
2001  0150 30              ADSK  @B+C          ;ACC=2*MATH(i)
2002  0151 44              NOP                 ;   Go ahead and carry
2003  0152 04              XISK  @B^#0         ;Update MATH(i), B-->MATH(i+1),
2004  0153                                     ;...skip if i>6 (Bd>15)
2005  0153 CF              JMP   LOOP8         ;  Loop until MSb shifts into C
2006  0154 20              SKP   C             ;Add 1 to intermediate BCD
2007  0155                                     ;...result if C=1
2008  0155 E0              AJMP  N_ADD1        ;   Otherwise, don't add 1
2009  0156 A2              CALL  CHKTIM        ;Service RATE-Task if necessary
2010  0157           ;-------- Add 1 to intermediate BCD result if C=1 -------
2011  0157 3397            MVSK  B,#BCD        ;B-->BCD(0)
2012  0159 22              SET   C             ;C=1
2013  015A 00       LOOP9:  CLR  A             ;ACC=0
2014  015B 56              ADSK  #6            ;Add BCD Correction Factor
2015  015C 30              ADSK  @B+C          ;ACC=BCD(i)+C
2016  015D 4A              ADD   10            ;Restore BCD(i)-value if correc-
2017  015E                                     ;...tion wasn't necessary
2018  015E 04              XISK  @B^#0         ;Update BCD(i), B-->BCD(i+1),
2019  015F                                     ;...skip if i>8 (Bd>15)
2020  015F DA              JMP   LOOP9         ;   Loop until ADD1 is complete
```

```
2021  0160                    ;------ Increment Bit Index and jump out of loop -------
2022  0160                    ;---- after processing all 28 bits of HEX argument -----
2023  0160 A2      N_ADD1: CALL CHKTIM      ;Service RATE-Task if necessary
2024  0161 3D              MVSK B,#GPR3     ;B-->GPR3(0)
2025  0162 22              SET  C           ;C=1
2026  0163 00      LOOP10: CLR  A           ;ACC=0
2027  0164 30              ADSK @B+C        ;ACC=GPR3+C
2028  0165 44              NOP              ;   Go ahead and carry
2029  0166 04              XISK @B^#0       ;Update GPR3(i), B-->GPR3(i+1),
2030  0167                                  ;...skip if i>1 (Bd>15)
2031  0167 E3              JMP  LOOP10      ;   Add C to next MSN of Counter
2032  0168 3E              MVSK B,#GPR4     ;B-->GPR4
2033  0169 11              SKNB @B.1        ;Skip if GPR4=2
2034  016A EC              AJMP FLT_PT      ;   Jump, find MSD of result
2035  016B C2              JMP  LOOP6       ;Loop back for next HEX bit
2036  016C                 ;------- HEX-to-Decimal Conversion is complete, --------
2037  016C                 ;------------- now find MSD of BCD result --------------
2038  016C A2      FLT_PT: CALL CHKTIM      ;Service RATE-Task if necessary
2039  016D 1E              MVSK B,#BCD+8    ;B-->BCD(8) (start with MSN)
2040  016E 00      LOOP11: CLR  A
2041  016F 21              CSKE A,@B        ;Skip if BCD(i)=0
2042  0170 F6              AJMP GOTMSD      ;   Jump if BCD(i)>0
2043  0171 07              XDSK @B^#0       ;B-->BCD(i-1)
2044  0172 4E              MOV  A,BD        ;ACC=Bd
2045  0173 58              ADSK #8          ;ACC=Bd+8, skip if Bd>7
2046  0174 F6              AJMP GOTMSD      ;   Jump if Bd<8, DIGT7 will
2047  0175                                  ;...be MSD regardless of value
2048  0175 EE              JMP  LOOP11      ;Keep looking if Bd>7
2049  0176                 ;------------ Load Decimal Result into FLAC ------------
2050  0176 4E      GOTMSD: MOV  A,BD        ;ACC=Bd
2051  0177 59              ADSK #9          ;ACC=Bd+9=Bd-7=EXP
2052  0178 44              NOP              ;   Addition always skips
2053  0179 23BC            XCH  FLAC        ;Save EXP
2054  017B 07              XDSK @B^#0       ;ACC=MSN=Z, B-->BCD(i-1)
2055  017C 23BD            XCH  FLAC+1      ;Save MSN
2056  017E 07              XDSK @B^#0       ;ACC=SSN=Y, B-->BCD(i-2)
2057  017F 23BE            XCH  FLAC+2      ;Save SSN
2058  0181 06              XCH  @B^#0       ;ACC=LSN=X
2059  0182 23BF            XCH  FLAC+3      ;Save LSN
2060  0184 6332            JMP  CK_TIM      ;Service RATE-Task if necessary
2061  0186                                  ;...and RETurn
2062  0186
2063  0186            ;******* Continuation of LD_NRI/R Counter Input ********
2064  0186            ;
2065  0186            ;-------------- Compute D_RT = N_RAT-O_RAT --------------
2066  0186 2F      DELTA:  MVSK B,#O_RAT    ;B-->O_RAT(0)
2067  0187 22              SET  C           ;Set !Borrow for subtraction
2068  0188 15      LOOP12: MOV  A,@B^#1     ;ACC=O_RAT(i), B-->N_RAT(i)
2069  0189 10              SBSK @B-!C       ;ACC=N_RAT(i)-O_RAT(i)=D_RT(i)
2070  018A 44              NOP              ;   Go ahead and !borrow
2071  018B 14              XISK @B^#1       ;D_RT(i)=ACC, B-->O_RAT(i+1)
2072  018C 4E              MOV  A,BD        ;ACC=i+1
2073  018D 5C              ADSK #$C         ;ACC=i+13, skip if i=3
2074  018E C8              JMP  LOOP12      ;   Jump and subtract next nibl
2075  018F           ;
2076  018F           ;Since we perform the above calculation at each TOF, it
2077  018F           ;is not possible for N_RAT+3=CNTR to overflow more than
2078  018F           ;once.  See "PROOF" and note that the RATE routine can
2079  018F           ;reduce its sampling interval to .250 s if needed.
2080  018F           ;
2081  018F           ;---------- Reduce INTRVL if D_RT ≥ 16*LIMIT -----------
2082  018F 22              SET  C           ;Assume D_RT≥16^2 (&&&, 4/21/90)
2083  0190 33B3            MVSK B,#D_RT+3   ;B-->D_RT(3)
2084  0192 21              CSKE A,@B        ;Skip if D_RT(3)=0 (ACC=0 on
2085  0193                                  ;...exit from LOOP12)
2086  0193 E5              AJMP DCRMNT      ;   Jump and decrement INTRVL
2087  0194                                  ;   since D_RT≥16^3
2088  0194 07              XDSK @B^#0       ;B-->D_RT(2)
2089  0195 21              CSKE A,@B        ;Skip if D_RT(2)=0
2090  0196 E5              AJMP DCRMNT      ;   Jump and decrement INTRVL
```

```
2091  0197                                    ;    since D_RT≥16^2
2092  0197 39              MVSK  B,#INTRVL    ;B-->INTRVL         (&&&b, 4/21/90)
2093  0198 5D              ADSK  #$D          ;ACC=13, never skips
2094  0199 30              ADSK  @B+C         ;ACC=INTRVL+13+1, skip if
2095  019A                                    ;...INTRVL>1, C=1
2096  019A F0              AJMP  RTN1         ;   Jump if INTRVL<2, C=0
2097  019B 33B1            MVSK  B,#D_RT+1    ;B-->D_RT(1)        (&&&b, 5/26/90)
2098  019D 5F              ADSK  #$F          ;Skip if INTRVL=3, ACC=0, C=1
2099  019E E1              AJMP  INT21        ;   Jump if INTRVL=2
2100  019F 5E              ADSK  #$F-LIM23    ;ACC=15-LIM23 for INTRVL=3
2101  01A0 E3              AJMP  INT32        ;Jump, C=1          (&&&e, 5/26/90)
2102  01A1 00     INT21:   CLR   A
2103  01A2 5B              ADSK  #$F-LIM12    ;ACC=15-LIM12 for INTRVL=2
2104  01A3 30     INT32:   ADSK  @B+C         ;ACC=D_RT(1)+15-LIM12/LIM23+C=
2105  01A4                                    ;...DRT(1)+16-LIM12/LIM23=
2106  01A4                                    ;...D_RT(1)-LIM12/LIM23, skip
2107  01A4                                    ;...if D_RT(1)≥LIM12/LIM23, C=1
2108  01A4                                    ;...                (&&&e, 4/21/90)
2109  01A4 F0              AJMP  RTN1         ;   Jmp if D_RT(1)<LIM12/LIM23,
2110  01A5                                    ;...C=0
2111  01A5 39     DCRMNT:  MVSK  B,#INTRVL    ;B-->INTRVL
2112  01A6 05              MOV   A,@B^#0      ;ACC=INTRVL
2113  01A7 5F              ADSK  #$F          ;ACC=INTRVL-1, skip if INTRVL>0
2114  01A8 F0              AJMP  RTN1         ;   Return, can't reduce further
2115  01A9                                    ;   but will be OK since we
2116  01A9                                    ;   can't get 4x16^4 counts in
2117  01A9                                    ;   one Timer-overflow period
2118  01A9 37              XDSK  @B^#3        ;Update INTRVL, B-->FLGS  (?.?)
2119  01AA 43              CLR   @B.3         ;Cancel this rate calculation
2120  01AB                                    ;...and try again later
2121  01AB 33B3            MVSK  B,#D_RT+3    ;B-->DRT(3) [next 2 instructions
2122  01AD                                    ;...divide D_RT by 16 to account
2123  01AD                                    ;...for INTRVL-1 (x16)]
2124  01AD 00              CLR   A            ;ACC=0 will be MSN
2125  01AE 07     LOOP13:  XDSK  @B^#0        ;ACC=D_RT(i), D_RT(i)=ACC,
2126  01AF                                    ;...B-->D_RT(i-1)
2127  01AF EE              JMP   LOOP13       ;   Loop and discard the LSN
2128  01B0 33E8   RTN1:    MVSK  B,#RTNPTR    ;B-->RTNPTR
2129  01B2 01              SKNB  @B.0         ;Skip for return to RTN2 (i.e.,
2130  01B3                                    ;...if Bd=%1010=$A)
2131  01B3 6390            JMP   INCTIM       ;   Jump if Bd=%1001=9
2132  01B5 63D7            JMP   RTN2         ;Returns with C=0/1 for
2133  01B7                                    ;...D_RT (<)/(≥) 16xLIMIT
2134  01B7
2135  01B7            ;********** WRITE-Enable the NMC93C06 EEPROM **********
2136  01B7            ;Execution of this subroutine enables the programming
2137  01B7            ;mode of the NMC93C06 until EE_WDS is executed.
2138  01B7            ;
2139  01B7 1C     EE_WEN:  MVSK  B,#EECBF     ;B-->EECBF(0)       (&&&b, 4/17/90)
2140  01B8 71              MOVI  @B,#%0001    ;EECBF(0)=%0001 (Start-Bit),
2141  01B9                                    ;...B-->EECBF(1)
2142  01B9 73              MOVI  @B,#E2EWEN   ;EECBF(1)=EEPROM WRITE-Enable
2143  01BA                                    ;...Instruction, B-->EECBF(2)
2144  01BA                                    ;...which is "Don't Care"
2145  01BA 2345            MOV   A,UPDATE     ;ACC=UPDATE         (&&&, 10/31/90)
2146  01BC 06              XCH   @B^#0        ;EECBF(2)=UPDATE so PDR-1 can
2147  01BD                                    ;...read UPDATE value when
2148  01BD                                    ;...EEPROM is enabled
2149  01BD                                    ;...                (&&&, 10/31/90)
2150  01BD 6204            JMP   EE_WED       ;WRITE-Enable the 93C06 EEPROM
2151  01BF                                    ;...                (&&&e, 4/17/90)
2152  01BF
2153  01BF            ;************* FLOAT T_CNT/TARA into IOBUF *************
2154  01BF            ;INT*7-->FP*4: Call with C=0/1 to float T_CNT/TARA into
2155  01BF            ;IOBUF, SOURCE remains intact.  Only the integer parts
2156  01BF            ;of results are significant.
2157  01BF            ;
2158  01BF 1B     FLT_TC:  MVSK  B,#IOBUF     ;B-->IOBUF(0)
2159  01C0 80              CALL  ZERO         ;IOBUF(i)=0 for i=0,1,2,3
2160  01C1 33FF            MVSK  B,#TARA+6    ;B-->TARA(6)        (&&&b, 4/28/90)
```

```
2161  01C3 20              SKP   C             ;    Skip to float TARA
2162  01C4 35              MOV   A,@B^#3       ;B-->T_CNT(6)                  (?.?)
2163  01C5                                     ;...                   (&&&e, 4/28/90)
2164  01C5 00      LOOP15: CLR   A
2165  01C6 21              CSKE  A,@B          ;Skip if T_CNT(i)=0
2166  01C7 CE              AJMP  MSNOK1        ;   Jump if T_CNT(i)>0
2167  01C8 07              XDSK  @B^#0         ;ACC=0, T_CNT(i)=ACC=0,
2168  01C9                                     ;...B-->T_CNT(i-1), skip if
2169  01C9                                     ;...Bd=15=-1
2170  01C9 4E              MOV   A,BD          ;ACC=i
2171  01CA 57              ADSK  #7            ;ACC=i+7, skip if i>8
2172  01CB 6332    J_CKT2: JMP   CK_TIM        ;There is no non-zero MSN if the
2173  01CD                                     ;...loop finishes.  Service
2174  01CD                                     ;...RATE-Task if necessary and
2175  01CD                                     ;...RETurn
2176  01CD C5              JMP   LOOP15        ;   Check all nibbles of T_CNT
2177  01CE 4E      MSNOK1: MOV   A,BD          ;ACC=Bd of MSN (9,10,...,15)
2178  01CF 57              ADSK  #7            ;ACC=i+7 (0,1,2,3,4,5,6)
2179  01D0 44              NOP                 ;   Addition always skips
2180  01D1 239C            XCH   IOBUF         ;Save Bd at IOBUF(0)=EXP16
2181  01D3 05              MOV   A,@B^#0       ;ACC=MSN
2182  01D4 07              XDSK  @B^#0         ;B-->SSN
2183  01D5 239D            XCH   IOBUF+1       ;Save MSN
2184  01D7 05              MOV   A,@B^#0       ;ACC=SSN
2185  01D8 07              XDSK  @B^#0         ;B-->LSN
2186  01D9 239E            XCH   IOBUF+2       ;Save SSN
2187  01DB 05              MOV   A,@B^#0       ;ACC=LSN
2188  01DC 239F            XCH   IOBUF+3       ;Save LSN
2189  01DE CB              JMP   J_CKT2        ;Service RATE-Task if necessary
2190  01DF                                     ;...and RETurn
2191  01DF
2192  01DF 44              NOP                 ;NOP to adjust page boundaries
2193  01E0
2194  01E0
2195  01E0                 ;       .ORG $1E0
2196  01E0                 ;**************** NUMERICAL CONSTANTS ****************
2197  01E0                 ;
2198  01E0                 ;   Bit Patterns for the COP472-3 LCD Driver are stored
2199  01E0                 ;at the end of page 7 so WRTDSP and WTSPCL can get them
2200  01E0                 ;with the MOV Q,@(A@B) instruction [LQID].
2201  01E0                 ;
2202  01E0                 ;---- 7 Segment Numeral Codes required by COP472-3 -----
2203  01E0                 ;------ Set MSb of code to turn on Decimal Point -------
2204  01E0 3F065B  NUMRAL: .HEX 3F,06,5B,4F,66,6D,7D,07,7F,6F ;Numerals 0-9
      01E3 4F666D
      01E6 7D077F
      01E9 6F
2205  01EA                 ;------ Radiation Unit Segment Control (Digit 4) -------
2206  01EA 5CCC44  UNISEG: .HEX 5C,CC,44,58,C8,40      ;µR/h,mR/h,R/h,µR,mR,R
      01ED 58C840
2207  01F0                 ;
2208  01F0                 ;------ SPeCial CHaRs for Writing Messages to LCD ------
2209  01F0                 ;          blnk,I ,- ,O ,8.,b ,b
2210  01F0 000640  SPCCHR: .HEX 00,06,40,3F,FF,00,00        ;Special Chrs
      01F3 3FFF00
      01F6 00
2211  01F7                 ;
2212  01F7
2213  01F7
2214  01F7                 ;       .ORG $1F7       ;           (&&&, 10/20/90)
2215  01F7                 ;********** WRITE-Disable the NMC93C06 EEPROM **********
2216  01F7                 ;Execution of this subroutine disables the programming
2217  01F7                 ;mode of the NMC93C06 until EE_WEN is executed.
2218  01F7                 ;
2219  01F7                 ;------ 10 ms delay for EEPROM WT-Cycle to finish ------
2220  01F7 1F      EE_WDS: MVSK  B,#TIME       ;B-->TIME(0)      (&&&b, 4/17/90)
2221  01F8 8F      LOOP14: ACAL  DLY_2         ;5 Instruction Cycles x 16 loops
2222  01F9 05              MOV   A,@B^#0       ;... = 80 ICs = 9.76 ms of delay
2223  01FA 04              XISK  @B^#0
2224  01FB F8              JMP   LOOP14
```

```
2225  01FC 1C              MVSK B,#EECBF    ;B-->EECBF(0)
2226  01FD 71              MOVI @B,#%0001   ;EECBF(0)=%0001 (Start-Bit),
2227  01FE                                  ;...B-->EECBF(1)
2228  01FE 70              MOVI @B,#E2EWDS  ;EECBF(1)=EEPROM WRITE-Disable
2229  01FF                                  ;...Instruction, B-->EECBF(2)
2230  01FF                                  ;...which is "Don't Care"
2231  01FF C4              AJMP EE_WED      ;WRITE-Disable the 93C06 EEPROM
2232  0200                                  ;...           (&&&e, 4/17/90)
2233  0200
2234  0200         ;***** READ A NMC93C06 EEPROM REGISTER (4-NIBBLES) *****
2235  0200         ;Enter with ACC = desired Register-No. (0 to 15).  Exits
2236  0200         ;with EEPROM-Word at IOBUF to IOBUF+3.
2237  0200         ;
2238  0200 1C      EEREAD: MVSK B,#EECBF    ;B-->EECBF(0)
2239  0201 71              MOVI @B,#%0001   ;EECBF(0)=%0001 (Start-bit),
2240  0202                                  ;...B-->EECBF(1)
2241  0202 78              MOVI @B,#EE_RI   ;EECBF(1)=EEPROM READ Instr
2242  0203                                  ;...B-->EECBF(2)
2243  0203 06              XCH  @B^#0       ;EECBF(2)=ACC=Register-No.
2244  0204 38      EE_WED: MVSK B,#D_REG    ;B-->D_REG
2245  0205 47              SET  @B.1        ;Set NMC93C06 Enable-bit
2246  0206 92              CALL DPRT_R      ;Enable the NMC93C06 EEPROM
2247  0207 1D      RD_86:  MVSK B,#EECBF+1  ;Point B at 2nd output nibble
2248  0208                                  ;...           (&&&, 4/17/90)
2249  0208 D8              AJMP SER_WT      ;Jump to Serial Output Routine
2250  0209
2251  0209         ;**** WRITE A NMC93C06 EEPROM REGISTER (4-NIBBLES) *****
2252  0209         ;Enter with ACC = desired Register-No. (0-15) and the 4
2253  0209         ;nibbles of data to be written at IOBUF(0) to IOBUF(3)
2254  0209         ;which is an alias for EEWBF(3) to EEWBF(6).
2255  0209 18      EEWRT:  MVSK B,#EEWBF    ;B-->EEWBF(0)
2256  020A 71              MOVI @B,#%0001   ;EEWBF(0)=%0001 (Start-Bit),
2257  020B                                  ;...B-->EEWBF(1)
2258  020B 74              MOVI @B,#EE_WI   ;EEWBF(1)=EEPROM WRITE Instr
2259  020C                                  ;...B-->EEWBF(2)
2260  020C 06              XCH  @B^#0       ;EEWBF(2)=ACC=Register-No.
2261  020D 38              MVSK B,#D_REG    ;B-->D_REG
2262  020E 4D              SET  @B.0        ;Set COP472-3 Enable-bit to
2263  020F                                  ;...signal the PDR-1 that the
2264  020F                                  ;...PD-1 is about to check for
2265  020F                                  ;...EEPROM Busy  (&&&, 10/20/90)
2266  020F 47              SET  @B.1        ;Set NMC93C06 Enable-bit
2267  0210 92              CALL DPRT_R      ;Enable the NMC93C06 EEPROM
2268  0211 9B      LOOP16: CALL SRCH_F      ;Compare SIO with $F=%1111
2269  0212 21              CSKE A,@B        ;Skip if SIO=%1111 which means a
2270  0213                                  ;...previous EEPROM Write-Cycle
2271  0213                                  ;...is complete and either PDR-1
2272  0213                                  ;...is not present or PDR-1 is
2273  0213                                  ;...present and sending 1's
2274  0213 D1              JMP  LOOP16      ;   Loop until SI goes high
2275  0214 38              MVSK B,#D_REG    ;B-->D_REG     (&&&b, 10/20/90)
2276  0215 4C              CLR  @B.0        ;Clear COP472-3 Enable-bit
2277  0216 92              CALL DPRT_R      ;Disable COP472-3 before SK is
2278  0217                                  ;...enabled.  Also signals PDR-1
2279  0217                                  ;...that EEPROM is not Busy
2280  0217                                  ;...           (&&&e, 10/20/90)
2281  0217 19      WT_86:  MVSK B,#EEWBF+1  ;Point B at 2nd output nibble
2282  0218                                  ;...           (&&&, 4/17/90)
2283  0218         ;-------- Fall through to Serial Output Routine --------
2284  0218
2285  0218         ;*************** SERIAL OUTPUT ROUTINE ****************
2286  0218         ;Assumes that desired device is already enabled and that
2287  0218         ;B=BrI,BdI points at 1st nibble to be written.  This
2288  0218         ;routine outputs a continuous bit stream starting with
2289  0218         ;MSb of @B and ending with LSb of @(BrI,$F).  It can be
2290  0218         ;used for writing to the Serial EEPROM (NMC93C06) and
2291  0218         ;the Serial Communications Port (74AC86).  An EEPROM
2292  0218         ;read is assumed if entry-value of BdI is #EECBF.
2293  0218         ;------------- Original Data is Destroyed --------------
2294  0218         ;
```

```
2295  0218  05          SER_WT:  MOV   A,@B^#0      ;ACC=2nd output nibble
2296  0219                                          ;...                    (&&&, 4/17/90)
2297  0219  07                   XDSK  @B^#0        ;B-->1st output nibble
2298  021A                                          ;...                    (&&&, 4/17/90)
2299  021A  2395                 XCH   GPR1         ;Save 2nd output nibble:
2300  021C                                          ;...%0000=EE_WDS, %0011=EE_WEN,
2301  021C                                          ;...%0100=EE_WT,  %1000=EE_RD,
2302  021C                                          ;...%0101=74AC86_WT
2303  021C                                          ;...%1001=74AC86_RD
2304  021C  3368                 MOV   EN,#8        ;Disable IRQs, enable SO-output
2305  021E  3368                 MOV   EN,#8        ;Disable IRQs, enable SO-output
2306  0220                                          ;...again in case IRQ occurred
2307  0220                                          ;...during execution of above
2308  0220                                          ;...instruction    (&&&, 5/22/90)
2309  0220  22                   SET   C            ;Get ready to turn on SK-clock
2310  0221  05          LOOP17:  MOV   A,@B^#0      ;ACC=Data=@(B+i)
2311  0222  4F                   XCH   SIO,C        ;Output Data
2312  0223  04                   XISK  @B^#0        ;Just trashed data, Bd-->Bd+1
2313  0224                                          ;...Skip if Bd=16
2314  0224  E1                   AJMP  LOOP17       ;   Jump if Bd<16
2315  0225  32                   CLR   C            ;Get ready to turn off SK-clock
2316  0226  4F                   XCH   SIO,C        ;Turn off SK-clock
2317  0227  3395                 MVSK  B,#GPR1      ;B-->GPR1          (&&&, 4/17/90)
2318  0229  13                   SKNB  @B.3         ;Skip if not a READ cycle
2319  022A                                          ;...                   (&&&, 4/17/90)
2320  022A  F1                   AJMP  SER_RD       ;   Jump and read EEPROM if
2321  022B                                          ;   enabled.  Otherwise, read
2322  022B                                          ;   74AC86 I/O Port
2323  022B               ;------------ Disable the EEPROM and Return ------------
2324  022B  3362         EE_DIS: MOV   EN,#2        ;Re-enable IRQs, Disable SO-Out
2325  022D  38                   MVSK  B,#D_REG     ;B-->D_REG
2326  022E  45                   CLR   @B.1         ;Clear EEPROM ENABLE-bit
2327  022F  6090                 JMP   DPRT_J       ;Disable COP472-3 and EEPROM
2328  0231                                          ;...(even if not enabled, it
2329  0231                                          ;...can't hurt)
2330  0231
2331  0231               ;*************** SERIAL INPUT ROUTINE *****************
2332  0231               ;Assumes that desired device (if any) is already enabled
2333  0231               ;and then points B=BrI,BdI at IOBUF, the 1st nibble for
2334  0231               ;input.  This routine inputs a continuous bit stream
2335  0231               ;starting with MSb of IOBUF and ending with LSb of
2336  0231               ;IOBUF+3.  It can be used for reading the Serial EEPROM
2337  0231               ;(NMC93C06) and the Serial Communications Port (74AC86).
2338  0231               ;
2339  0231  3360         SER_RD: MOV   EN,#0        ;Disable IRQs and SO-Output
2340  0233  1B                   MVSK  B,#IOBUF     ;B-->IOBUF(0)
2341  0234  22                   SET   C            ;Get ready to turn on SK-clock
2342  0235  4F                   XCH   SIO,C        ;Turn on SK-clock
2343  0236  8E                   CALL  DLY_3        ;3 Instruction-Cycle delay while
2344  0237                                          ;...1st nibble is being shifted
2345  0237                                          ;...into SIO-Register - need 1
2346  0237                                          ;...more cycle for first EEPROM
2347  0237                                          ;...nibble to skip dummy-bit
2348  0237  44          LOOP18:  NOP
2349  0238  4F                   XCH   SIO,C        ;Xfer nibble to ACC
2350  0239  04                   XISK  @B^#0        ;Xfer ACC to IOBUF(i), Bd-->Bd+1
2351  023A                                          ;...Skip if Bd=16 (i=4)
2352  023A  F7                   AJMP  LOOP18       ;   Jump if Bd<16 (i<4)
2353  023B  32                   CLR   C            ;Get ready to turn off SK-clock
2354  023C  4F                   XCH   SIO,C        ;Turn off SK-clock
2355  023D  EB                   JMP   EE_DIS       ;Disable the EEPROM (even if it
2356  023E                                          ;...wasn't enabled)
2357  023E
2358  023E               ;******** DECIMAL FLOATING POINT MULTIPLICATION ********
2359  023E               ;***************** MATH=CALFAK*DATA *******************
2360  023E               ;Perform 3 digit FP-Multiplication of 4-Digit FP DATA at
2361  023E               ;FLAC (EXPD,D2,D1,D0) by 4-Digit CaLibration FaCtor at
2362  023E               ;IOBUF (EXPC,C2,C1,C0).  FP format consists of 4 Decimal
2363  023E               ;digits, EXP,Z,Y,X with VALUE = Z.YXx10^EXP.  Exits with
2364  023E               ;PRODuct (EXPP,P2,P1,P0) at MATH(3) thru MATH(6).
```

```
2365  023E              ;Algorithm works by repeated decimal addition of DATA to
2366  023E              ;PRODuct (based on CALFAK-Digit) followed by a 1-digit
2367  023E              ;shift until all 3 digits of CLFC have been used. It is
2368  023E              ;assumed that EXPC and EXPD are both positive and that
2369  023E              ;EXPP=EXPC+EXPD<16.
2370  023E              ;
2371  023E  3B    FMUL10: MVSK  B,#FLAC         ;B-->EXPD
2372  023F  00            CLR   A
2373  0240  26            XCH   @B^#2           ;ACC=EXPD, EXPD=0, B-->EXPC
2374  0241  31            ADD   @B              ;ACC=EXPD+EXPC (Product EXP)
2375  0242  57            ADSK  #7              ;ACC=EXPP+7, skip if EXPP>8
2376  0243  CB            AJMP  EXPOK1          ;    Jump if EXPP<9
2377  0244              ;----------- Clamp value at 9.99E8 if EXPP>8 -----------
2378  0244  2B    OVRNG:  MVSK  B,#MATH+3       ;B-->MATH(3)=EXPP
2379  0245  78            MOVI  @B,#8           ;Set PROD=999E6
2380  0246  79            MOVI  @B,#9           ;            "
2381  0247  79            MOVI  @B,#9           ;            "
2382  0248  79            MOVI  @B,#9           ;            "
2383  0249  6332  J_CKT3: JMP   CK_TIM          ;Service RATE-Task if necessary
2384  024B                                      ;...and RETurn
2385  024B  59    EXPOK1: ADSK  #9              ;ACC=EXPP+7+9=EXPP
2386  024C  44            NOP                   ;   Always skips
2387  024D  29            MVSK  B,#MATH+1       ;B-->MATH(1)
2388  024E  04            XISK  @B^#0           ;MATH(1)=EXPP, B-->MATH(2)
2389  024F  72            MOVI  @B,#2           ;MATH(2)=Loop Index, B-->MATH(3)
2390  0250  80            CALL  ZERO            ;Clear from MATH(3) to MATH(6)
2391  0251  A2    LOOP19: CALL  CHKTIM          ;Service RATE-Task if necessary
2392  0252  1E            MVSK  B,#IOBUF+3      ;B-->LS Remaining CLFC Digit
2393  0253  05            MOV   A,@B^#0         ;ACC=LSRCD
2394  0254  5F            ADSK  #$F             ;Decrement ACC, skip if ACC≥0
2395  0255  E1            AJMP  LSRD1           ;    Jump if LSRCD<0
2396  0256  26            XCH   @B^#2           ;Update LSRCD, B-->LSD of DATA
2397  0257  32            CLR   C
2398  0258  15    LOOP20: MOV   A,@B^#1         ;ACC=DATA(i), B-->PROD(i)
2399  0259  56            ADSK  #6              ;Add BCD Correction Factor
2400  025A  30            ADSK  @B+C            ;ACC=PROD(i)+DATA(i), skip if
2401  025B                                      ;...Carry sets
2402  025B  4A            ADD   10              ;   Restore BCD value if
2403  025C                                      ;   correction wasn't necessary
2404  025C  17            XDSK  @B^#1           ;Update PROD(i), B-->DATA(i-1)
2405  025D  4E            MOV   A,BD            ;ACC=i-1
2406  025E  54            ADSK  #4              ;ACC=i+3, skip if i>12 and add
2407  025F                                      ;...the remaining MSDs
2408  025F  D1            JMP   LOOP19          ;   Check to see if we need to
2409  0260                                      ;   add DATA again
2410  0260  D8            JMP   LOOP20          ;   Add next MSDs of DATA
2411  0261  1C    LSRD1:  MVSK  B,#IOBUF+1      ;B-->IOBUF(1)
2412  0262  84            CALL  SHFTD           ;Shift digits of CLFC down
2413  0263  2A            MVSK  B,#MATH+2       ;B-->LI
2414  0264  05            MOV   A,@B^#0         ;ACC=LI
2415  0265  5F            ADSK  #$F             ;ACC=LI-1, skip if LI>0
2416  0266  EA            AJMP  LSTDIG          ;    Jump if LaST CLFC DIGit
2417  0267  04            XISK  @B^#0           ;Update LI, B-->MATH(3)
2418  0268  84            CALL  SHFTD           ;Throw away LSD of PROD so we
2419  0269                                      ;...keep only the 3 MSDs
2420  0269  D1            JMP   LOOP19          ;Process next CLFC digit
2421  026A              ;------------ Floating Point Normalization -------------
2422  026A  2B    LSTDIG: MVSK  B,#MATH+3       ;B-->MATH(3)
2423  026B  05            MOV   A,@B^#0         ;ACC=MSD of PROD
2424  026C  5F            ADSK  #$F             ;Skip if MSD>0 (4 Significant
2425  026D                                      ;...Digits in PROD)
2426  026D  F3            AJMP  SIG_3           ;    Jump if only 3 Sig. Digits
2427  026E  84            CALL  SHFTD           ;Shift one more time...
2428  026F  29            MVSK  B,#MATH+1       ;B-->MATH(1)
2429  0270  05            MOV   A,@B^#0         ;ACC=EXPProduct
2430  0271  51            ADSK  #1              ;Increment EXPP
2431  0272  06            XCH   @B^#0           ;Update EXPP
2432  0273  232A  SIG_3:  MOV   A,MATH+1        ;ACC=EXPP
2433  0275  2B            MVSK  B,#MATH+3       ;B-->MATH(3)=EXPP
2434  0276  06            XCH   @B^#0           ;EXPP=ACC
```

```
2435  0277 05              MOV   A,@B^#0       ;ACC=EXPProduct
2436  0278 57              ADSK  #7            ;Skip if EXPP>8 (FP-value is
2437  0279                                     ;...greater than 9.99E8)
2438  0279 C9              JMP   J_CKT3        ;   Jump and return
2439  027A C4              JMP   OVRNG         ;Jump and clamp PRODUCT-value
2440  027B
2441  027B          ;****** HEXADECIMAL FLOATING POINT MULTIPLICATION ******
2442  027B          ;Perform 3-digit FP-Multiplication of 4-digit FP16 DATA
2443  027B          ;at FLAC with 4-digit FP16 MULTiplier at IOBUF.  FP16
2444  027B          ;format consists of 4 HEX digits, EXP16,Z,Y,X, with
2445  027B          ;VALUE = Z.YXx16^EXP16.  Exits with PRODuct Exponent at
2446  027B          ;MATH(3) and PRODuct Digits at MATH(4),(5),(6).  The
2447  027B          ;algorithm works by repeated hexadecimal addition of
2448  027B          ;DATA to PRODuct (based on MULTiplier-Digit) followed by
2449  027B          ;a 1-digit shift until all 3 digits of MULTiplier are
2450  027B          ;used.  It is assumed (no tests) that -9<EXP<8 for both
2451  027B          ;EXPC and EXPD where $8=-8, $F=-1, $0=0, and $7=7.
2452  027B          ;
2453  027B 3B       HEXMLT: MVSK B,#FLAC       ;B-->EXPD
2454  027C 00              CLR   A
2455  027D 26              XCH   @B^#2         ;ACC=EXPD, EXPD=0, B-->EXPM
2456  027E 31              ADD   @B            ;ACC=EXPD+EXPM (PRODuct EXP)
2457  027F 29              MVSK  B,#MATH+1     ;B-->MATH(2)
2458  0280 04              XISK  @B^#0         ;MATH(1)=EXPProduct, B-->MATH(2)
2459  0281 72              MOVI  @B,#2         ;MATH(2)=Loop Index, B-->MATH(3)
2460  0282 80              CALL  ZERO          ;Clear from MATH(3) to MATH(6)
2461  0283 A2       LOOP21: CALL CHKTIM        ;Service RATE-Task if necessary
2462  0284 1E              MVSK  B,#IOBUF+3    ;B-->LS Remaining MULT Digit
2463  0285 05              MOV   A,@B^#0       ;ACC=LSRMD
2464  0286 5F              ADSK  #$F           ;Decrement ACC, skip if ACC≥0
2465  0287 D2              AJMP  LSRD2         ;   Jump if LSRMD=0
2466  0288 26              XCH   @B^#2         ;Update LSRMD, B-->LSD of DATA
2467  0289 32              CLR   C
2468  028A 15       LOOP22: MOV  A,@B^#1       ;ACC=DATA(i), B-->PROD(i)
2469  028B 30              ADSK  @B+C          ;ACC=PROD(i)+DATA(i)
2470  028C 44              NOP                 ;   Go ahead and carry
2471  028D 17              XDSK  @B^#1         ;Update PROD(i), B-->DATA(i-1)
2472  028E 4E              MOV   A,BD          ;ACC=i-1
2473  028F 54              ADSK  #4            ;ACC=i+3, skip if i>12
2474  0290 C3              JMP   LOOP21        ;   Check to see if we need to
2475  0291                                     ;   add DATA again
2476  0291 CA              JMP   LOOP22        ;Add next MSDs of DATA
2477  0292 1C       LSRD2:  MVSK B,#IOBUF+1    ;B-->IOBUF(1)
2478  0293 84              CALL  SHFTD         ;Shift digits of MULT down
2479  0294 2A              MVSK  B,#MATH+2     ;B-->LI
2480  0295 05              MOV   A,@B^#0       ;ACC=LI
2481  0296 5F              ADSK  #$F           ;ACC=LI-1, skip if LI>0
2482  0297 DB              AJMP  LSTDGT        ;   Jump if last MULT Digit
2483  0298 04              XISK  @B^#0         ;Update LI, B-->MATH(3)
2484  0299 84              CALL  SHFTD         ;Throw away LSD of PROD so we
2485  029A                                     ;...keep only the 3 MSDs
2486  029A C3              JMP   LOOP21        ;   Process next MULT digit
2487  029B          ;------------ Floating Point Normalization -------------
2488  029B 2B       LSTDGT: MVSK B,#MATH+3     ;B-->MATH(3)
2489  029C 05              MOV   A,@B^#0       ;ACC=MSD of PROD
2490  029D 5F              ADSK  #$F           ;Skip if MSD>0 (4 Significant
2491  029E                                     ;...Digits in PROD)
2492  029E E5              AJMP  SIG3          ;   Jump if only 3 Sig. Digits
2493  029F 84              CALL  SHFTD         ;Shift one more time...
2494  02A0 29              MVSK  B,#MATH+1     ;B-->MATH(1)
2495  02A1 05              MOV   A,@B^#0       ;ACC=EXPProduct
2496  02A2 51              ADSK  #1            ;Increment EXPP
2497  02A3 44              NOP                 ;   OK to skip if EXPP<0
2498  02A4 06              XCH   @B^#0         ;Update EXPP
2499  02A5 232A    SIG3:    MOV  A,MATH+1      ;ACC=EXPP
2500  02A7 23AC             XCH  MATH+3        ;EXPP=ACC
2501  02A9 6332    J_CKT4:  JMP  CK_TIM        ;Service RATE-Task if necessary
2502  02AB                                     ;...and RETurn
2503  02AB
```

```
2504  02AB            ;*************** COPY RAT_T into FLAC ****************
2505  02AB            ;FP*4-->FP*4: SOURCE remains intact.
2506  02AB            ;
2507  02AB 3B    TRT2FL: MVSK  B,#FLAC      ;B-->FLAC(0)
2508  02AC 2324       MOV   A,RAT_T       ;ACC=RAT_T(0)
2509  02AE 04          XISK  @B^#0         ;FLAC=ACC, B-->FLAC(1)
2510  02AF 2325       MOV   A,RAT_T+1     ;ACC=RAT_T(1)
2511  02B1 04          XISK  @B^#0         ;FLAC(1)=ACC, B-->FLAC(2)
2512  02B2 2326       MOV   A,RAT_T+2     ;ACC=RAT_T(2)
2513  02B4 04          XISK  @B^#0         ;FLAC(2)=ACC, B-->FLAC(3)
2514  02B5 2327       MOV   A,RAT_T+3     ;ACC=RAT_T(3)
2515  02B7 06          XCH   @B^#0         ;FLAC(3)=ACC
2516  02B8 E9          JMP   J_CKT4        ;Service RATE-Task if necessary
2517  02B9                                 ;...and RETurn
2518  02B9
2519  02B9            ;********** HEXADECIMAL FLOATING POINT DIVIDE **********
2520  02B9            ;Perform 3-digit FP-Division of 4-digit FP16 DiVideND at
2521  02B9            ;FLAC by 4-digit FP16 DiViSoR at IOBUF.  FP16 format
2522  02B9            ;consists of 4 HEX digits, EXP16,Z,Y,X, with VALUE =
2523  02B9            ;Z.YXx16^EXP16.  Exits with QUOtienT Exponent at MATH(3)
2524  02B9            ;and QUOtienT Digits at MATH(4),(5),(6).  Algorithm
2525  02B9            ;works by repeated subtraction of DiViSoR from DiVideND
2526  02B9            ;until difference goes negative at which time DiViSoR is
2527  02B9            ;added back, the DiVideND is left-shifted, and the
2528  02B9            ;process repeated until 3 QUOtienT digits are obtained
2529  02B9            ;(Trial Subtraction Method).  If either the DiVideND or
2530  02B9            ;the DiViSoR are zero, this routine will loop
2531  02B9            ;infinitely.  The quotient exponent is correct only if
2532  02B9            ;it lies in the range, -8<EXPQ<7.
2533  02B9            ;
2534  02B9 3B    FDIV16: MVSK  B,#FLAC      ;B-->EXPD
2535  02BA 00          CLR   A
2536  02BB 26          XCH   @B^#2         ;ACC=EXPD, EXPD=0, B-->EXPR
2537  02BC 40          CPL   A             ;ACC=-(EXPD+1)
2538  02BD 31          ADD   @B            ;ACC=EXPR-EXPD-1
2539  02BE 40          CPL   A             ;ACC=EXPD-EXPR (Quotient EXP)
2540  02BF 52          ADSK  #2            ;ACC=EXPQuo+2=EXPQuo'
2541  02C0 44          NOP                 ;   Ignore skip
2542  02C1 06          XCH   @B^#0         ;EXPR=EXPQuo'
2543  02C2 00          CLR   A
2544  02C3 36          XCH   @B^#3         ;ACC=EXPQuo', EXPR=0, B-->EXPQ
2545  02C4 04          XISK  @B^#0         ;EXPQ=EXPQuo', B-->MSD of QUOT
2546  02C5 80          CALL  ZERO          ;Clear all 3 Nibbles of QUOT
2547  02C6 A2    LOOP23: CALL  CHKTIM       ;Service RATE-Task if necessary
2548  02C7 1E          MVSK  B,#IOBUF+3    ;B-->LSD of DVSR
2549  02C8 22          SET   C             ;Set !Borrow for subtraction
2550  02C9 25    LOOP24: MOV   A,@B^#2      ;ACC=DVSR(j), B-->DVND(j)
2551  02CA 10          SBSK  @B-!C         ;ACC=DVND(j)-DVSR(j)
2552  02CB 44          NOP                 ;   Go ahead and !borrow
2553  02CC 27          XDSK  @B^#2         ;Update DVND(i), B-->DVSR(j-1)
2554  02CD 4E          MOV   A,BD          ;ACC=j
2555  02CE 54          ADSK  #4            ;ACC=j+4, skip if j>11
2556  02CF D1          AJMP  SUBDN1        ;   Loop subtraction is done
2557  02D0 C9          JMP   LOOP24        ;Subtract 4 Nibbles
2558  02D1 20    SUBDN1: SKP   C            ;Skip if no Borrow
2559  02D2 D8          AJMP  ADBAK1        ;   Jump and add DiViSoR back
2560  02D3 2E          MVSK  B,#MATH+6     ;B-->QUOT(i)
2561  02D4 05          MOV   A,@B^#0       ;ACC=QUOT(i)
2562  02D5 51          ADSK  #1            ;ACC=QUOT(i)+1
2563  02D6 06          XCH   @B^#0         ;Update QUOT(i)
2564  02D7 C6          JMP   LOOP23        ;Jump and subtract DVSR again
2565  02D8 1E    ADBAK1: MVSK  B,#IOBUF+3   ;B-->LSD of DVSR
2566  02D9 25    LOOP25: MOV   A,@B^#2      ;ACC=DVSR(j), B-->DVND(j)
2567  02DA 30          ADSK  @B+C          ;ACC=DVND(j)+DVSR(j)
2568  02DB 44          NOP                 ;   Go ahead and carry
2569  02DC 27          XDSK  @B^#2         ;Update DVND(j), B-->DVSR(j-1)
2570  02DD 4E          MOV   A,BD          ;ACC=j
2571  02DE 54          ADSK  #4            ;ACC=j+4, skip if j>11
2572  02DF E1          AJMP  ABK_DN        ;   Loop addition is done
2573  02E0 D9          JMP   LOOP25        ;Add back all 4 Nibbles
2574  02E1 2C    ABK_DN: MVSK  B,#MATH+4    ;B-->MSD of QUOT
```

```
2575  02E2  05              MOV   A,@B^#0        ;ACC=MSD of QUOT
2576  02E3  5F              ADSK  #$F            ;Skip if MSD of QUOT>0
2577  02E4  E7              AJMP  N_DONE         ;   Jump, do some housekeeping
2578  02E5  6332            JMP   CK_TIM         ;Service RATE-Task if necessary
2579  02E7                                       ;...and RETurn
2580  02E7  88      N_DONE: CALL  SHFTU          ;Shift partial QUOT up 1 Nibble
2581  02E8  3B              MVSK  B,#FLAC        ;B-->above MSD of partial DVND
2582  02E9  88              CALL  SHFTU          ;Shift partial DVND up 1 Nibble
2583  02EA  2B              MVSK  B,#MATH+3      ;B-->DXPQuo'
2584  02EB  05              MOV   A,@B^#0        ;ACC=EXPQuo'
2585  02EC  5F              ADSK  #$F            ;ACC=EXPQuo'-1
2586  02ED  44              NOP                  ;   Ignore skip
2587  02EE  06              XCH   @B^#0          ;Update EXPQ with decremented
2588  02EF                                       ;...value.  EXPQ is correct even
2589  02EF                                       ;...if DVND<DVSR
2590  02EF  C6              JMP   LOOP23         ;Jump, compute another digit
2591  02F0
2592  02F0                  ;********** POSITION FP-HEX CONSTANT IN IOBUF **********
2593  02F0                  ;********** AS AN INTEGER IN MATH/AMTH BUFFER **********
2594  02F0                  ;Enter with FP-Hex CONSTant in IOBUF and C=1/0 for MATH/
2595  02F0                  ;AMTH target-buffer.  FP-Hex format is EXP16,W,V,U and
2596  02F0                  ;value = $W.VUx16^EXP16.
2597  02F0                  ;
2598  02F0  1B      MOVFPH: MVSK  B,#IOBUF       ;B-->IOBUF(0)
2599  02F1  25      LOOP26: MOV   A,@B^#2        ;ACC=IOBUF(i), B-->FLAC(i)
2600  02F2  24              XISK  @B^#2          ;FLAC(i)=ACC, B-->IOBUF(i+1),
2601  02F3                                       ;...skip on overflow
2602  02F3  F1              JMP   LOOP26         ;Move all 4 nibbles
2603  02F4  3B              MVSK  B,#FLAC        ;B-->FLAC(0)
2604  02F5  05              MOV   A,@B^#0        ;ACC=EXP16 of CONST
2605  02F6  59              ADSK  #9             ;ACC=EXP16+9=position for MSN,
2606  02F7                                       ;...skip if EXP16>6 ==> (MSN
2607  02F7                                       ;...position)>15
2608  02F7  FC              AJMP  EXPOK2         ;   Jump if MSN position < 16
2609  02F8  76              MOVI  @B,#$6         ;Clamp value at $F.FFx16^6
2610  02F9  7F              MOVI  @B,#$F         ;                "
2611  02FA  7F              MOVI  @B,#$F         ;                "
2612  02FB  7F              MOVI  @B,#$F         ;                "
2613  02FC  20      EXPOK2: SKP   C              ;Skip to load CONST in MATH-Bufr
2614  02FD  18              MVSK  B,#AMTH        ;    B-->AMTH(0)
2615  02FE  28              MVSK  B,#MATH        ;    B-->MATH(0)
2616  02FF  80              CALL  ZERO           ;Clear entire MATH/AMTH-Buffer
2617  0300  233C            MOV   A,FLAC         ;ACC=EXP16 of CONST
2618  0302  59              ADSK  #9             ;ACC=EXP16+9=position for MSN
2619  0303  50              MOV   BD,A           ;B-->position for MSN of CONST
2620  0304  233D            MOV   A,FLAC+1       ;ACC=MSN of CONST
2621  0306  07              XDSK  @B^#0          ;MATH/AMTH(EXP16)=ACC, B-->SSN
2622  0307  4E              MOV   A,BD           ;ACC=DIGT# for SSN
2623  0308  57              ADSK  #7             ;Skip if DIGT#>8
2624  0309  F2              AJMP  CK_TIM         ;Service RATE-Task if necessary
2625  030A                                       ;...and RET if DIGT#<9, CONST<16
2626  030A  233E            MOV   A,FLAC+2       ;ACC=SSN of CONST
2627  030C  07              XDSK  @B^#0          ;MATH/AMTH(EXP16+1)=ACC, B-->MSN
2628  030D  4E              MOV   A,BD           ;ACC=DIGT# for LSN
2629  030E  57              ADSK  #7             ;Skip if DIGT#>8
2630  030F  F2              AJMP  CK_TIM         ;   Return if DIGT#<9, CONST<256
2631  0310  233F            MOV   A,FLAC+3       ;ACC=LSN of CONST
2632  0312  06              XCH   @B^#0          ;MATH/AMTH(EXP16+2)=ACC
2633  0313  F2              AJMP  CK_TIM
2634  0314
2635  0314                  ;*************** FLOAT D_DS into IOBUF ***************
2636  0314                  ;INT*4-->FP*4:  Float δCm, SOURCE remains intact.
2637  0314                  ;
2638  0314  1B      FLT_DS: MVSK  B,#IOBUF       ;B-->IOBUF(0)
2639  0315  80              CALL  ZERO           ;IOBUF(i)=0 for i=0,1,2,3
2640  0316  33F3            MVSK  B,#D_DS+3      ;B-->D_DS(3)
2641  0318  00              CLR   A
2642  0319  21      LOOP27: CSKE  A,@B           ;Skip if D_DS(i)=0
2643  031A  DE              AJMP  MSNOK2         ;   Jump if D_DS(i)>0
2644  031B  07              XDSK  @B^#0          ;ACC=0, D_DS(i)=ACC=0,
2645  031C                                       ;...B-->D_DS(i-1), skip if
```

```
2646  031C                                       ;...Bd=15=-1
2647  031C  D9              JMP   LOOP27         ;   Check all nibbles of D_DS
2648  031D  F2              AJMP  CK_TIM         ;There is no non-zero MSN if the
2649  031E                                       ;...loop finishes. Service
2650  031E                                       ;...RATE-Task if necessary and
2651  031E                                       ;...RETurn
2652  031E  4E      MSNOK2: MOV   A,BD           ;ACC=Bd of MSN (0,1,2,3)
2653  031F  239C            XCH   IOBUF          ;Save Bd at IOBUF(0)=EXP16
2654  0321  05              MOV   A,@B^#0        ;ACC=MSN
2655  0322  239D            XCH   IOBUF+1        ;Save MSN
2656  0324  07              XDSK  @B^#0          ;B-->SSN, skip if no SSN
2657  0325  E7              AJMP  SSN_OK         ;   Jump if SSN exists
2658  0326  F2              AJMP  CK_TIM         ;Jump if no SSN
2659  0327  05      SSN_OK: MOV   A,@B^#0        ;ACC=SSN
2660  0328  239E            XCH   IOBUF+2        ;Save SSN
2661  032A  07              XDSK  @B^#0          ;B-->LSN, skip if no LSN
2662  032B  ED              AJMP  LSN_OK         ;   Jump if LSN exists
2663  032C  F2              AJMP  CK_TIM         ;Jump if no LSN
2664  032D  05      LSN_OK: MOV   A,@B^#0        ;ACC=LSN
2665  032E  239F            XCH   IOBUF+3        ;Save LSN
2666  0330  F2              AJMP  CK_TIM
2667  0331
2668  0331  44              NOP                  ;NOP to adjust page boundaries
2669  0332
2670  0332          ;****** GET DOSE-COUNT DATA, INCREMENT TIME REGS, ******
2671  0332          ;******** AND SERVICE THE DOSE RATE CALCULATION ********
2672  0332          ;CHKTIM returns immediately if the Timer overflow latch
2673  0332          ;is not set.  Otherwise, DELTA-CNTR is computed and
2674  0332          ;INTRVL is adjusted as necessary and then the TIME-Regs
2675  0332          ;are incremented.  If the sampling interval has less
2676  0332          ;than one Timer-overflow to go, the routine waits for
2677  0332          ;the overflow and then updates RATE.
2678  0332          ;
2679  0332          ;*-*-*-* Check COP444C .125 s Timer for Overflow *-*-*-*
2680  0332  41      CK_TIM: SKP   T              ;Skip if TIMER Overflowed
2681  0333  48              RET                  ;   Return if it hasn't
2682  0334          ;*-*-*-*-*-*-*-*-*-*-*-*-*-*-*-*-*-*-*-*-*-*-*-*-*-*-*-*
2683  0334          ;
2684  0334          ;------ Increment T_DSP for Time Above Rate Alarm ------
2685  0334  33F8            MVSK  B,#T_DSP       ;B-->T_DSP        (&&&b, 4/28/90)
2686  0336  05              MOV   A,@B^#0        ;ACC=T_DSP
2687  0337  51              ADSK  #1             ;ACC=T_DSP+1, skip on carry
2688  0338                                       ;...(should never happen)
2689  0338  06              XCH   @B^#0          ;   Update if T_DSP<15
2690  0339                                       ;...              (&&&e, 4/28/90)
2691  0339          ;----- Check to see if Push-Button is being Pushed -----
2692  0339  33A8            MVSK  B,#INPORT      ;B-->INPORT
2693  033B  3328            MOV   A,IN           ;ACC=IN-PORT
2694  033D  06              XCH   @B^#0          ;INPORT=IN
2695  033E  01              SKNB  @B.0           ;Skip if MODE PB is being pushed
2696  033F  635E            JMP   N_PUSH         ;   Jump if PB not pushed
2697  0341          ;----- Beep Alarm and Blank LCD to Acknowledge PB ------
2698  0341  38              MVSK  B,#D_REG       ;B-->D_REG
2699  0342  4D              SET   @B.0           ;Set COP472-3 ENABLE bit
2700  0343  4B              SET   @B.3           ;Get ready to turn on AUDIO
2701  0344  05              MOV   A,@B^#0        ;ACC=new D_REG value
2702  0345  50              MOV   BD,A           ;Bd=D_REG control nibble
2703  0346  333E            MOV   D,BD           ;Turn on AUDIO to acknowledge PB
2704  0348                                       ;...and enable COP472-3
2705  0348          ;
2706  0348          ;The LCD is blanked by writing to the 472-3 with SO=0.
2707  0348          ;This means that the C-Backplane is driven by the 472-3
2708  0348          ;clock signal for one DSP since the Command is %0000
2709  0348          ;instead of SAMODE=%1100.  However, it works and takes
2710  0348          ;less code space.
2711  0348          ;
2712  0348  3394            MVSK  B,#AXDSB       ;B-->AXDSB(0)
2713  034A                                       ;...              (&&&b, 4/28/90)
2714  034A  22              SET   C              ;Get ready to turn on SK-Clock
2715  034B  3360            MOV   EN,#0          ;Disable IRQs, no SO-out (SO=0)
```

```
2716  034D  3360            MOV   EN,#0         ;Disable IRQs, no SO-out (SO=0)
2717  034F                                      ;...again in case IRQ occurred
2718  034F                                      ;...during execution of above
2719  034F                                      ;...instruction   (&&&, 5/22/90)
2720  034F  4F              XCH   SIO,C         ;Turn on SK-Clock
2721  0350  05      LOOP28: MOV   A,@B^#0       ;ACC=AXDSB(i)
2722  0351  04              XISK  @B^#0         ;B-->AXDSB(i+1), skip if i=12
2723  0352  D0              AJMP  LOOP28        ;--- BIT(2+3i)
2724  0353  8F              CALL  DLY_2         ;--- BIT(36,37)  (&&&e, 4/28/90)
2725  0354  32              CLR   C             ;Get ready to turn off SK-clock,
2726  0355                                      ;...--- BIT(38)
2727  0355  4F              XCH   SIO,C         ;Turn off SK-clock, --- BIT(39)
2728  0356  3362            MOV   EN,#2         ;Re-enable IRQs
2729  0358  00              CLR   A
2730  0359  23B8            XCH   MD2TMR        ;Make sure MD2TMR starts from 0
2731  035B                                      ;...next time MODE2 is entered
2732  035B  38              MVSK  B,#D_REG      ;B-->D_REG
2733  035C  4C              CLR   @B.0          ;Clear COP472-3 ENABLE bit
2734  035D  FE              AJMP  CTRL1         ;Disable the COP472-3 and see if
2735  035E                                      ;...RATE-Task is ready
2736  035E          ;------- AUDIO-WARBLE if ALRM.3|FLGS.1|FLAG.3=1 --------
2737  035E  38      N_PUSH: MVSK  B,#D_REG      ;B-->D_REG
2738  035F  43              CLR   @B.3          ;Assume no AUDIO
2739  0360  3381            MVSK  B,#FLAG
2740  0362  03              SKNB  @B.2          ;Skip if no AUDIO-Alarms
2741  0363  E9              AJMP  ALRM1         ;   Jump and handle Alarm
2742  0364  00              CLR   A
2743  0365  2383            XCH   WARBLE        ;Reset WARBLE to zero so AUDIO
2744  0367                                      ;...sounds ASAP after next Alarm
2745  0367  38              MVSK  B,#D_REG      ;B-->D_REG
2746  0368  FE              AJMP  CTRL1         ;Jump and turn AUDIO off
2747  0369  3383    ALRM1:  MVSK  B,#WARBLE     ;B-->WARBLE
2748  036B  00              CLR   A             ;ACC=0
2749  036C  22              SET   C             ;Assume no AUDIO
2750  036D  21              CSKE  A,@B          ;Skip if WARBLE=0
2751  036E  F0              AJMP  N_BP11        ;   Jump, maybe no BEEP
2752  036F  32              CLR   C             ;Clear C for a BEEP
2753  0370  52      N_BP11: ADSK  #CYCL2        ;ACC=CYCL2
2754  0371  21              CSKE  A,@B          ;Skip if WARBLE=CYCL2
2755  0372  F4              AJMP  N_BP21        ;   Jump, maybe no BEEP
2756  0373  32              CLR   C             ;Clear C for a BEEP
2757  0374  05      N_BP21: MOV   A,@B^#0       ;ACC=WARBLE
2758  0375  51              ADSK  #1            ;ACC=WARBLE+1
2759  0376  06              XCH   @B^#0         ;Update WARBLE, ACC=WARBLEold
2760  0377  5C              ADSK  #$11-PERIOD   ;ACC=WARBLEold+17-NTOFS, skip
2761  0378                                      ;...if WARBLEold+1=WARBLE=PERIOD
2762  0378  FB              AJMP  N_RST1        ;   Jump, WARBLE<PERIOD
2763  0379  00              CLR   A
2764  037A  06              XCH   @B^#0         ;Reset WARBLE to 0
2765  037B  38      N_RST1: MVSK  B,#D_REG      ;B-->D_REG
2766  037C  20              SKP   C             ;Skip if WARBLE!=0|CYCL2
2767  037D  4B              SET   @B.3          ;   Enable AUDIO if WRBL=0|CYCL2
2768  037E  05      CTRL1:  MOV   A,@B^#0       ;ACC=D_REG-value
2769  037F  50              MOV   BD,A          ;Bd=D_REG control nibble
2770  0380  333E            MOV   D,BD          ;Enable/Disable AUDIO
2771  0382          ;---------- See if RATE-Task needs servicing -----------
2772  0382  08              MVSK  B,#FLGS       ;B-->FLGS
2773  0383  13              SKNB  @B.3          ;Skip if RATE-Task inactive
2774  0384  CE              AJMP  DO_RAT        ;   Jump if RATE-Task active
2775  0385  33A8    RTN3:   MVSK  B,#INPORT     ;B-->INPORT
2776  0387  01              SKNB  @B.0          ;Skip if MODE PB was pushed
2777  0388  48              RET                 ;   Return if it wasn't
2778  0389  08              MVSK  B,#FLGS       ;B-->FLGS
2779  038A  01              SKNB  @B.0          ;Skip if MODE-Task not running
2780  038B  64CE            JMP   MAIN1         ;   Abort current MODE-Task and
2781  038D                                      ;   jump immediately to MAIN1
2782  038D  48              RET                 ;Pop stack and continue
2783  038E  60B3    DO_RAT: JMP   LD_NRI        ;Compute D_RT and reduce INTRVL
2784  0390                                      ;...if D_RT>255.  This JMP will
2785  0390                                      ;...JMP back to INCTIM
```

```
2786  0390 08      INCTIM: MVSK  B,#FLGS       ;B-->FLGS
2787  0391 13              SKNB  @B.3          ;Skip if RATE-Task canceled
2788  0392 D5              AJMP  N_CNCL        ;   Jump to continue RATE-Task
2789  0393 640F            JMP   INT_OK        ;Use a low value estimated from
2790  0395                                     ;...the count (≥16xLIMIT before
2791  0395                                     ;...right shift) and previous
2792  0395                                     ;...INTRVL-value
2793  0395           ;------ Increment Timer Overflow Counter Nibbles -------
2794  0395 1F      N_CNCL: MVSK  B,#TIME       ;B-->LSN of Time, TIME(0)
2795  0396 22              SET   C             ;Set C to increment TIME Regs
2796  0397 00      LOOP29: CLR   A
2797  0398 30              ADSK  @B+C          ;Increment TIME(i) (1/8 s units)
2798  0399 DC              AJMP  NCRY2         ;   Go ahead and carry
2799  039A 04              XISK  @B^#0         ;Update TIME(i), B-->TIME(i+1)
2800  039B D7              JMP   LOOP29        ;   Inc TIME(i+1) if i+1<4
2801  039C 06      NCRY2:  XCH   @B^#0         ;Update the No-carry nibble
2802  039D           ;--------- Check if within one Timer-overflow ----------
2803  039D           ;-------------- of end of Sampling Interval -------------
2804  039D 39              MVSK  B,#INTRVL     ;B-->INTRVL
2805  039E 25              MOV   A,@B^#2       ;ACC=INTRVL, B-->REG1       (?.?)
2806  039F 50              MOV   BD,A          ;B-->TIME(INTRVL)
2807  03A0 05              MOV   A,@B^#0       ;ACC=TIME(INTRVL)
2808  03A1 5E              ADSK  #16-RSI_MN    ;Skip if TIME(INTRVL)≥RSI_MN
2809  03A2                                     ;...             (&&&, 5/10/90)
2810  03A2 C5              JMP   RTN3          ;Return, RSI not over yet
2811  03A3 1F      SYNKRO: MVSK  B,#TIME       ;B-->TIME(0), can use TIME now
2812  03A4                                     ;...since TIMer-function is done
2813  03A4 332F    WAIT1:  MOV   @BA,T         ;TIME(0) = MSN of Timer
2814  03A6 05              MOV   A,@B^#0       ;ACC=TIME(0)
2815  03A7 51              ADSK  #1            ;Skip if TIME(0)=15 meaning that
2816  03A8                                     ;...we're within 64 clock-ticks
2817  03A8                                     ;...of next TOF
2818  03A8 E4              JMP   WAIT1         ;   Loop until TIME(0)=15
2819  03A9           ;
2820  03A9           ;------- We've now got 64-<10 Instruction-Cycles -------
2821  03A9           ;---------- to service the AUDIO routines again --------
2822  03A9           ;------- (this service will be early by TOFP/16) -------
2823  03A9           ;
2824  03A9           ;------- AUDIO-WARBLE if ALRM.3|FLGS.1|FLAG.3=1 --------
2825  03A9 38      SY_NOW: MVSK  B,#D_REG      ;B-->D_REG
2826  03AA 43              CLR   @B.3          ;Assume no AUDIO
2827  03AB 3381            MVSK  B,#FLAG       ;B-->FLAG
2828  03AD 03              SKNB  @B.2          ;Skip if no AUDIO-Alarms
2829  03AE F5              AJMP  ALRM2         ;   Jump and handle Alarm
2830  03AF 00              CLR   A
2831  03B0 2383            XCH   WARBLE        ;Reset WARBLE to zero so AUDIO
2832  03B2                                     ;...sounds ASAP after next Alarm
2833  03B2 38              MVSK  B,#D_REG      ;B-->D_REG
2834  03B3 63CB            JMP   CTRL2         ;Jump and turn AUDIO off
2835  03B5 3383    ALRM2:  MVSK  B,#WARBLE     ;B-->WARBLE
2836  03B7 00              CLR   A             ;ACC=0
2837  03B8 22              SET   C             ;Assume no AUDIO
2838  03B9 21              CSKE  A,@B          ;Skip if WARBLE=0
2839  03BA FC              AJMP  N_BP12        ;   Jump, maybe no BEEP
2840  03BB 32              CLR   C             ;Clear C for a BEEP
2841  03BC 52      N_BP12: ADSK  #CYCL2        ;ACC=CYCL2
2842  03BD 21              CSKE  A,@B          ;Skip if WARBLE=CYCL2
2843  03BE 63C1            JMP   N_BP22        ;   Jump, maybe no BEEP
2844  03C0 32              CLR   C             ;Clear C for a BEEP
2845  03C1 05      N_BP22: MOV   A,@B^#0       ;ACC=WARBLE
2846  03C2 51              ADSK  #1            ;ACC=WARBLE+1
2847  03C3 06              XCH   @B^#0         ;Update WARBLE, ACC=WARBLEold
2848  03C4 5C              ADSK  #$11-PERIOD   ;ACC=WARBLEold+17-NTOFS, skip
2849  03C5                                     ;...if WARBLEold+1=WARBLE=PERIOD
2850  03C5 C8              AJMP  N_RST2        ;   Jump, WARBLE<PERIOD
2851  03C6 00              CLR   A
2852  03C7 06              XCH   @B^#0         ;Reset WARBLE to 0
2853  03C8 38      N_RST2: MVSK  B,#D_REG      ;B-->D_REG
2854  03C9 20              SKP   C             ;Skip if WARBLE!=0|CYCL2
2855  03CA 4B              SET   @B.3          ;   Enable AUDIO if WRBL=0|CYCL2
```

```
2856  03CB  05       CTRL2:   MOV   A,@B^#0      ;ACC=D_REG-value
2857  03CC  50                MOV   BD,A         ;Bd=D_REG control nibble
2858  03CD  333E              MOV   D,BD         ;Enable/Disable AUDIO
2859  03CF  08                MVSK  B,#FLGS      ;B-->FLGS
2860  03D0  13                SKNB  @B.3         ;Skip if RATE-Task not active
2861  03D1                                       ;...(SYNKRO or SY_NOW was called
2862  03D1                                       ;...by MAIN)
2863  03D1  D3                AJMP  WAIT2        ; Continue CK_TIM execution
2864  03D2  48                RET                ;Return to CALL from MAIN
2865  03D3           ;*-*-*-*-*-*-*- Now wait for next TOF -*-*-*-*-*-*-*-*
2866  03D3  41       WAIT2:   SKP   T
2867  03D4  D3                JMP   WAIT2        ; Wait for next Timer-overflow
2868  03D5           ;*-*-*-*-*-*-*-*-*-*-*-*-*-*-*-*-*-*-*-*-*-*-*-*-*-*-*
2869  03D5  60B4              JMP   LD_NRR       ;Update D_RT=N_RAT-O_RAT. This
2870  03D7                                       ;...JMP will JMP back to RTN2
2871  03D7                                       ;...and returns a value for C
2872  03D7           ;----------- Increase INTRVL if D_RT < LIMIT -----------
2873  03D7  20       RTN2:    SKP   C            ;Skip if D_RT≥16xLIMIT
2874  03D8  DB                AJMP  INCRS?       ; Jump if D_RT<16xLIMIT
2875  03D9                                       ;                (&&&, 4/21/90)
2876  03D9  640F     J_INOK:  JMP   INT_OK       ; Jump if D_RT≥16xLIMIT
2877  03DB  33B1     INCRS?:  MVSK  B,#D_RT+1    ;B-->D_RT(1), C=0
2878  03DD  00                CLR   A
2879  03DE  21                CSKE  A,@B         ;Skip if D_RT(1)=0 (D_RT<16)
2880  03DF  D9                JMP   J_INOK       ; Jump if D_RT(1)>0 (D_RT≥16),
2881  03E0                                       ; Note that this jump defeats
2882  03E0                                       ; the background correction.
2883  03E0                                       ; Any GMT this noisy shouldn't
2884  03E0                                       ; be used, anyway
2885  03E0  07                XDSK  @B^#0        ;B-->D_RT(0)    (&&&b, 4/21/90)
2886  03E1  233A              MOV   A,INTRVL     ;ACC=INTRVL
2887  03E3  5D                ADSK  #$D          ;ACC=INTRVL+13, skip if INTRVL=3
2888  03E4                                       ;...Can't go to longer interval
2889  03E4                                       ;...so do background correction
2890  03E4  FB                AJMP  N_INT3       ; Jump if INTRVL<3
2891  03E5                                       ;                (&&&e, 4/21/90)
2892  03E5           ;--- Correct low RATE-Values for spurious GMT pulses ---
2893  03E5  2343              MOV   A,BKGD       ;ACC=BKGD       (&&&b, 4/19/90)
2894  03E7  22                SET   C            ;Set !Borrow for subtraction
2895  03E8  10                SBSK  @B-!C        ;ACC=D_RT(0)-BKGD, skp no borrow
2896  03E9  00                CLR   A            ;   ACC=0
2897  03EA  06                XCH   @B^#0        ;D_RT(0)=D_RT(0)-BKGD or 0,
2898  03EB                                       ;...whichever is greater.
2899  03EB                                       ;...ACC=D_RT(0)true
2900  03EB  33C5              MVSK  B,#UPDATE    ;B-->UPDATE     (&&&b, 10/27/90)
2901  03ED  5F                ADSK  #$F          ;Skip if D_RT(0)true>0
2902  03EE  F3                AJMP  NO_CNT       ; Jump if D_RT(0)true=0
2903  03EF  45                CLR   @B.1         ;Clear UPDATE except for
2904  03F0  42                CLR   @B.2         ;...UPDATE.0 which is flag for
2905  03F1  43                CLR   @B.3         ;...EEPROM Updating
2906  03F2  F6                AJMP  GMTOK1       ;Jump and continue program
2907  03F3  05       NO_CNT:  MOV   A,@B^#0      ;ACC=UPDATE
2908  03F4  52                ADSK  #2           ;ACC=UPDATE+2, skip if UPDATE>13
2909  03F5                                       ;...(ie, 8 or more consecutive
2910  03F5                                       ;...RSIs with D_RT(0)true=0)
2911  03F5  06                XCH   @B^#0        ; UPDATE-->UPDATE+2
2912  03F6                                       ;...            (&&&e, 10/27/90)
2913  03F6  2343     GMTOK1:  MOV   A,BKGD       ;ACC=BKGD
2914  03F8  23C0              XCH   BG_ER        ;BG_ER=BKGD (for subtraction
2915  03FA                                       ;...from T_CNT)
2916  03FA  D9                JMP   J_INOK       ;Leave INTRVL=3 (&&&e, 4/19/90)
2917  03FB  52       N_INT3:  ADSK  #2           ;ACC=INTRVL+13+2=INTRVL+15, skip
2918  03FC                                       ;...if INTRVL>0 (ACC=0,1)
2919  03FC                                       ;...            (&&&b, 4/21/90)
2920  03FC  6407              JMP   LIM16        ; Jump if INTRVL=0
2921  03FE  5F                ADSK  #$F          ;ACC=INTRVL+30=INTRVL+14, skip
2922  03FF                                       ;...if INTRVL=2 (ACC=0)
2923  03FF                                       ;...            (&&&b, 5/26/90)
2924  03FF  C2                AJMP  INT12        ; Jump if INTRVL=1 (ACC=15)
```

```
2925  0400 5F              ADSK #16-LIM23    ;ACC=-LIM23
2926  0401 C4              AJMP INT23        ;   Jump and compare to D_RT(0)
2927  0402                                   ;               (&&&e, 5/26/90)
2928  0402 00    INT12:    CLR  A
2929  0403 5C              ADSK #16-LIM12    ;ACC=-LIM12
2930  0404 30    INT23:    ADSK @B+C         ;ACC=D_RT(0)-LIM12/LIM23, skip
2931  0405                                   ;...if D_RT(0)≥LIM12/LIM23
2932  0405 C7              AJMP LIM16        ;  Jump if D_RT(0)<LIM12/LIM23
2933  0406 CF              AJMP INT_OK       ;Jump if D_RT≥LIM12/LIM23
2934  0407                                   ;...           (&&&e, 4/21/90)
2935  0407 39    LIM16:    MVSK B,#INTRVL    ;B-->INTRVL
2936  0408 05              MOV  A,@B^#0      ;ACC=INTRVL
2937  0409 51              ADSK #1           ;ACC=INTRVL+1
2938  040A 06              XCH  @B^#0        ;INTRVL=INTRVL+1
2939  040B 3F              MVSK B,#D_RT      ;B-->D_RT(0), this and the next
2940  040C                                   ;...3 instructions shift D_RT(0)
2941  040C                                   ;...to D_RT(1) (x16) to account
2942  040C                                   ;...for INTRVL+1 (/16)
2943  040C 00              CLR  A            ;ACC=0
2944  040D 04              XISK @B^#0        ;ACC=D_RT(0), D_RT(0)=0,
2945  040E                                   ;...B-->D_RT(1)
2946  040E 06              XCH  @B^#0        ;D_RT(1)=ACC
2947  040F           ;---------- Save FP version of D_RT at RAT_M ----------
2948  040F 33D3  INT_OK:   MVSK B,#RAT_M+3   ;B-->RAT_M(3)
2949  0411 00    LOOP30:   CLR  A
2950  0412 07              XDSK @B^#0        ;RAT_M(i)=0 for i=0,1,2,3
2951  0413 D1              JMP  LOOP30
2952  0414 33B3            MVSK B,#D_RT+3    ;B-->D_RT(3)
2953  0416 00              CLR  A
2954  0417 21    LOOP31:   CSKE A,@B         ;Skip if D_RT(i)=0
2955  0418 DC              AJMP MSNOK3       ;   Jump if D_RT(i)>0
2956  0419 07              XDSK @B^#0        ;ACC=0, D_RT(i)=ACC=0,
2957  041A                                   ;...B-->D_RT(i-1), skip if
2958  041A                                   ;...Bd=15=-1
2959  041A D7              JMP  LOOP31       ;   Check all nibbles of D_RT
2960  041B F7              AJMP NO_MSN       ;There is no non-zero MSN if the
2961  041C                                   ;...loop finishes
2962  041C 4E    MSNOK3:   MOV  A,BD         ;ACC=Bd of MSN (0,1,2,3)
2963  041D 53              ADSK #3           ;ACC=Bd+3        (3,4,5,6)
2964  041E 23D0            XCH  RAT_M        ;Save Bd+3 at RAT_M(0)
2965  0420 05              MOV  A,@B^#0      ;ACC=MSN
2966  0421 23D1            XCH  RAT_M+1      ;Save MSN
2967  0423 07              XDSK @B^#0        ;B-->SSN, skip if no SSN
2968  0424 E6              AJMP SSNOK        ;   Jump if SSN exists
2969  0425 EF              AJMP NO_SSN       ;Jump if no SSN
2970  0426 05    SSNOK:    MOV  A,@B^#0      ;ACC=SSN
2971  0427 23D2            XCH  RAT_M+2      ;Save SSN
2972  0429 07              XDSK @B^#0        ;B-->LSN, skip if no LSN
2973  042A EC              AJMP LSNOK        ;   Jump if LSN exists
2974  042B EF              AJMP NO_SSN       ;Jump if no LSN
2975  042C 05    LSNOK:    MOV  A,@B^#0      ;ACC=LSN
2976  042D 23D3            XCH  RAT_M+3      ;Save LSN
2977  042F 33D0  NO_SSN:   MVSK B,#RAT_M     ;B-->RAT_M(0)=(3,4,5,6)
2978  0431 233A            MOV  A,INTRVL     ;ACC=INTRVL (0,1,2,3)
2979  0433 22              SET  C            ;Set !Borrow for subtraction
2980  0434 10              SBSK @B-!C        ;ACC=RAT_M(0)-INTRVL=
2981  0435                                   ;...(0,1,2,3,4,5,6)
2982  0435 44              NOP               ;   Go ahead and !borrow
2983  0436 06              XCH  @B^#0        ;RAT_M(0)=ACC=EXP16
2984  0437 08    NO_MSN:   MVSK B,#FLGS      ;B-->FLGS
2985  0438 43              CLR  @B.3         ;RATE-Calculation is complete,
2986  0439                                   ;...clear the RATE-Task flag
2987  0439 3381            MVSK B,#FLAG      ;B-->FLAG
2988  043B 45              CLR  @B.1         ;Clear RAT_M OLD/!NEW Flag
2989  043C 6385            JMP  RTN3
2990  043E
2991  043E           ;***************** ADD δCm to T_CNT ******************
2992  043E           ;Compute T_CNT(i)=T_CNT(i)+D_DS(i) for i=0,1,2,3 and
2993  043E           ;propagate Carry for i=4,5,6 (INT*7+INT*4). FLAG.0 is
2994  043E           ;set on return if addition overflow occurs.
```

```
2995  043E                 ;
2996  043E  3381    AD_DCM: MVSK  B,#FLAG      ;B-->FLAG
2997  0440  01              SKNB  @B.0         ;Skip if T_CNT Overflow Flag is
2998  0441                                     ;...clear and add cnt's
2999  0441  6332    J_CKT5: JMP   CK_TIM       ;   Service RATE-Task if
3000  0443                                     ;   necessary and RETurn
3001  0443  33C9            MVSK  B,#T_CNT     ;B-->T_CNT(0)
3002  0445  32              CLR   C
3003  0446  2370            MOV   A,D_DS       ;ACC=D_DS(0)
3004  0448  30              ADSK  @B+C         ;ACC=D_DS(0)+T_CNT(0)
3005  0449  44              NOP                ;   Go ahead and carry
3006  044A  04              XISK  @B^#0        ;Update T_CNT(0), B-->T_CNT(1)
3007  044B  2371            MOV   A,D_DS+1     ;ACC=D_DS(1)
3008  044D  30              ADSK  @B+C         ;ACC=D_DS(1)+T_CNT(1)
3009  044E  44              NOP                ;   Go ahead and carry
3010  044F  04              XISK  @B^#0        ;Update T_CNT(1), B-->T_CNT(2)
3011  0450  2372            MOV   A,D_DS+2     ;ACC=D_DS(2)
3012  0452  30              ADSK  @B+C         ;ACC=D_DS(2)+T_CNT(2)
3013  0453  44              NOP                ;   Go ahead and carry
3014  0454  04              XISK  @B^#0        ;Update T_CNT(2), B-->T_CNT(3)
3015  0455  2373            MOV   A,D_DS+3     ;ACC=D_DS(3)
3016  0457  30      OVFLW?: ADSK  @B+C         ;ACC=MSN+T_CNT(i+2)
3017  0458  44              NOP                ;   Go ahead and carry
3018  0459  04              XISK  @B^#0        ;T_CNT(i+2)=ACC,
3019  045A                                     ;...B->T_CNT(i+3)
3020  045A  00      LOOP47: CLR   A
3021  045B  30              ADSK  @B+C         ;ACC=T_CNT(i)+Carry
3022  045C  44              NOP                ;   Go ahead and carry
3023  045D  04              XISK  @B^#0        ;T_CNT(i)=ACC, B-->T_CNT(i+1)
3024  045E  DA              JMP   LOOP47       ;   Propagate Carry down to
3025  045F                                     ;   T_CNT(6)
3026  045F  20              SKP   C            ;Skip if overflow from addition
3027  0460  C1              JMP   J_CKT5       ;Service RATE-Task if necessary
3028  0461                                     ;...and RETurn
3029  0461          ;---- Set Overflow Flag and clamp T_CNT at $FFFFFFF ----
3030  0461  3381            MVSK  B,#FLAG      ;B-->FLAG
3031  0463  4D              SET   @B.0         ;Set T_CNT overflow flag
3032  0464  33C9            MVSK  B,#T_CNT     ;B-->T_CNT(0)
3033  0466  00      LOOP48: CLR   A
3034  0467  40              CPL   A            ;ACC=$F
3035  0468  04              XISK  @B^#0        ;T_CNT(i)=ACC
3036  0469  E6              JMP   LOOP48       ;   Set all 7 Nibbles = $F
3037  046A  C1              JMP   J_CKT5       ;Service RATE-Task if necessary
3038  046B                                     ;...and RETurn
3039  046B
3040  046B          ;************* Increment REG_NO if SI=0 **************
3041  046B          ;Returns with no skip if a non-zero value is retrieved
3042  046B          ;from serial port. Returns and skips if SI=0; a value
3043  046B          ;of C=0 is returned for REG_NO<16 and C=1 if REG_NO=16.
3044  046B          ;
3045  046B  00      Z_CHK:  CLR   A            ;ACC=0              (&&&b, 6/12/90)
3046  046C  9D              CALL  S_PTRN       ;@B=SRCHR=0, ACC=SIO (returns
3047  046D                                     ;...with C=0)
3048  046D  21              CSKE  A,@B         ;Skip if SI=0 (SIO=%0000)
3049  046E  48              RET                ;   RETurn if SI<>0
3050  046F  04              XISK  @B^#0        ;ACC=0, B-->REG_NO        (?.?)
3051  0470  22              SET   C            ;C=1
3052  0471  30              ADSK  @B+C         ;ACC=1+REG_NO
3053  0472  44              NOP                ;   Go ahead and carry
3054  0473  06              XCH   @B^#0        ;Update REG_NO
3055  0474  49              RTSK               ;ReTurn and SKip (&&&e, 6/12/90)
3056  0475
3057  0475  44              NOP                ;NOP to adjust page boundaries
3058  0476
3059  0476
3060  0476                  .INCLUDE  PD-1_C.ICL
0001+ 0476          ;****************************************************
0002+ 0476          ;***************** MAIN PROGRAM LOOP ****************
0003+ 0476          ;****************************************************
0004+ 0476          ;"I."
```

```
0005+ 0476                    ;--------------- UPDATE THE LCD DISPLAY ---------------
0006+ 0476                    ;Move FP-Decimal mantissa at MATH(4),(5),(6) to MNTISA,
0007+ 0476                    ;set units (C=1/0 for RATE/DOSE-Units) and adjust
0008+ 0476                    ;decimal point according to MATH(3)=EXP.
0009+ 0476                    ;
0010+ 0476  0D     MAIN:    MVSK  B,#UNITS      ;B-->UNITS
0011+ 0477  00              CLR   A
0012+ 0478  4A              ADD   10            ;ACC=10
0013+ 0479  20              SKP   C             ;Skip for RATE-Units ($A,$B,$C)
0014+ 047A  53              ADSK  #3            ;   DOSE Units are $D,$E,$F
0015+ 047B  06              XCH   @B^#0         ;UNITS=10
0016+ 047C  232C            MOV   A,MATH+3      ;ACC=EXP
0017+ 047E  5D     LOOP32:  ADSK  #$D           ;Subtract 3 (Add -3), skip on
0018+ 047F                                      ;...carry (no borrow)
0019+ 047F  C5              AJMP  ADBAK2        ;   Jump on no carry (borrow)
0020+ 0480  06              XCH   @B^#0         ;ACC=UNITS, UNITS=ACC
0021+ 0481  51              ADSK  #1            ;ACC=UNITS+1
0022+ 0482  06              XCH   @B^#0         ;Restore UNITS=10+EXP/3 and ACC
0023+ 0483  647E            JMP   LOOP32
0024+ 0485  53     ADBAK2:  ADSK  #3            ;Add 3 to restore modulus
0025+ 0486  44              NOP                 ;   Addition will always carry
0026+ 0487  29              MVSK  B,#DEC_PT     ;B-->DEC_PT
0027+ 0488  24              XISK  @B^#2         ;DEC_PT=EXP%3, B-->MNTISA   (?.?)
0028+ 0489  6853            CALL  CPY_M4        ;Move the rest of ARG to MNTISA
0029+ 048B            ;*-*-*-*-*- Service Automatic Shut Down Logic -*-*-*-*-*
0030+ 048B  2345            MOV   A,UPDATE      ;ACC=UPDATE
0031+ 048D  52              ADSK  #2            ;ACC=UPDATE+2, skip if UPDATE>13
0032+ 048E                                      ;...(ie, if 7 consecutive RSIs
0033+ 048E                                      ;...with D_RT(0)true=0)
0034+ 048E  D0              AJMP  GMTOK2
0035+ 048F  E4              AJMP  BD_GMT
0036+ 0490  33C4   GMTOK2:  MVSK  B,#PRGOPT     ;B-->PRGOPT       (&&&b, 5/06/90)
0037+ 0492  03              SKNB  @B.2          ;Skip if ASD feature is enabled
0038+ 0493  64CC   J_NTMO:  JMP   N_TMO         ;Jump if ASD disabled
0039+ 0495  33C6            MVSK  B,#BATTRY     ;B-->BATTRY
0040+ 0497  13              SKNB  @B.3          ;Skp if ASDP inactive (BATTRY<8)
0041+ 0498  F6              AJMP  A_ASDP        ;   Jump if ASDP already active
0042+ 0499  00              CLR   A             ;ACC=0
0043+ 049A  06              XCH   @B^#0         ;BATTRY=0, ACC=BATTRYold
0044+ 049B  51              ADSK  #1            ;ACC=BATTRYold+1, never skips
0045+ 049C  0F              MVSK  B,#ALRM       ;B-->ALRM
0046+ 049D  03              SKNB  @B.2          ;Skip if ALRM.2=0 (BATT is OK)
0047+ 049E  23C6            XCH   BATTRY        ;   BATTRYnew=BATTRYold+1
0048+ 04A0  2346            MOV   A,BATTRY      ;ACC=BATTRY
0049+ 04A2  58              ADSK  #8            ;Skip if BATTRY=8 and start ASDP
0050+ 04A3  D3              JMP   J_NTMO        ;   Jump if BATTRY<8
0051+ 04A4  09     BD_GMT:  MVSK  B,#MODE       ;B-->MODE
0052+ 04A5  4B              SET   @B.3          ;Set RETurn flag for EEPROM RAM-
0053+ 04A6                                      ;...Copy routine
0054+ 04A6  676B            JMP   WT_DMT        ;Copy RAM-Values of DOSE, MAXRT
0055+ 04A8                                      ;...and TARA to EEPROM. Returns
0056+ 04A8                                      ;...to LB_RTN with B-->MODE and
0057+ 04A8                                      ;...ACC=0
0058+ 04A8  43     LB_RTN:  CLR   @B.3          ;Clear MODE.3 RETurn flag
0059+ 04A9  2345            MOV   A,UPDATE      ;ACC=UPDATE       (&&&b, 10/27/90)
0060+ 04AB  52              ADSK  #2            ;ACC=UPDATE+2, skip if UPDATE>13
0061+ 04AC                                      ;...(ie, if 7 consecutive RSIs
0062+ 04AC                                      ;...with D_RT(0)true=0)
0063+ 04AC  F3              AJMP  TIMER         ;Initiate ASDP by starting timer
0064+ 04AD  38              MVSK  B,#D_REG      ;B-->D_REG
0065+ 04AE  4B              SET   @B.3          ;Get ready to turn on AUDIO
0066+ 04AF  92              CALL  DPRT_R        ;Turn on continuous AUDIO Alarm
0067+ 04B0  32              CLR   C             ;Clear C for "GAMMA" and "RATE"
0068+ 04B1                                      ;...Icons (argument at QUIT:)
0069+ 04B1  64C1            JMP   QUIT          ;Jump to shutdown routine
0070+ 04B3                                      ;...              (&&&e, 10/27/90)
0071+ 04B3  33F9   TIMER:   MVSK  B,#TARA       ;B-->TARA
0072+ 04B5  80              CALL  ZERO          ;Clear TARA Regs (start ASD
0073+ 04B6                                      ;...timer)
0074+ 04B6  0E     A_ASDP:  MVSK  B,#ICONS      ;B-->ICONS        (&&&b, 10/02/90)
0075+ 04B7  46              SET   @B.2          ;Set ICONS.2 for "BATT" Icon
```

```
0076+ 04B8                                       ;...even if BATTery recovers.
0077+ 04B8                                       ;...Solid "BATT" Icon indicates
0078+ 04B8                                       ;...that ASDP is active
0079+ 04B8                                       ;            (&&&e, 10/02/90)
0080+ 04B8  33C1         MVSK B,#TB_EXP          ;B-->TB_EXP
0081+ 04BA  35           MOV  A,@B^#3            ;ACC=TB_EXP, B-->REG7    (?.?)
0082+ 04BB  50           MOV  BD,A               ;B-->TARA(T_EXP-9)
0083+ 04BC  2342         MOV  A,TB_MNT           ;ACC=TB_MNT
0084+ 04BE  22           SET  C
0085+ 04BF  10           SBSK @B-!C              ;Skip if TARA(T_EXP-9)≥TB_MNTx
0086+ 04C0                                       ;...16^(TB_EXP-9)=δTbatt, C=1
0087+ 04C0  CC           AJMP N_TMO              ;   Jmp if TARA(T_EXP-9)<δTbatt
0088+ 04C1       ;------- Last LCD Update and then Infinite Loop --------
0089+ 04C1  0A  QUIT:    MVSK B,#MNTISA          ;B-->MNTISA
0090+ 04C2  80           CALL ZERO               ;Clear Mantissa, Units, & ICONS
0091+ 04C3  00           CLR  A
0092+ 04C4  54           ADSK #4                 ;Set ACC.2
0093+ 04C5  20           SKP  C                  ;Skip if Battery is low, don't
0094+ 04C6                                       ;...skip if GMT is dead
0095+ 04C6                                       ;...           (&&&, 10/27/90)
0096+ 04C6  57           ADSK #7                 ;  Clr ACC.2, set ACC.0, ACC.1
0097+ 04C7                                       ;...and ACC.3  (&&&, 10/27/90)
0098+ 04C7  238F         XCH  ICONS              ;ICONS=ACC so LCD freezes either
0099+ 04C9                                       ;...with "BATT" only or "GAMMA",
0100+ 04C9                                       ;..."DOSE" and "RATE" Icons
0101+ 04C9  690B         CALL WTSPCL             ;Last write to blank LCD except
0102+ 04CB                                       ;...for selected Icons
0103+ 04CB  CB  J_4EVR:  AJMP J_4EVR             ;Wait in infinite loop for
0104+ 04CC                                       ;...BATTery to die
0105+ 04CC                                       ;...            (&&&e, 5/06/90)
0106+ 04CC  6909 N_TMO:  CALL WRTDSP             ;Write new data to LCD
0107+ 04CE       ;
0108+ 04CE       ;"II."
0109+ 04CE       ;*-*-*-*-*-*-*-*-*-*-*-*-*-*-*-*-*-*-*-*-*-*-*-*-*-*
0110+ 04CE       ;------ Start a new RATE-Calculation if RATE-Task ------
0111+ 04CE       ;--------------- is not presently running ---------------
0112+ 04CE       ;*-*-*-*-*-*-*-*-*-*-*-*-*-*-*-*-*-*-*-*-*-*-*-*-*-*
0113+ 04CE       ;
0114+ 04CE  08  MAIN1:   MVSK B,#FLGS            ;B-->FLGS
0115+ 04CF  4C           CLR  @B.0               ;Clear FLGS.0 prohibiting Push-
0116+ 04D0                                       ;...Button from generating a JMP
0117+ 04D0                                       ;...to MAIN1
0118+ 04D0  13           SKNB @B.3               ;Skip if RATE-Task is not active
0119+ 04D1  6501         JMP  IN_PRG             ;  Jump and check for TIME-out
0120+ 04D3  33C5         MVSK B,#UPDATE          ;B-->UPDATE     (&&&b, 5/13/90)
0121+ 04D5  01           SKNB @B.0               ;Skip if EEPROM Updating is
0122+ 04D6                                       ;...disabled (UPDATE.0=0)
0123+ 04D6  D8           AJMP J_WDMT             ;  Jump if Updating is enabled
0124+ 04D7                                       ;...           (&&&, 10/27/90)
0125+ 04D7  DD           AJMP N_UPDT             ;Jump if Updating is disabled
0126+ 04D8  09  J_WDMT:  MVSK B,#MODE            ;B-->MODE
0127+ 04D9  46           SET  @B.2               ;Set RETurn flag for EEPROM
0128+ 04DA                                       ;...writing routine
0129+ 04DA  676B         JMP  WT_DMT             ;  Jump and write DOSE, MAXRT,
0130+ 04DC                                       ;  and TARA to EEPROM. Returns
0131+ 04DC                                       ;  to EEUPDT with B-->MODE
0132+ 04DC  42  EEUPDT:  CLR  @B.2               ;MODE.2=0, clear RETurn flag
0133+ 04DD                                       ;...            (&&&e, 5/13/90)
0134+ 04DD  1F  N_UPDT:  MVSK B,#TIME            ;B-->TIME(0)
0135+ 04DE  332F         MOV  @BA,T              ;Read the TiMeR into TIME,ACC
0136+ 04E0  05           MOV  A,@B^#0            ;ACC = MSN of Timer = TIME
0137+ 04E1  51           ADSK #1                 ;Skip if TIME=15 (&&&b, 4/28/90)
0138+ 04E2  EC           AJMP SYN_OK             ;  Jump if TIME<15
0139+ 04E3  6BA9         CALL SY_NOW             ;Keep AUDIO-Alarm synchronized
0140+ 04E5                                       ;...(on the average, we're 1/32
0141+ 04E5                                       ;...TOFP early)
0142+ 04E5  41  WAIT3:   SKP  T
0143+ 04E6  E5           JMP  WAIT3              ;Wait for next TOF so MSN of
0144+ 04E7                                       ;...Timer=0 and increment T_DSP
```

```
0145+ 04E7  33F8           MVSK  B,#T_DSP      ;B-->T_DSP
0146+ 04E9  05             MOV   A,@B^#0       ;ACC=T_DSP
0147+ 04EA  51             ADSK  #1            ;ACC=T_DSP+1, skip on carry
0148+ 04EB                                     ;...(should never happen)
0149+ 04EB  06             XCH   @B^#0         ;   Update if T_DSP<15
0150+ 04EC  6BA3  SYN_OK:  CALL  SYNKRO        ;Keep AUDIO-Alarm synchronized
0151+ 04EE                                     ;...(we're 1/16 TOFP early).
0152+ 04EE                                     ;...Return before Timer over-
0153+ 04EE                                     ;...flows again with B-->FLGS
0154+ 04EE  4B             SET   @B.3          ;Set RATE ACTIVE/!IDLE flag
0155+ 04EF                                     ;...           (&&&e, 4/28/90)
0156+ 04EF  41             SKP   T             ;Make sure the Timer-Overflow
0157+ 04F0                                     ;...latch is clear
0158+ 04F0  41    WAIT4:   SKP   T
0159+ 04F1  F0             JMP   WAIT4         ;Wait for next Timer-OverFlow,
0160+ 04F2                                     ;...we want to start RATE-
0161+ 04F2                                     ;...calculation at beginning of
0162+ 04F2                                     ;...a TOFP
0163+ 04F2  B2             CALL  LD_NDS        ;Load N_RAT (and N_DOS) with 4
0164+ 04F3                                     ;...LSNs of CD4020B/CNTR data
0165+ 04F3  3393           MVSK  B,#TIME+3     ;B-->TIME(3)
0166+ 04F5  00    LOOP33:  CLR   A             ;ACC=0
0167+ 04F6  26             XCH   @B^#2         ;TIME(i)=0, B-->N_RAT(i)
0168+ 04F7  15             MOV   A,@B^#1       ;ACC=N_RAT(i), B-->O_RAT(i)
0169+ 04F8  37             XDSK  @B^#3         ;O_RAT(i)=N_RAT(i),
0170+ 04F9                                     ;...B-->TIME(i-1), skip on
0171+ 04F9                                     ;...underflow
0172+ 04F9  F5             JMP   LOOP33        ;   Jump 'til 4 nibbles done
0173+ 04FA  6B90           CALL  INCTIM        ;Increment TIME-Regs and wait
0174+ 04FC                                     ;...for next TOF if it ends the
0175+ 04FC                                     ;...RATE-Sampling interval
0176+ 04FC  33F8           MVSK  B,#T_DSP      ;B-->T_DSP       (&&&b, 4/28/90)
0177+ 04FE  05             MOV   A,@B^#0       ;ACC=T_DSP
0178+ 04FF  52             ADSK  #2            ;ACC=T_DSP+2, skip on carry
0179+ 0500                                     ;...(should never happen). 2 is
0180+ 0500                                     ;...added to account for TOFs at
0181+ 0500                                     ;...each end of the RSI
0182+ 0500  06             XCH   @B^#0         ;   Update if T_DSP<15
0183+ 0501                                     ;...            (&&&e, 4/28/90)
0184+ 0501  A2    IN_PRG:  CALL  CHKTIM        ;Service RATE-Task if necessary
0185+ 0502  B2             CALL  LD_NDS        ;Load N_DOS and N_RAT with 4
0186+ 0503                                     ;...LSNs of CD4020B/CNTR data
0187+ 0503        ;"III."
0188+ 0503        ;------- Compute δCm (cnt' increment accumulated -------
0189+ 0503        ;------- during last DSP) and update O_DOS=N_DOS -------
0190+ 0503        ;
0191+ 0503  33F0           MVSK  B,#N_DOS      ;B-->N_DOS(0)
0192+ 0505  22             SET   C             ;Set !Borrow for subtraction
0193+ 0506  15    LOOP34:  MOV   A,@B^#1       ;ACC=N_DOS(i), B-->O_DOS(i)
0194+ 0507  16             XCH   @B^#1         ;O_DOS(i)=N_DOS(i), ACC=O_DOS(i)
0195+ 0508                                     ;...B-->N_DOS(i)
0196+ 0508  10             SBSK  @B-!C         ;ACC=N_DOS(i)-O_DOS(i)=D_DS(i)
0197+ 0509  44             NOP                 ;   Go ahead and !borrow
0198+ 050A  04             XISK  @B^#0         ;D_DS(i)=ACC, B-->N_DOS(i+1)
0199+ 050B  4E             MOV   A,BD          ;ACC=i
0200+ 050C  5C             ADSK  #$C           ;ACC=i+12, skip if i=4
0201+ 050D  C6             JMP   LOOP34        ;   Subtract all 4 Nibbles, the
0202+ 050E                                     ;   result is strictly positive
0203+ 050E        ;----------- Perform background correction -----------
0204+ 050E  233A           MOV   A,INTRVL      ;ACC=INTRVL       (&&&b, 4/19/90)
0205+ 0510  5D             ADSK  #$D           ;Skip if INTRVL=3
0206+ 0511  DE             AJMP  N_BKGD        ;   Jump if INTRVL<3
0207+ 0512  33C0           MVSK  B,#BG_ER      ;B-->BG_ER
0208+ 0514  35             MOV   A,@B^#3       ;ACC=BG_ER, B-->D_DS(0)    (?.?)
0209+ 0515  5F             ADSK  #$F           ;ACC=BG_ER-1, skip if ACC≥0
0210+ 0516  DE             AJMP  N_BKGD        ;   Jump if BG_ER=0 (no counts
0211+ 0517                                     ;   in correction accumulator)
0212+ 0517  06             XCH   @B^#0         ;D_DS(0)=BG_ER-1, ACC=D_DS(0)
0213+ 0518  5F             ADSK  #$F           ;ACC=D_DS(0)-1, skip if ACC≥0
0214+ 0519  DC             AJMP  N_CNTS        ;   Jump if D_DS(0)=0 (no counts
```

```
0215+ 051A                                           ;    to subtract during this RSI)
0216+ 051A  36              XCH   @B^#3        ;D_DS(0)=ACC=D_DS(0)old-1, ACC=
0217+ 051B                                           ;...BG_ERold-1, B-->BG_ER   (?.?)
0218+ 051B  DD              AJMP  DEC_BG       ;  Jump and update BG_ER
0219+ 051C  00      N_CNTS: CLR   A            ;ACC=0
0220+ 051D  06      DEC_BG: XCH   @B^#0        ;BG_ER=BG_ERold-1 if branch to
0221+ 051E                                           ;...DEC_BG.  Otherwise, restore
0222+ 051E                                           ;...D_DS(0)=0              (?.?)
0223+ 051E                                           ;...              (&&&e, 4/19,90)
0224+ 051E              ;
0225+ 051E              ;Since we perform the above calculation at each DSP, it
0226+ 051E              ;is not possible for N_DOS(3)=CNTR to overflow more than
0227+ 051E              ;once.  Therefore, δCm is correct regardless of the
0228+ 051E              ;value of C: C=1 implies that N_DOS-O_DOS≥0 and C=0
0229+ 051E              ;implies that O_DOS>N_DOS which really means that CNTR
0230+ 051E              ;overflowed once and that if we included more MSNs in
0231+ 051E              ;the subtraction, the difference nibbles would all be
0232+ 051E              ;zero and the exit-value of C would be 1.
0233+ 051E              ;
0234+ 051E              ;PROOF:
0235+ 051E              ;   Let dC/dt|max=100 kcps so dCm/dt|max=25 kcps'. If
0236+ 051E              ;the maximum DSP length is 2 s, then δCm|max=50 kcnt'
0237+ 051E              ;which is less than the 16^4=65536 cnt' capacity of
0238+ 051E              ;the N_DOS Buffer.
0239+ 051E              ;
0240+ 051E  6C3E    N_BKGD: CALL  AD_DCM       ;Add D_DS to T_CNT-Buffer
0241+ 0520  3381            MVSK  B,#FLAG      ;B-->FLAG
0242+ 0522  11              SKNB  @B.1         ;Skip if RAT_M is new value not
0243+ 0523                                           ;...corrected for DT-Losses
0244+ 0523  E5              AJMP  RM_OLD       ;  Jump, it's an old value
0245+ 0524  ED              AJMP  RM_NEW       ;Jump, it's a new value
0246+ 0525  33A5    RM_OLD: MVSK  B,#RAT_T+1   ;B-->RAT_T(1) (EXP16)
0247+ 0527  6874            CALL  CK_LIM       ;Skip next instruction if
0248+ 0529                                           ;...RAT_T < R_MNTx16^R_EXP
0249+ 0529                                           ;...             (&&&, 5/11/90)
0250+ 0529  6570            JMP   DS_COR       ;  Jump and do DOSE-Correction
0251+ 052B  657E    J_CKAL: JMP   CK_ALR       ;DOSE OK, check alarms
0252+ 052D  47      RM_NEW: SET   @B.1         ;Set RAT_M OLD/!NEW Flag
0253+ 052E  33D1            MVSK  B,#RAT_M+1   ;B-->RAT_M(1) (EXP16)
0254+ 0530  6874            CALL  CK_LIM       ;Skip next instruction if
0255+ 0532                                           ;...RAT_M < R_MNTx16^R_EXP
0256+ 0532                                           ;...             (&&&, 5/11/90)
0257+ 0532  F8              AJMP  RT_COR       ;  Jump and do RATE-Correction
0258+ 0533  33A4            MVSK  B,#RAT_T     ;B-->RAT_T(0)
0259+ 0535  6EFE            CALL  CPY_MR       ;Copy RAT_M directly into RAT_T,
0260+ 0537                                           ;...it needs no correction
0261+ 0537  EB              JMP   J_CKAL       ;Jump around entire DT-
0262+ 0538                                           ;...Correction
0263+ 0538              ;"IV."
0264+ 0538              ;*-*-*-*-*-*-*-*-*-*-*-*-*-*-*-*-*-*-*-*-*-*-*-*-*-*
0265+ 0538              ;*-*-*-*- CORRECT RATE FOR DEAD-TIME LOSSES -*-*-*-*
0266+ 0538              ;
0267+ 0538              ;--------------- Multiply RAT_M by GM_DT ---------------
0268+ 0538  3B      RT_COR: MVSK  B,#FLAC      ;B-->FLAC(0)
0269+ 0539  6EFE            CALL  CPY_MR       ;Copy RAT_M into FLAC
0270+ 053B  3B              MVSK  B,#FLAC      ;B-->FLAC(0)
0271+ 053C  6870            CALL  CPYXR3       ;Save a copy of RAT_M at SWAP
0272+ 053E  33F4            MVSK  B,#GM_DT     ;B-->GM_DT(0)
0273+ 0540  A8              CALL  CPY2IO       ;Copy GM_DT into IOBUF
0274+ 0541  AE              CALL  FMUL16       ;Compute  RXT = GM_DT x RATE and
0275+ 0542                                           ;...leave result in MATH(3,6)
0276+ 0542              ;--------------- Make sure that RXT < 1 ---------------
0277+ 0542  2B              MVSK  B,#MATH+3    ;B-->EXP16 of RXT
0278+ 0543  05              MOV   A,@B^#0      ;ACC=EXP16
0279+ 0544  58              ADSK  #8           ;Skip if EXP16>7 (ie, <0)
0280+ 0545  C7              AJMP  RXTGE1       ;  Jump, RXT≥1
0281+ 0546  CB              AJMP  LOOP35       ;Jump, RXT<1
0282+ 0547  7F      RXTGE1: MOVI  @B,#$F
0283+ 0548  7F              MOVI  @B,#$F       ;Clamp RXT at $F.00x16^(-1)
0284+ 0549  70              MOVI  @B,#0        ;...       "15/16"
```

```
0285+ 054A 70                  MOVI @B,#0
0286+ 054B              ;-------- Position RXT as Fixed Point for 1-RXT --------
0287+ 054B 2B           LOOP35: MVSK B,#MATH+3  ;B-->EXP16 of RXT
0288+ 054C 05                   MOV  A,@B^#0    ;ACC=EXP16
0289+ 054D 51                   ADSK #1         ;Skip if EXP16=$F (-1)
0290+ 054E D0                   AJMP SHFTR      ;  Jump and shift right
0291+ 054F D3                   AJMP EXP2       ;DP is properly fixed
0292+ 0550 04           SHFTR:  XISK @B^#0      ;Update EXP16, B-->MATH(4)
0293+ 0551 84                   CALL SHFTD      ;Divide mantissa by 16
0294+ 0552 CB                   JMP  LOOP35     ;Test EXP16 again
0295+ 0553              ;----------- Perform subtraction, 1-RXT --------------
0296+ 0553 36           EXP2:   XCH  @B^#3      ;Clear MATH(3), B-->IOBUF  (?.?)
0297+ 0554 80                   CALL ZERO       ;IOBUF(0),(3) = 0000 (4-digit
0298+ 0555                                      ;...subtraction automatically
0299+ 0555                                      ;...inserts proper EXP16 of $F
0300+ 0555                                      ;...in result)
0301+ 0555 2E                   MVSK B,#MATH+6  ;B-->LSN of RXT
0302+ 0556 22                   SET  C          ;Set !Borrow for subtraction
0303+ 0557 35           LOOP36: MOV  A,@B^#3    ;ACC=RXT(i), B-->ONE(i)
0304+ 0558 10                   SBSK @B-!C      ;ACC=ONE(i)-RXT(i)
0305+ 0559 44                   NOP             ; Go ahead and !borrow
0306+ 055A 37                   XDSK @B^#3      ;Save difference at IOBUF(i),
0307+ 055B                                      ;...B-->RXT(i-1)
0308+ 055B 4E                   MOV  A,BD       ;ACC=i-1
0309+ 055C 54                   ADSK #4         ;Skip if i-1>11
0310+ 055D DF                   AJMP SUBDN2     ;  Subtraction is complete
0311+ 055E D7                   JMP  LOOP36     ;Keep subtracting
0312+ 055F              ;-------- 1-RXT is now in IOBUF(0) to IOBUF(3) ---------
0313+ 055F              ;------------- Make sure that 1-RXT > 1/16 -------------
0314+ 055F 1C           SUBDN2: MVSK B,#IOBUF+1 ;B-->MSN of mantissa of 1-RXT
0315+ 0560 05                   MOV  A,@B^#0    ;ACC=MSN
0316+ 0561 5F                   ADSK #$F        ;Skip if MSN>0
0317+ 0562 E4                   AJMP FX_RXT     ;  Jump and clamp 1-RXT
0318+ 0563 E7                   AJMP RXT_OK     ;Jump, MSN>0 so 1-RXT>16^(-1)
0319+ 0564 71           FX_RXT: MOVI @B,#1      ;Clamp 1-RXT at $1.00x16^(-1)
0320+ 0565 70                   MOVI @B,#0      ;        "1/16"
0321+ 0566 70                   MOVI @B,#0
0322+ 0567              ;-------------- Now divide RAT_M by 1-RXT --------------
0323+ 0567 0B           RXT_OK: MVSK B,#SWAP    ;B-->SWAP(0)
0324+ 0568 6870                 CALL CPYXR3     ;Move RAT_M back into FLAC
0325+ 056A 6AB9                 CALL FDIV16     ;Divide RAT_M by 1-RXT and put
0326+ 056C                                      ;...result in MATH(3) to MATH(6)
0327+ 056C 33A4                 MVSK B,#RAT_T   ;B-->RAT_T(0)
0328+ 056E 6850                 CALL CPY_M3     ;Copy RATEtrue to RAT_T
0329+ 0570              ;
0330+ 0570              ;------ RAT_T now contains RATEtrue in the form...
0331+ 0570              ;EXP16,MSN,SSN,LSN = (MSN+SSN/16+LSN/256)x16^EXP16 in
0332+ 0570              ;units of cnt'/(4096 TOFPs).
0333+ 0570              ;
0334+ 0570              ;"V."
0335+ 0570              ;-------- Compute the cnt's lost due to Dead-Time -------
0336+ 0570              ;--------------- δCdt=RATEtruexGM_DTxδCm ---------------
0337+ 0570              ;
0338+ 0570 6AAB         DS_COR: CALL TRT2FL     ;Copy RAT_T into FLAC
0339+ 0572 33F4                 MVSK B,#GM_DT   ;B-->GM_DT(0)
0340+ 0574 A8                   CALL CPY2IO     ;Copy GM_DT into IOBUF
0341+ 0575 AE                   CALL FMUL16     ;Compute GM_DTxRATEtrue and
0342+ 0576                                      ;...leave result in MATH(3,6)
0343+ 0576 3B                   MVSK B,#FLAC    ;B-->FLAC(0)
0344+ 0577 6850                 CALL CPY_M3     ;Copy GM_DTxRATEtrue into FLAC
0345+ 0579 6B14                 CALL FLT_DS     ;Convert D_DS=δCm to FP16 and
0346+ 057B                                      ;...leave result in IOBUF
0347+ 057B AE                   CALL FMUL16     ;δCdt=GM_DTxRATEtruexδCm,
0348+ 057C                                      ;...leave result in MATH(3,6)
0349+ 057C 6F23                 CALL AD_DCT     ;Add δCdt to T_CNT-Buffer
0350+ 057E              ;
0351+ 057E              ;-*-*-*-*-*-*- END OF DEAD-TIME CORRECTION -*-*-*-*-*-*-
0352+ 057E              ;-*-*-*-*-*-*-*-*-*-*-*-*-*-*-*-*-*-*-*-*-*-*-*-*-*-*-*-
0353+ 057E              ;
0354+ 057E              ;"VI."
```

```
0355+ 057E          ;--------- Now set MAXRT=RAT_T if RAT_T≥MAXRT ----------
0356+ 057E          ;The inequality is tested below by subtracting MAXRT
0357+ 057E          ;from RAT_T as if both were 4-nibble integers rather
0358+ 057E          ;than FP numbers.  The test works because EXP occupies
0359+ 057E          ;the appropriate hi-nibble position and because EXP has
0360+ 057E          ;the same sense as a hi-nibble (i.e., large EXP-values
0361+ 057E          ;imply large numbers).
0362+ 057E          ;
0363+ 057E 33B7     CK_ALR: MVSK B,#MAXRT+3  ;B-->MAXRT(3)
0364+ 0580 22               SET  C           ;Set !Borrow for subtraction
0365+ 0581 15       LOOP37: MOV  A,@B^#1     ;ACC=MXRAT(i), B-->RAT_T(i)
0366+ 0582 10               SBSK @B-!C       ;ACC=RAT_T(i)-MXRAT(i)
0367+ 0583 44               NOP              ;   Go ahead and !borrow
0368+ 0584 05               MOV  A,@B^#0     ;ACC=RAT_T(i)
0369+ 0585 17               XDSK @B^#1       ;B-->MXRAT(i-1)
0370+ 0586 4E               MOV  A,BD        ;ACC=i-1
0371+ 0587 5C               ADSK #$C         ;ACC=i-1+12, skip if i-1=4
0372+ 0588 CA               AJMP SUBDN3      ;   Jump, 4 nibbles subtracted
0373+ 0589 C1               JMP  LOOP37      ;Subtract all 4 nibbles
0374+ 058A 20       SUBDN3: SKP  C           ;Skip if RAT_T≥MXRAT
0375+ 058B D4               AJMP RT_AL       ;  Jump if RAT_T<MXRAT
0376+ 058C          ;-------------- Replace MXRAT with RAT_T ---------------
0377+ 058C A2               CALL CHKTIM      ;Service RATE-Task if necessary
0378+ 058D 33A4             MVSK B,#RAT_T    ;B-->RAT_T(0)
0379+ 058F 15       LOOP38: MOV  A,@B^#1     ;ACC=RAT_T(i), B-->MXRAT(i)
0380+ 0590 14               XISK @B^#1       ;MXRAT(i)=RAT_T(i),
0381+ 0591                                   ;...B-->RAT_T(i+1)
0382+ 0591 4E               MOV  A,BD        ;ACC=i+1
0383+ 0592 58               ADSK #8          ;ACC=i+1+8, skip if i+1>7
0384+ 0593 CF               JMP  LOOP38      ;  Replace all 4 nibbles
0385+ 0594          ;---------- Set RATE-Alarm Flag if RAT_T≥RTAL ----------
0386+ 0594 A2       RT_AL:  CALL CHKTIM      ;Service RATE-Task if necessary
0387+ 0595 3387             MVSK B,#RTAL+3   ;B-->RTAL(3)
0388+ 0597 22               SET  C           ;Set !Borrow for subtraction
0389+ 0598 25       LOOP39: MOV  A,@B^#2     ;ACC=RTAL(i), B-->RAT_T(i)
0390+ 0599 10               SBSK @B-!C       ;ACC=RAT_T(i)-RTAL(i)
0391+ 059A 44               NOP              ;   Go ahead and !borrow
0392+ 059B 05               MOV  A,@B^#0     ;ACC=RAT_T(i)
0393+ 059C 27               XDSK @B^#2       ;B-->RTAL(i-1)
0394+ 059D 4E               MOV  A,BD        ;ACC=i-1
0395+ 059E 5C               ADSK #$C         ;ACC=i-1+12, skip if i-1=4
0396+ 059F E1               AJMP SUBDN4      ;   Jump, 4 nibbles subtracted
0397+ 05A0 D8               JMP  LOOP39      ;Subtract all 4 nibbles
0398+ 05A1 3381    SUBDN4: MVSK B,#FLAG      ;B-->FLAG
0399+ 05A3 43               CLR  @B.3        ;Clear RT-Alarm Flag
0400+ 05A4 20               SKP  C           ;Skip if RAT_T≥RTAL
0401+ 05A5 E8               AJMP N_RTAL      ;   Jump and leave FLAG.3=0
0402+ 05A6 4B               SET  @B.3        ;Set RT-Alarm Flag
0403+ 05A7 EC               AJMP INCTAR      ;Jump and increment TARA
0404+ 05A8            ;
0405+ 05A8            ;----------- INCREMENT TARA FOR TIMEKEEPING ------------
0406+ 05A8            ;Add DSP Time-value in T_DSP to TARA(0) and ripple carry
0407+ 05A8            ;through TARA(6).  Normally used for TARA feature but
0408+ 05A8            ;also for Automatic ShutDown when PRGOPT.2=0.
0409+ 05A8            ;
0410+ 05A8 2346    N_RTAL: MOV  A,BATTRY     ;ACC=BATTRY         (&&&b, 5/06/90)
0411+ 05AA 58              ADSK #8           ;Skip if BATTRY=8 (ASDP active)
0412+ 05AB F8              AJMP N_ASD        ;   Jump if ASDP inactive
0413+ 05AC            ;                                          (&&&e, 5/06/90)
0414+ 05AC A2       INCTAR: CALL CHKTIM      ;Service RATE-Task if necessary
0415+ 05AD 33F8             MVSK B,#T_DSP    ;B-->T_DSP          (&&&b, 4/28/90)
0416+ 05AF 04               XISK @B^#0       ;ACC=T_DSP, B-->TARA(0)
0417+ 05B0 32               CLR  C
0418+ 05B1 F3               AJMP TARA_1
0419+ 05B2 00       LOOP40: CLR  A
0420+ 05B3 30       TARA_1: ADSK @B+C        ;ACC=TARA(i)+ACC, skip on carry
0421+ 05B4 F7               AJMP NCRY3       ;   Jump if no carry, add done
0422+ 05B5 04               XISK @B^#0       ;Update TARA(i), B-->TARA(i+1),
0423+ 05B6                                   ;...skip if i>6
0424+ 05B6 F2               JMP  LOOP40
```

```
0425+ 05B7 06      NCRY3:  XCH  @B^#0        ;Update the no-carry nibble
0426+ 05B8                 ;------------- Compare DOSE with DSAL and ---------------
0427+ 05B8                 ;---------- activate AUDIO-Alarm if required -----------
0428+ 05B8 00      N_ASD:  CLR  A            ;ACC=0
0429+ 05B9 23F8            XCH  T_DSP        ;T_DSP=0
0430+ 05BB A2              CALL CHKTIM       ;Service RATE-Task if necessary
0431+ 05BC                                   ;...             (&&&e, 4/28/90)
0432+ 05BC 6F0C            CALL TC2MTH       ;Copy T_CNT into MATH-Buffer
0433+ 05BE 33E4            MVSK B,#DSAL      ;B-->DSAL(0)
0434+ 05C0 A8              CALL CPY2IO       ;Copy DSAL into IOBUF
0435+ 05C1 32              CLR  C            ;Clear C for AMTH Target-Buffer
0436+ 05C2 B0              CALL MV_FPH       ;Position DSAL in AMTH-Buffer
0437+ 05C3 18              MVSK B,#AMTH      ;B-->AMTH(0)
0438+ 05C4 22              SET  C            ;Set !Borrow for subtraction
0439+ 05C5 35      LOOP41: MOV  A,@B^#3      ;ACC=DSAL(i), B-->DOSE(i)
0440+ 05C6 10              SBSK @B-!C        ;ACC=DOSE(i)-DSAL(i)
0441+ 05C7 44              NOP               ;    Go ahead and !borrow
0442+ 05C8 34              XISK @B^#3        ;B-->DSAL(i+1), skip on overflow
0443+ 05C9 C5              JMP  LOOP41       ;    Subtract all 7 nibbles
0444+ 05CA              ;--- Enable Alarm and turn on DOSE ICON if DOSE>DSAL ---
0445+ 05CA 08              MVSK B,#FLGS      ;B-->FLGS
0446+ 05CB 03              SKNB @B.2         ;Skip if DS-Alarm is armed
0447+ 05CC D2              AJMP DOS_OK       ;    Jump if DS-Alarm is disarmed
0448+ 05CD 20              SKP  C            ;Skip if DOSE≥DSAL
0449+ 05CE D2              AJMP DOS_OK       ;    Jump, don't set DS-Alarm if
0450+ 05CF                                   ;    DOSE<DSAL
0451+ 05CF 47              SET  @B.1         ;Set DS-Alarm ENABLE/!DISABL bit
0452+ 05D0 0F              MVSK B,#ALRM      ;B-->ALRM-Bits
0453+ 05D1 47              SET  @B.1         ;Turn on LCD "DOSE"-Icon
0454+ 05D2              ;-------- It's time for a CHiRP if T_CNT ≥ CHIRP --------
0455+ 05D2 A2      DOS_OK: CALL CHKTIM       ;Service RATE-Task if necessary
0456+ 05D3 33D9            MVSK B,#CHRP      ;B-->CHRP(0)
0457+ 05D5 22              SET  C            ;Set !Borrow for subtraction
0458+ 05D6 15      LOOP42: MOV  A,@B^#1      ;ACC=CHRP(i), B-->T_CNT(i)
0459+ 05D7 10              SBSK @B-!C        ;ACC=T_CNT(i)-CHRP(i)
0460+ 05D8 44              NOP               ;    Go ahead and !borrow
0461+ 05D9 05              MOV  A,@B^#0      ;Need to preserve T_CNT(i)
0462+ 05DA 14              XISK @B^#1        ;B-->CHRP(i+1)
0463+ 05DB D6              JMP  LOOP42       ;    Subtract all 7 nibbles.
0464+ 05DC 20              SKP  C            ;Skip if T_CNT≥CHRP, it's time
0465+ 05DD                                   ;...for a CHiRP
0466+ 05DD 6610    J_WAT6: JMP  WAIT6        ;    Jump if T_CNT<CHRP, no CHiRP
0467+ 05DF A2              CALL CHKTIM       ;Service RATE-Task if necessary
0468+ 05E0              ;
0469+ 05E0              ;---------- Compute DOSE-Value for next CHiRP ----------
0470+ 05E0              ;Update CHRP to the next T_CNT-Value at which a CHiRP is
0471+ 05E0              ;needed.  If dose is being accumulated at a RATE in
0472+ 05E0              ;excess of INCHRP/DSP, the missing CHiRPs will tend to
0473+ 05E0              ;wind up (handled below).
0474+ 05E0              ;
0475+ 05E0 33D4            MVSK B,#INCHRP    ;B-->INCHRP(0)
0476+ 05E2 A8              CALL CPY2IO       ;Copy INCHRP into IOBUF
0477+ 05E3 33E9            MVSK B,#SKRCH     ;B-->SKRCH-Buffer
0478+ 05E5 A6              CALL CPY_IO       ;Copy IOBUF into SKRCH
0479+ 05E6 33ED            MVSK B,#SKRCH+4   ;B-->SKRCH(4)
0480+ 05E8 80              CALL ZERO         ;Clear the 3 MSN's of SKRCH
0481+ 05E9 33E9            MVSK B,#SKRCH     ;B-->SKRCH(0)=INCHRP(0)
0482+ 05EB 32              CLR  C
0483+ 05EC 35      LOOP43: MOV  A,@B^#3      ;ACC=INCHRP(i), B-->CHRP(i)
0484+ 05ED 30              ADSK @B+C         ;ACC=CHRP(i)+INCHRP(i)
0485+ 05EE 44              NOP               ;    Go ahead and carry
0486+ 05EF 34              XISK @B^#3        ;CHRPnew(i)=ACC, B-->INCHRP(i+1)
0487+ 05F0 EC              JMP  LOOP43       ;    Add all 7 nibbles
0488+ 05F1 3381            MVSK B,#FLAG      ;B-->FLAG
0489+ 05F3 03              SKNB @B.2         ;Skip if AUDIO-Alarm not active
0490+ 05F4 DD              JMP  J_WAT6       ;    Don't confuse alarm pattern
0491+ 05F5                                   ;    with another CHiRP
0492+ 05F5              ;
0493+ 05F5              ;---- If T_CNT≥CHRP, set CHRP=T_CNT to null Windup. ----
0494+ 05F5              ;------ Then wait until we're within CHRPLN/16's of -----
```

```
                    ;-------- a TOFP of next TOF to issue the BEEP ---------
0495+ 05F5
0496+ 05F5          ;
0497+ 05F5 A2              CALL CHKTIM        ;Service RATE-Task if necessary
0498+ 05F6 33D9            MVSK B,#CHRP       ;B-->CHRP(0)        (&&&b, 5/04/90)
0499+ 05F8 22              SET  C
0500+ 05F9 15       LOOP44: MOV A,@B^#1       ;ACC=CHRP(i), B-->T_CNT(i)
0501+ 05FA 10              SBSK @B-!C         ;ACC=T_CNT(i)-CHRP(i)
0502+ 05FB 44              NOP                ;   Go ahead and !borrow
0503+ 05FC 05              MOV  A,@B^#0       ;Need to preserve T_CNT(i)
0504+ 05FD 14              XISK @B^#1         ;B-->CHRP(i+1)
0505+ 05FE F9              JMP  LOOP44        ;   Subtract all 7 nibbles
0506+ 05FF 20              SKP  C             ;Skip if T_CNT≥CHRP
0507+ 0600 C5              AJMP WAIT5         ;   Jump if CHRP>T_CNT
0508+ 0601 33C9            MVSK B,#T_CNT      ;B-->T_CNT(0)
0509+ 0603 686C            CALL CPYXR1        ;Copy T_CNT into CHRP to unwind
0510+ 0605                                    ;...any error and discard wound
0511+ 0605                                    ;...up CHiRPs      (&&&e, 5/04/90)
0512+ 0605 A2       WAIT5: CALL CHKTIM        ;Service RATE-Task if necessary
0513+ 0606 3D              MVSK B,#GPR3       ;B-->GPR3
0514+ 0607 332F            MOV  @BA,T         ;GPR3 = MSN of Timer
0515+ 0609 00              CLR  A
0516+ 060A 5A              ADSK #$10-CHRPLN   ;ACC = 16-CHRPLN
0517+ 060B 21              CSKE A,@B          ;Skip if Timer MSN = ACC
0518+ 060C C5              JMP  WAIT5         ;   Be patient and wait
0519+ 060D 38              MVSK B,#D_REG      ;B-->D_REG
0520+ 060E 4B              SET  @B.3          ;Enable AUDIO-Alarm for CHiRP
0521+ 060F 90              CALL DPRT_J        ;Turn on AUDIO-Alarm
0522+ 0610          ;
0523+ 0610          ;"VII."
0524+ 0610          ;------ Check Battery Voltage and HVPS Regulation ------
0525+ 0610          ;--- Battery OK if IN.2=1, HVPS OK if IL.3=1|IN.3=1 ----
0526+ 0610 A2       WAIT6: CALL CHKTIM        ;Service RATE-Task if necessary
0527+ 0611 3D              MVSK B,#GPR3       ;B-->GPR3
0528+ 0612 3328            MOV  A,IN          ;ACC=IN Port-Bits
0529+ 0614 06              XCH  @B^#0         ;GPR3=IN
0530+ 0615 01              SKNB @B.0          ;Skip if MODE PB is still pushed
0531+ 0616 D8              AJMP MSW_1         ;   Continue code execution
0532+ 0617 D0              JMP  WAIT6         ;Loop 'til user releases MODE PB
0533+ 0618                                    ;...(debounce MODE-Switch)
0534+ 0618 3E       MSW_1: MVSK B,#GPR4       ;B-->GPR4
0535+ 0619 3329            MOV  A,IL          ;ACC=IL=%IL.3,1,0,IL.0.  This
0536+ 061B                                    ;...clears the input latches so
0537+ 061B                                    ;...PD-1 is now sensitive to the
0538+ 061B                                    ;...next PB closure
0539+ 061B 06              XCH  @B^#0         ;GPR4=%IL.3,1,0,IL.0
0540+ 061C 22              SET  C
0541+ 061D 13              SKNB @B.3          ;Skip if IL.3 is clear
0542+ 061E 32              CLR  C
0543+ 061F 3D              MVSK B,#GPR3       ;Now C=!IL.3, B-->GPR3=IN
0544+ 0620
0545+ 0620 45              CLR  @B.1          ;Make sure Bit1 and Bit0 of
0546+ 0621 4C              CLR  @B.0          ;...IN-copy are clear
0547+ 0622 20              SKP  C             ;Skip if IL.3 was clear
0548+ 0623 4B              SET  @B.3          ;GPR3=IL.3|IN.3,IN.2,0,0
0549+ 0624 00              CLR  A
0550+ 0625 5C              ADSK #%1100        ;ACC=%1100
0551+ 0626 02              XOR  @B            ;ACC=%!(IL.3|IN.3),!IN.2,0,0
0552+ 0627 0F              MVSK B,#ALRM       ;B-->ALRM
0553+ 0628 43              CLR  @B.3          ;Clear old HVPS/RATE and...
0554+ 0629 42              CLR  @B.2          ;...BATT flags
0555+ 062A 31              ADD  @B            ;ACC=ACC|ALRM
0556+ 062B 06              XCH  @B^#0         ;Update ALRM
0557+ 062C                                    ;   ALRM.3=1 if HVPS is Low ==>
0558+ 062C                                    ;       RATE-Values are suspect
0559+ 062C                                    ;   ALRM.2=1 if BATTery Low
0560+ 062C          ;--------- Compute FLAG.2=ALRM.3|FLGS.1|FLAG.3 ---------
0561+ 062C          ;------- (logical "OR" of all audio alarm flags) -------
0562+ 062C 22              SET  C             ;Assume no alarms
0563+ 062D 13              SKNB @B.3          ;Skip if no HVPS-Alarm
0564+ 062E 32              CLR  C             ;   C=!ALRM.3
0565+ 062F 08              MVSK B,#FLGS       ;B-->FLGS
```

```
0566+ 0630 11              SKNB  @B.1           ;Skip if no DOSE-Alarm
0567+ 0631 32              CLR   C              ;   C=!(ALRM.3|FLGS.1)
0568+ 0632 3381            MVSK  B,#FLAG        ;B-->FLAG
0569+ 0634 42              CLR   @B.2           ;FLAG.2=0
0570+ 0635 2344            MOV   A,PRGOPT       ;ACC=PRGOPT       (&&&b, 4/26/90)
0571+ 0637 58              ADSK  #8             ;Skip if Audio RATE-Alarm
0572+ 0638                                      ;...enabled (PRGOPT.3=1)
0573+ 0638 FB              AJMP  RTA_DS         ;  Jump if Audio RATE-Alarm
0574+ 0639                                      ;  disabled (PRGOPT.3=0)
0575+ 0639 13              SKNB  @B.3           ;Skip if no RATE-Alarm
0576+ 063A                                      ;...              (&&&e, 4/26/90)
0577+ 063A 32              CLR   C              ;   C=!(ALRM.3|FLGS.1|FLAG.3)
0578+ 063B 20     RTA_DS:  SKP   C              ;Skip if no alarm conditions
0579+ 063C 46              SET   @B.2           ;FLAG.2 = ALRM.3|FLGS.1|FLAG.3,
0580+ 063D                                      ;...this flag is used by CK_TIM
0581+ 063D                                      ;...to control AUDIO-Alarm
0582+ 063D         ;"VIII."
0583+ 063D         ;------------- See if User wanted anything -------------
0584+ 063D A2              CALL  CHKTIM         ;Service RATE-Task if necessary
0585+ 063E 3E              MVSK  B,#GPR4        ;B-->GPR4
0586+ 063F 01              SKNB  @B.0           ;Skip if IL.0 was clear
0587+ 0640 CD              AJMP  U_RQST         ;   Jump and increment mode
0588+ 0641         ;------ No User Request, see if PDR-1 is Requesting -----
0589+ 0641         ;--- Attention by Looking for 16 Consecutive 0's on ----
0590+ 0641         ;------------- the Serial Input Port (SI) -------------
0591+ 0641 3B              MVSK  B,#REG_NO      ;B-->REG_NO       (&&&b, 6/12/90)
0592+ 0642 70              MOVI  @B,#0          ;Initialize REG_NO to 0
0593+ 0643 A2     LOOP45:  CALL  CHKTIM         ;Service RATE-Task if necessary
0594+ 0644 6C6B            CALL  Z_CHK          ;REG_NO=REG_NO+1, skip if SI=0
0595+ 0646 E7              AJMP  NO_REQ         ;   Didn't get 16 consecutive
0596+ 0647                                      ;   0's so proceed with normal
0597+ 0647                                      ;   program execution
0598+ 0647 20              SKP   C              ;Skip if REG_NO=16=0.  SIO=0 16
0599+ 0648                                      ;...consecutive times so PDR-1
0600+ 0648                                      ;...must be requesting attention
0601+ 0648 C3              JMP   LOOP45         ;  Keep looking for SIO=0
0602+ 0649 09              MVSK  B,#MODE        ;B-->MODE
0603+ 064A 73              MOVI  @B,#3          ;MODE=3 (I/O Mode)
0604+ 064B 6751            JMP   IO_TSK         ;Jump and execute I/O Mode-Task
0605+ 064D                                      ;...              (&&&e, 6/12/90)
0606+ 064D         ;------------- User pushed Push-Button #1 -------------
0607+ 064D         ;------- Disarm the DOSE-Alarm if ENABLE-bit set -------
0608+ 064D 08     U_RQST:  MVSK  B,#FLGS        ;B-->FLGS
0609+ 064E 11              SKNB  @B.1           ;Skip if DS-Alarm not enabled
0610+ 064F                                      ;...(either no DS-Alarm yet or
0611+ 064F                                      ;...already disarmed)
0612+ 064F D1              AJMP  DISARM         ;  Jump and disarm DS-Alarm
0613+ 0650 D3              AJMP  Z_BEEP         ;Jump and do nothing
0614+ 0651 45     DISARM:  CLR   @B.1           ;Clear the DS-Alarm ENABLE-Bit
0615+ 0652 46              SET   @B.2           ;Set the DS-Alarm DISARMED-Bit
0616+ 0653         ;------- Increment MODE, set INTRVL=0 if MODE=1 --------
0617+ 0653 09     Z_BEEP:  MVSK  B,#MODE        ;B-->MODE
0618+ 0654 05              MOV   A,@B^#0        ;ACC=MODEold
0619+ 0655 51              ADSK  #1             ;ACC=ACC+1
0620+ 0656 06              XCH   @B^#0          ;ACC=MODEold, MODE=MODEnew=ACC
0621+ 0657 5E              ADSK  #$E            ;ACC=MODEold+14, skip if
0622+ 0658                                      ;...MODEold>1 (MODE>2)
0623+ 0658 DB              AJMP  NT_MD3         ;  Jump if MODEold<2 (MODE<3)
0624+ 0659 00              CLR   A
0625+ 065A 06              XCH   @B^#0          ;Reset MODE to Zero
0626+ 065B 00     NT_MD3:  CLR   A
0627+ 065C 51              ADSK  #1             ;ACC=1
0628+ 065D 21              CSKE  A,@B           ;Skip if MODE=1
0629+ 065E E7              AJMP  NO_REQ         ;  Jump if MODE<>1
0630+ 065F 39              MVSK  B,#INTRVL      ;B-->INTRVL
0631+ 0660 00              CLR   A
0632+ 0661 37              XDSK  @B^#3          ;INTRVL=0 (RSI_MN/8 s sample
0633+ 0662                                      ;...period), B-->FLGS (?.?)
0634+ 0662                                      ;...              (&&&, 5/09/90)
0635+ 0662 43              CLR   @B.3           ;Cancel current RATE-Task
```

```
0636+ 0663 33C4            MVSK B,#PRGOPT   ;B-->PRGOPT          (&&&b, 5/15/90)
0637+ 0665 11              SKNB @B.1        ;Skip if RATE-Mode Enabled
0638+ 0666 D3              AJMP Z_BEEP      ;   Jump, advance through MODE1
0639+ 0667                                  ;                    (&&&e, 5/15/90)
0640+ 0667 A2        NO_REQ: CALL CHKTIM    ;Service RATE-Task if necessary
0641+ 0668                  ;
0642+ 0668                  ;"IX."
0643+ 0668                  ;--------- Setup LCD ICON-Bits as ICONS=ALRM&FLSH --------
0644+ 0668                  ;Move disposable copies of ALRM and FLSH to AMTH+6 and
0645+ 0668                  ;MATH+6.  Initialize ICONS=0 and Loop Index to $C=-4.
0646+ 0668                  ;
0647+ 0668                  ;------------ First, ALRM.3=ALRM.3&FLAG.3 ------------
0648+ 0668 3381             MVSK B,#FLAG    ;B-->FLAG
0649+ 066A 22               SET  C
0650+ 066B 13               SKNB @B.3       ;Skip if RT-Alarm Bit Clear
0651+ 066C 32               CLR  C          ;C=RATE-Alarm=ALRM.3
0652+ 066D 0F               MVSK B,#ALRM    ;B-->ALRM
0653+ 066E 20               SKP  C          ;Skip if RT-Alarm Bit Clear
0654+ 066F 4B               SET  @B.3       ;   Turn on RATE-Icon
0655+ 0670 33D8             MVSK B,#FLSH    ;B-->FLSH
0656+ 0672 00               CLR  A
0657+ 0673 5E               ADSK #%1110     ;ACC=%1110
0658+ 0674 02               XOR  @B         ;Complement FLSH-Bits for DOSE,
0659+ 0675                                  ;...BATT, and RATE Icons
0660+ 0675 06               XCH  @B^#0      ;Update FLSH-Bits, ACC=FLASHold
0661+ 0676 2E               MVSK B,#MATH+6  ;B-->MATH(6)
0662+ 0677 36               XCH  @B^#3      ;MATH(6)=FLSH', B->AMTH(6)    (?.?)
0663+ 0678 2300             MOV  A,ALRM     ;ACC=ALRM
0664+ 067A 16               XCH  @B^#1      ;AMTH(6)=ALRM', B-->ICONS     (?.?)
0665+ 067B 00               CLR  A
0666+ 067C 36               XCH  @B^#3      ;ICONS=%0000, B-->LI          (?.?)
0667+ 067D 00               CLR  A
0668+ 067E 5C               ADSK #$C        ;ACC=12
0669+ 067F                  ;--------- Compute ICONS.n = ALRM'.n & FLSH'.n ---------
0670+ 067F 06        LOOP46: XCH @B^#0      ;Update Loop-Index
0671+ 0680 A2               CALL CHKTIM     ;Service RATE-Task if necessary
0672+ 0681 1E               MVSK B,#AMTH+6  ;B-->ALRM'
0673+ 0682 05               MOV  A,@B^#0    ;ACC=ALRM'
0674+ 0683 30               ADSK @B+C       ;ACC=2xALRM' (L-shft), C=ALRM.3'
0675+ 0684 44               NOP             ;   Go ahead and carry
0676+ 0685 36               XCH  @B^#3      ;ALRM'=ACC, ACC=ALRM', B-->FLSH'
0677+ 0686                                  ;...                          (?.?)
0678+ 0686 20               SKP  C          ;Skip if ALRM.3=1
0679+ 0687 CB               AJMP N_ICON     ;   Jump if ALRM.3=0
0680+ 0688 13               SKNB @B.3       ;Skip if FLSH.3'=0
0681+ 0689 CB               AJMP N_ICON     ;   Jump, C=FLSH.3'=1
0682+ 068A 32               CLR  C          ;C=FLSH.3'=0
0683+ 068B 05        N_ICON: MOV A,@B^#0    ;ACC=FLSH'
0684+ 068C 31               ADD  @B         ;ACC=2xFLSH' (L-shft)
0685+ 068D 26               XCH  @B^#2      ;FLSH'=ACC, B-->ICONS         (?.?)
0686+ 068E 05               MOV  A,@B^#0    ;ACC=ICONS (C=ALRM.3'&FLSH.3')
0687+ 068F 30               ADSK @B+C       ;ACC=2xICONS+Carry (L-shft and
0688+ 0690                                  ;...add on next ICON.n)
0689+ 0690 44               NOP             ;   Carry has no significance
0690+ 0691 36               XCH  @B^#3      ;ICONS=ACC, B-->LI            (?.?)
0691+ 0692 05               MOV  A,@B^#0    ;ACC=LI
0692+ 0693 51               ADSK #1         ;ACC=LI+1, skip if LI=$F
0693+ 0694 667F             JMP  LOOP46     ;   Loop 4 times for 4 Icons
0694+ 0696 0F               MVSK B,#ALRM    ;B-->ALRM
0695+ 0697 4C               CLR  @B.0       ;Clear EVENT Icon-Flag
0696+ 0698                  ;"X."
0697+ 0698                  ;--------- Jump and perform selected MODE-Task ---------
0698+ 0698 08               MVSK B,#FLGS    ;B-->FLGS
0699+ 0699 4D               SET  @B.0       ;Set FLGS.0 allowing Push-Button
0700+ 069A                                  ;...to abort current MODE-Task
0701+ 069A A2               CALL CHKTIM     ;Service RATE-Task if necessary
0702+ 069B 230A             MOV  A,MODE     ;ACC=MODE
0703+ 069D 5F               ADSK #$F        ;Skip if MODE>0
0704+ 069E E3               AJMP DS_TSK     ;   Display DOSE on LCD
0705+ 069F 5F               ADSK #$F        ;Skip if MODE>1
```

```
0706+ 06A0  EE              AJMP  RT_TSK        ; Display DOSE-RATE on LCD
0707+ 06A1  66CB            JMP   AL_TSK        ; Display DSAL & E_RTAL levels
0708+ 06A3                                      ;   on LCD
0709+ 06A3
0710+ 06A3
0711+ 06A3                  ;-------------------------------------------------
0712+ 06A3                  ;--------------------- MODE TASKS ----------------
0713+ 06A3                  ;-------------------------------------------------
0714+ 06A3                  ;
0715+ 06A3                  ;************ WRITE DOSE TO LCD (MODE0) **********
0716+ 06A3                  ;
0717+ 06A3  6F0C    DS_TSK: CALL  TC2MTH        ;Load MATH-Buffer with T_CNT
0718+ 06A5  A4      DSPDOS: CALL  CONVRT        ;Convert T_CNT to FP-Decimal
0719+ 06A6  00              CLR   A
0720+ 06A7  57              ADSK  #DSCF         ;ACC=EEPROM Reg No. for DSCF
0721+ 06A8  AC              CALL  EE_RD         ;Load DSCF from EEPROM to IOBUF
0722+ 06A9  6A3E            CALL  FMUL10        ;Multiply FP-Decimal by DSCF
0723+ 06AB  32              CLR   C             ;C=0 for LCD DOSE-Units
0724+ 06AC  6476    J_MAN1: JMP   MAIN          ;Jump to MAIN and continue
0725+ 06AE
0726+ 06AE                  ;************ WRITE RAT_T TO LCD (MODE1) *********
0727+ 06AE                  ;
0728+ 06AE  33A4    RT_TSK: MVSK  B,#RAT_T      ;B-->RAT_T(0)
0729+ 06B0  A8              CALL  CPY2IO        ;Copy RAT_T into IOBUF
0730+ 06B1  22      DSPRAT: SET   C             ;Set C for MATH Target-Buffer
0731+ 06B2  B0              CALL  MV_FPH        ;Position IOBUF in MATH-Buffer
0732+ 06B3  A4              CALL  CONVRT        ;Convert RATE-value in MATH-Bufr
0733+ 06B4                                      ;...to FP-Decimal
0734+ 06B4  00              CLR   A
0735+ 06B5  58              ADSK  #RTCF         ;ACC=EEPROM Reg No. for RTCF
0736+ 06B6  AC              CALL  EE_RD         ;Load RTCF from EEPROM to IOBUF
0737+ 06B7  6A3E            CALL  FMUL10        ;Mult FP-Decimal by RTCF
0738+ 06B9  22              SET   C             ;C=1 for LCD RATE-Units
0739+ 06BA  233A            MOV   A,INTRVL      ;ACC=INTRVL      (&&&b, 4/20/90)
0740+ 06BC  5E              ADSK  #$E           ;Skip if INTRVL>1 and clamp RATE
0741+ 06BD                                      ;...display at 10xBG_AVG µR/h
0742+ 06BD  EC              JMP   J_MAN1        ;  Jump to MAIN and continue
0743+ 06BE  2B              MVSK  B,#MATH+3     ;B-->MATH(3)
0744+ 06BF  05              MOV   A,@B^#0       ;ACC=EXP of RATE
0745+ 06C0  04              XISK  @B^#0         ;B-->MATH(4)=MSN of RATE-mantisa
0746+ 06C1  5E              ADSK  #$E           ;Skip if EXP>1 which means that
0747+ 06C2                                      ;...RATE ≥ 100 µR/h
0748+ 06C2  C5              AJMP  RT_FIX        ;  Jump if EXP<2
0749+ 06C3  6476    J_MAN2: JMP   MAIN          ;Jump to MAIN and continue
0750+ 06C5  00      RT_FIX: CLR   A
0751+ 06C6  21              CSKE  A,@B          ;Skip if MSN=0
0752+ 06C7  C3              JMP   J_MAN2        ;  Return to MAIN
0753+ 06C8  52              ADSK  #BG_AVG       ;ACC=BG_AVG
0754+ 06C9  06              XCH   @B^#0         ;RATE=10xBG_AVG µR/h
0755+ 06CA  C3              JMP   J_MAN2        ;Return to MAIN   (&&&e, 4/20/90)
0756+ 06CB
0757+ 06CB                  ;********* WRITE DSAL AND RTAL TO LCD (MODE2) **********
0758+ 06CB                  ;Get DSAL-Value from EEPROM and write it to LCD for 4
0759+ 06CB                  ;DSPs, then get E_RTAL-Value from EEPROM and write it to
0760+ 06CB                  ;LCD for 4 more DSPs, and finally perform LCD BIT-Test
0761+ 06CB                  ;by turning on all segments for 8 more DSPs.
0762+ 06CB  33B8    AL_TSK: MVSK  B,#MD2TMR     ;B-->MD2TMR
0763+ 06CD  05              MOV   A,@B^#0       ;ACC=MD2TMR
0764+ 06CE  51              ADSK  #1            ;ACC=ACC+1, skip on ACC overflow
0765+ 06CF  D3              AJMP  NOT_16        ;  Jump if MD2TMR<15
0766+ 06D0  238A            XCH   MODE          ;Set MODE=0 for 16th cycle
0767+ 06D2  00              CLR   A             ;ACC=0
0768+ 06D3  06      NOT_16: XCH   @B^#0         ;MD2TMR=MD2TMR+1, ACC=MD2TMRold
0769+ 06D4  22              SET   C             ;                (&&&b, 4/26/90)
0770+ 06D5  01              SKNB  @B.0          ;Skip for even MD2TMR
0771+ 06D6  32              CLR   C             ;  C=!MD2TMR.0   (&&&e, 4/26/90)
0772+ 06D7  0E              MVSK  B,#ICONS      ;B-->ICONS
0773+ 06D8  5C              ADSK  #$C           ;Skip if MD2TMRold>3 and
0774+ 06D9                                      ;...display RTAL or test LCD
```

```
0775+ 06D9 F5            AJMP DOSDSP       ;   Jump and display DSAL
0776+ 06DA 5C            ADSK #$C          ;Skip if MD2TMRold+12+12=
0777+ 06DB                                 ;...MD2TMRold+8>7 and test LCD
0778+ 06DB EE            AJMP RATDSP       ;   Jump and display RTAL
0779+ 06DC       ;---------- Perform BIT-Test on LCD Segments ----------
0780+ 06DC 0A            MVSK B,#MNTISA    ;B-->MNTISA      (&&&b, 10/20/90)
0781+ 06DD 74            MOVI @B,#4        ;MNTISA(0)=4   (7 segmnts and DP)
0782+ 06DE 74            MOVI @B,#4        ;MNTISA(1)=4   (7 segmnts and DP)
0783+ 06DF 74            MOVI @B,#4        ;MNTISA(2)=4   (7 segmnts and DP)
0784+ 06E0 74            MOVI @B,#4        ;UNITS     =4  (6 symbols)
0785+ 06E1                                 ;...                (&&&e, 10/20/90)
0786+ 06E1 7F            MOVI @B,#$F       ;ICONS     =$F (all 4 Icons)
0787+ 06E2 33C4          MVSK B,#PRGOPT    ;B-->PRGOPT       (&&&b, 4/26/90)
0788+ 06E4 13            SKNB @B.3         ;Skip if RATE-Alarm disabled
0789+ 06E5 E9            AJMP ICN_OK       ;   Jump if RATE-Alarm enabled
0790+ 06E6 0E            MVSK B,#ICONS     ;B-->ICONS
0791+ 06E7 20            SKP  C            ;Skip if MD2TMR is even
0792+ 06E8 43            CLR  @B.3         ;   Clear RATE-Icon, MD2TMR odd
0793+ 06E9 A4   ICN_OK:  CALL CONVRT       ;Time Delay so BIT-DSP is same
0794+ 06EA                                 ;...length as ALARM level DSPs
0795+ 06EA                                 ;                 (&&&e, 4/26/90)
0796+ 06EA 690B          CALL WTSPCL       ;Turn on all LCD segments
0797+ 06EC 64CE          JMP  MAIN1
0798+ 06EE       ;----------- Display RTAL for 2nd 4 DSPs -------------
0799+ 06EE 45   RATDSP:  CLR  @B.1         ;Clear DOSE-Icon bit and
0800+ 06EF 4B            SET  @B.3         ;...set RATE-Icon bit (write
0801+ 06F0                                 ;...over previous instructions)
0802+ 06F0 3384          MVSK B,#RTAL      ;B-->RTAL(0)
0803+ 06F2 A8            CALL CPY2IO       ;Copy RTAL into IOBUF
0804+ 06F3 66B1          JMP  DSPRAT
0805+ 06F5       ;----------- Display DSAL for 1st 4 DSPs -------------
0806+ 06F5 47   DOSDSP:  SET  @B.1         ;Set DOSE-Icon bit and
0807+ 06F6 43            CLR  @B.3         ;...clear RATE-Icon bit (write
0808+ 06F7                                 ;...over previous instructions)
0809+ 06F7 33E4          MVSK B,#DSAL      ;B-->DSAL(0)
0810+ 06F9 A8            CALL CPY2IO       ;Copy DSAL into IOBUF
0811+ 06FA 22            SET  C            ;Set C for MATH Target-Buffer
0812+ 06FB B0            CALL MV_FPH       ;Position DSAL in MATH-Buffer
0813+ 06FC 66A5          JMP  DSPDOS
0814+ 06FE
0815+ 06FE       ;************ COPY RAT_M into @B,@(B+3) **************
0816+ 06FE       ;INT*4-->INT*4: Call with B pointing at LSN of
0817+ 06FE       ;DESTINATION.  SOURCE remains intact.
0818+ 06FE       ;
0819+ 06FE 2350  CPY_MR:  MOV  A,RAT_M     ;ACC=RAT_M(0)
0820+ 0700 04            XISK @B^#0        ;@B=ACC, B-->@(B+1)
0821+ 0701 2351          MOV  A,RAT_M+1    ;ACC=RAT_M(1)
0822+ 0703 04            XISK @B^#0        ;@(B+1)=ACC, B-->@(B+2)
0823+ 0704 2352          MOV  A,RAT_M+2    ;ACC=RAT_M(2)
0824+ 0706 04            XISK @B^#0        ;@(B+2)=ACC, B-->@(B+3)
0825+ 0707 2353          MOV  A,RAT_M+3    ;ACC=RAT_M(3)
0826+ 0709 06            XCH  @B^#0        ;@(B+3)=ACC
0827+ 070A 6332 J_CKT6:  JMP  CK_TIM       ;Service RATE-Task if necessary
0828+ 070C                                 ;...and RETurn
0829+ 070C
0830+ 070C       ;*************** COPY T_CNT into MATH ****************
0831+ 070C       ;INT*7-->INT*7: SOURCE remains intact.
0832+ 070C       ;
0833+ 070C 28   TC2MTH:  MVSK B,#MATH      ;B-->MATH(0)
0834+ 070D 2349          MOV  A,T_CNT      ;ACC=T_CNT(0)
0835+ 070F 04            XISK @B^#0        ;MATH=ACC, B-->MATH(1)
0836+ 0710 234A          MOV  A,T_CNT+1    ;ACC=T_CNT(1)
0837+ 0712 04            XISK @B^#0        ;MATH(1)=ACC, B-->MATH(2)
0838+ 0713 234B          MOV  A,T_CNT+2    ;ACC=T_CNT(2)
0839+ 0715 04            XISK @B^#0        ;MATH(2)=ACC, B-->MATH(3)
0840+ 0716 234C          MOV  A,T_CNT+3    ;ACC=T_CNT(3)
0841+ 0718 04            XISK @B^#0        ;MATH(3)=ACC, B-->MATH(4)
0842+ 0719 234D          MOV  A,T_CNT+4    ;ACC=T_CNT(4)
0843+ 071B 04            XISK @B^#0        ;MATH(4)=ACC, B-->MATH(5)
0844+ 071C 234E          MOV  A,T_CNT+5    ;ACC=T_CNT(5)
0845+ 071E 04            XISK @B^#0        ;MATH(5)=ACC, B-->MATH(6)
```

```
0846+ 071F 234F           MOV   A,T_CNT+6       ;ACC=T_CNT(6)
0847+ 0721 06             XCH   @B^#0           ;MATH(6)=ACC
0848+ 0722 CA             JMP   J_CKT6          ;Service RATE-Task if necessary
0849+ 0723                                      ;...and RETurn
0850+ 0723
0851+ 0723        ;*************** ADD δCdt to T_CNT *****************
0852+ 0723        ;Compute T_CNT(i)=T_CNT(i)+δCdt(i) for i=0,1,2,3 and
0853+ 0723        ;propagate Carry for i=4,5,6 (INT*7+INT*4). FLAG.0 is
0854+ 0723        ;set on return if addition overflow occurs.
0855+ 0723        ;
0856+ 0723 3381   AD_DCT:  MVSK B,#FLAG         ;B-->FLAG
0857+ 0725 01             SKNB  @B.0            ;Skip if T_CNT Overflow Flag is
0858+ 0726                                      ;...clear and add cnt's
0859+ 0726 CA             JMP   J_CKT6          ;  Service RATE-Task if
0860+ 0727                                      ;  necessary and RETurn
0861+ 0727 232C           MOV   A,MATH+3        ;ACC=EXPP
0862+ 0729 57             ADSK  #7              ;ACC=EXPP+(9-2)=LSD DIGT#
0863+ 072A 44             NOP                   ;  In case EXPP is negative,
0864+ 072B                                      ;  probably can't happen
0865+ 072B 33C9           MVSK  B,#T_CNT        ;B-->T_CNT(0) RAM Register
0866+ 072D 50             MOV   BD,A            ;B-->T_CNT(i) for LSD
0867+ 072E 59             ADSK  #$9             ;ACC=Bd+9, skip if Bd>6
0868+ 072F                                      ;...(δCdt≥1)      (&&&, 4/28/90)
0869+ 072F                                      ;...[to free up T_CNT(-3)]
0870+ 072F CA             JMP   J_CKT6          ;  δCdt<1, jump and forget it
0871+ 0730 32             CLR   C
0872+ 0731 232F           MOV   A,MATH+6        ;ACC=LSN of PRODuct mantissa
0873+ 0733 30             ADSK  @B+C            ;ACC=LSN+D_CNT(i)
0874+ 0734 44             NOP                   ;  Go ahead and carry
0875+ 0735 04             XISK  @B^#0           ;T_CNT(i)=ACC, B-->T_CNT(i+1)
0876+ 0736 232E           MOV   A,MATH+5        ;ACC=SSN of PROD
0877+ 0738 30             ADSK  @B+C            ;ACC= SSN + T_CNT(i+1)
0878+ 0739 44             NOP                   ;  Go ahead and carry
0879+ 073A 04             XISK  @B^#0           ;T_CNT(i+1)=ACC, B->T_CNT(i+2)
0880+ 073B 232D           MOV   A,MATH+4        ;ACC=MSN of PROD
0881+ 073D 6457           JMP   OVFLW?          ;Jump, finish addition and test
0882+ 073F                                      ;...for Overflow
0883+ 073F
0884+ 073F        ;***** Code to Handle COP444CP G-Port Load Devices *****
0885+ 073F        ;
0886+ 073F        ;C444CP: MOV G,#%1111         ;Put G-PORT Output Drivers in
0887+ 073F                                      ;...Logic 1 State.  CD4020B
0888+ 073F                                      ;...outputs can sink .25 mA thru
0889+ 073F                                      ;...a diode to write a Logic 0.
0890+ 073F                                      ;...Don't need this instruction
0891+ 073F                                      ;...with COP444Cs        (@@@)
0892+ 073F        ;       MOV   A,G             ;Get G=MSN from CD4020B.  Don't
0893+ 073F                                      ;...need this instruction with
0894+ 073F                                      ;...COP444Cs             (@@@)
0895+ 073F        ;       MOV   G,#%0000        ;Put G-PORT Output Drivers in
0896+ 073F                                      ;...Logic 0 State.  Diodes will
0897+ 073F                                      ;...prevent CD4020B Logic 1 out-
0898+ 073F                                      ;...puts from sourcing current.
0899+ 073F                                      ;...Don't need this instruction
0900+ 073F                                      ;...with COP444Cs        (@@@)
0901+ 073F        ;       JMP   C444C           ;Jump back to COP444C code (@@@)
0902+ 073F
0903+ 073F
0904+ 073F 50442D         .TXT "PD-1/SAIC (c) 1990" ;Embedded copyright &
       0742 312F53
       0745 414943
       0748 202863
       074B 292031
       074E 393930
0905+ 0751                                      ;...code identifier
0906+ 0751
0907+ 0751        ;       .ORG $751
0908+ 0751        ;******** UPLOAD/DOWNLOAD  EEPROM TO/FROM PDR-1 ********
0909+ 0751        ;********* WITH 74AC86 SERIAL I/O PORT (MODE3) *********
0910+ 0751        ;
```

```
0911+ 0751                    ;------ Write "I-O" to LCD to acknowledge MODE3 -------
0912+ 0751                    ;-------------- and update the ICONS ------------------
0913+ 0751  0A      IO_TSK:  MVSK  B,#MNTISA    ;B-->MNTISA(0)
0914+ 0752  71               MOVI  @B,#1        ;Mantissa=1,2,3 so LCD shows
0915+ 0753  72               MOVI  @B,#2        ;..."I-O"
0916+ 0754  73               MOVI  @B,#3        ;
0917+ 0755  70               MOVI  @B,#0        ;UNITS=blank, B-->ICONS
0918+ 0756  70               MOVI  @B,#0        ;ICONS=blank
0919+ 0757  A2               CALL  CHKTIM       ;Service RATE-Task if necessary
0920+ 0758  690B             CALL  WTSPCL       ;Update the LCD to acknowledge
0921+ 075A                                      ;...MODE3 operation using
0922+ 075A                                      ;...SPeCial Character Set
0923+ 075A          ;
0924+ 075A          ;--------------- Transmit ACKnowledge PuLSe --------------
0925+ 075A          ;Transmit ≥33 Baud periods of %1. The PDR-1 must hold
0926+ 075A          ;S_IN low to see this pulse on S_OUT.
0927+ 075A  336B    AK_PLS:  MOV   EN,#$B       ;Enable SO=%1, leave IRQs
0928+ 075C                                      ;...enabled       (&&&b, 10/9/90)
0929+ 075C  3397             MVSK  B,#BCD       ;B-->BCD (2 Baud)
0930+ 075E  80               CALL  ZERO         ;1+3x9+1=29 Baud delay
0931+ 075F  3362             MOV   EN,#2        ;Disable SO (2 Baud), leave IRQs
0932+ 0761                                      ;...enabled       (&&&e, 10/9/90)
0933+ 0761          ;
0934+ 0761          ;*-*-*-*-*-*-*-* UPLOAD/DOWNLOAD  BRANCH *-*-*-*-*-*-*-*
0935+ 0761  6C6B             CALL  Z_CHK        ;Skip if SI=0 and UPLOAD
0936+ 0763  67BA             JMP   DN_LOD       ;   Jump to DOWNLOAD Routines
0937+ 0765          ;
0938+ 0765          ;------- Update DMT Registers or begin uploading -------
0939+ 0765  09               MVSK  B,#MODE      ;B-->MODE
0940+ 0766  00               CLR   A
0941+ 0767  5B               ADSK  #$B          ;ACC=11 to initialize REG_NO for
0942+ 0768                                      ;...5 Reg Upload
0943+ 0768  01               SKNB  @B.0         ;Skip if MODE.0=0 and copy RAM-
0944+ 0769                                      ;...values of DOSE, MAXRT and
0945+ 0769                                      ;...TARA to EEPROM before up-
0946+ 0769                                      ;...loading all 16 Registers
0947+ 0769  678E             JMP   UP_LOD       ;   Jump if MODE.0=1 and upload
0948+ 076B                                      ;   Regs 11 thru 15
0949+ 076B          ;
0950+ 076B          ;*-*-*-*-*- Write DOSE, MAXRT, TARA to EEPROM -*-*-*-*-*
0951+ 076B          ;---------- Relocated as part of 5/05/90 MODs ----------
0952+ 076B  69B7    WT_DMT:  CALL  EE_WEN       ;WRITE-Enable the EEPROM. PDR-1
0953+ 076D                                      ;...can read UPDATE at this time
0954+ 076D                                      ;...      (&&&, 4/17/90,5/06/90)
0955+ 076D  32               CLR   C            ;C=0 for T_CNT    (&&&, 4/26/90)
0956+ 076E  69BF             CALL  FLT_TC       ;Float T_CNT into IOBUF
0957+ 0770  00               CLR   A
0958+ 0771  5C               ADSK  #E_DOSE      ;ACC=EEPROM Reg No. for E_DOSE
0959+ 0772  AA               CALL  EE_WT        ;Write DOSE to EEPROM
0960+ 0773  33B4             MVSK  B,#MAXRT     ;B-->MAXRT(0)
0961+ 0775  A8               CALL  CPY2IO       ;Copy MAXRT into IOBUF
0962+ 0776  00               CLR   A
0963+ 0777  5D               ADSK  #E_MXRT      ;ACC=EEPROM Reg No. for E_MXRT
0964+ 0778  AA               CALL  EE_WT        ;Write MAXRT to EEPROM
0965+ 0779  33C6             MVSK  B,#BATTRY    ;B-->BATTRY
0966+ 077B  13               SKNB  @B.3         ;Skip if ASDP inactive and write
0967+ 077C                                      ;...TARA to EEPROM
0968+ 077C  6784             JMP   N_TARA       ;   TARA Regs are counting TOFPs
0969+ 077E                                      ;   since Low-Batt, don't write
0970+ 077E  22               SET   C            ;C=1 for TARA     (&&&b, 4/28/90)
0971+ 077F  69BF             CALL  FLT_TC       ;Float TARA into IOBUF
0972+ 0781  00               CLR   A
0973+ 0782  5B               ADSK  #E_TARA      ;ACC=EEPROM Reg No. for E_TARA
0974+ 0783  AA               CALL  EE_WT        ;Write TARA to EEPROM
0975+ 0784                                      ;...              (&&&e, 4/28/90)
0976+ 0784  69F7    N_TARA:  CALL  EE_WDS       ;WRITE-Disable the EEPROM and
0977+ 0786                                      ;...Tri-State the NMC93C06 so
0978+ 0786                                      ;...the PDR-1 can see leading
0979+ 0786                                      ;...edge of the REG0 Start-Bit
0980+ 0786                                      ;...              (&&&, 4/17/90)
```

```
0981+ 0786 09              MVSK  B,#MODE      ;B-->MODE          (&&&b, 5/13/90)
0982+ 0787 00              CLR   A            ;ACC=0 to initialize REG_NO for
0983+ 0788                                    ;...16 Reg Upload
0984+ 0788 03              SKNB  @B.2         ;Skip if MODE.2=0
0985+ 0789 64DC            JMP   EEUPDT       ;  Jump to EEUPDT if EEPROM
0986+ 078B                                    ;    UPDaTe          (&&&e, 5/13/90)
0987+ 078B 13              SKNB  @B.3         ;Skip if MODE.3=0  (&&&, 5/06/90)
0988+ 078C 64A8            JMP   LB_RTN       ;  Jump back to LB_RTN for ASDP
0989+ 078E                                    ;                  (&&&, 5/06/90)
0990+ 078E        ;
0991+ 078E        ;*-*-*-*-*-* Upload 5 or 16 EEPROM Registers *-*-*-*-*-*
0992+ 078E 3B     UP_LOD: MVSK  B,#REG_NO    ;B-->REG_NO        (&&&, 5/05/90)
0993+ 078F 06             XCH   @B^#0        ;REG_NO=ACC (0 or 11)
0994+ 0790 05     LOOP49: MOV   A,@B^#0      ;ACC=REG_NO
0995+ 0791 AC             CALL  EE_RD        ;Move EEPROM-Reg to IOBUF
0996+ 0792 A2             CALL  CHKTIM       ;Service RATE-Task if necessary
0997+ 0793 3B             MVSK  B,#REG_NO    ;B-->REG_NO
0998+ 0794 00             CLR   A
0999+ 0795 22             SET   C
1000+ 0796 30             ADSK  @B+C         ;ACC=1+REG_NO
1001+ 0797 44             NOP                ;  Go ahead and carry
1002+ 0798 06             XCH   @B^#0        ;Update REG_NO
1003+ 0799 20             SKP   C            ;Skip if REG_NO=16=0
1004+ 079A D0             JMP   LOOP49       ;  Loop 'til REG15 sent
1005+ 079B        ;
1006+ 079B        ;*-*-*-* Wait for PDR-1 decision to Loop through *-*-*-*
1007+ 079B        ;*-*-*-*-*- UPLOAD Routines or return to MAIN -*-*-*-*-*
1008+ 079B        ;
1009+ 079B        ;Note that SIO=%1111 is the normal PD-1 condition except
1010+ 079B        ;during internal I/O with the EEPROM or LCD-Driver.  So,
1011+ 079B        ;if the PD-1 is removed from the PDR-1 during the rest
1012+ 079B        ;of IO_TSK, it will return to DS_TSK.
1013+ 079B        ;
1014+ 079B        ;----------- Return to MAIN (MODE=0) if SI=1 -----------
1015+ 079B 7C             MOVI  @B,#$C       ;Initialize REG_NO=12 so only 4
1016+ 079C                                   ;...SI=1/2 nibbles are required
1017+ 079C                                   ;...to advance uploading
1018+ 079C                                   ;                  (&&&, 12/1/90)
1019+ 079C A2     LOOP50: CALL  CHKTIM       ;Service RATE-Task if necessary
1020+ 079D                                   ;                  (&&&b, 10/9/90)
1021+ 079D 9B             CALL  SRCH_F       ;@B=SRCHR=$F, ACC=SIO
1022+ 079E 21             CSKE  A,@B         ;Skip if SI=1 (SIO=%1111)
1023+ 079F EC             AJMP  SI_N11       ;  Jump and check for ACC=0
1024+ 07A0        ;
1025+ 07A0        ;----------- Set UPDATE.0=PRGOPT.0 and Return -----------
1026+ 07A0        ;----------------- to MAIN thru DS_TSK -----------------
1027+ 07A0 33C5   RTN_DT: MVSK  B,#UPDATE    ;B-->UPDATE        (&&&b, 5/13/90)
1028+ 07A2 4C             CLR   @B.0         ;Clear UPDATE.0
1029+ 07A3 07             XDSK  @B^#0        ;ACC=UPDATE&%1110, B-->PRGOPT
1030+ 07A4                                   ;...                  (?.?)
1031+ 07A4 01             SKNB  @B.0         ;Skip if PRGOPT.0=0 (no auto-
1032+ 07A5                                   ;...matic EEPROM updating)
1033+ 07A5 51             ADSK  #1           ;  ACC.0=1, never skips
1034+ 07A6 23C5           XCH   UPDATE       ;UPDATE=(UPDATEold&%1110)|
1035+ 07A8                                   ;...(PRGOPT&%0001)
1036+ 07A8                                   ;...                (&&&e, 5/13/90)
1037+ 07A8 69F7           CALL  EE_WDS       ;WRITE-Disable the EEPROM
1038+ 07AA                                   ;...                (&&&, 4/17/90)
1039+ 07AA 6653           JMP   Z_BEEP       ;Return to MODE0 thru DS_TSK
1040+ 07AC        ;
1041+ 07AC        ;------------- Loop through UPLOAD if SI=0 -------------
1042+ 07AC 5F     SI_N11: ADSK  #$F          ;Skip if ACC>0 (SIO=%1010,%1100)
1043+ 07AD 675A   J_AKPL: JMP   AK_PLS       ;  UPLOAD again if SI=0 using
1044+ 07AF                                   ;  old value of MODE.0
1045+ 07AF        ;
1046+ 07AF        ;------- Look for 4 consecutive values of 0<SI<1 -------
1047+ 07AF        ;--------- and set MODE.0=0 for 16 REG Upload ----------
1048+ 07AF 3B             MVSK  B,#REG_NO    ;B-->REG_NO
1049+ 07B0 00             CLR   A            ;ACC=0
1050+ 07B1 22             SET   C            ;C=1
```

```
1051+ 07B2 30              ADSK  @B+C          ;ACC=1+REG_NO
1052+ 07B3 44              NOP                 ;   Go ahead and carry
1053+ 07B4 06              XCH   @B^#0         ;Update REG_NO
1054+ 07B5 20              SKP   C             ;Skip if REG_NO=16=0.  0<SIO<15
1055+ 07B6                                     ;...4 consecutive times so set
1056+ 07B6                                     ;...MODE.0=0
1057+ 07B6 DC              JMP   LOOP50        ;   Wait for PDR-1 decision
1058+ 07B7                                     ;               (&&&e, 10/9/90)
1059+ 07B7 09              MVSK  B,#MODE       ;B-->MODE
1060+ 07B8 4C              CLR   @B.0          ;MODE.0=0 (UPLOAD 16 REGs now)
1061+ 07B9 ED              JMP   J_AKPL        ;Return to UPLOADing loop
1062+ 07BA             ;
1063+ 07BA             ;*-*-*-*-*-* Return to MAIN (MODE=0) if SI=1 *-*-*-*-*-*
1064+ 07BA 9B      DN_LOD: CALL  SRCH_F        ;@B=SRCHR=$F, ACC=SIO
1065+ 07BB 21              CSKE  A,@B          ;Skip if SI=1 (%1111)
1066+ 07BC FE              AJMP  SI_N12        ;   Jump and check for ACC=0
1067+ 07BD E0              JMP   RTN_DT        ;Return to MODE0 thru DS_TSK
1068+ 07BE             ;---------------- Keep looping if SI>0 -----------------
1069+ 07BE 3B      SI_N12: MVSK  B,#REG_NO     ;B-->REG_NO
1070+ 07BF 7C              MOVI  @B,#$C        ;Initialize REG_NO to 12
1071+ 07C0                                     ;               (&&&, 12/1/90)
1072+ 07C0             ;----------- Look for 4 more consecutive 0's -----------
1073+ 07C0             ;-------- and then proceed with EEPROM updating --------
1074+ 07C0 A2      LOOP51: CALL  CHKTIM        ;Service RATE-Task if necessary
1075+ 07C1 6C6B            CALL  Z_CHK         ;REG_NO=REG_NO+1, skip if SI=0
1076+ 07C3 67BA            JMP   DN_LOD        ;   Jump and test SIO again
1077+ 07C5 20              SKP   C             ;Skip if REG_NO=16=0. SIO=0 4
1078+ 07C6                                     ;...consecutive times so PD-1
1079+ 07C6                                     ;...must be under PDR-1 control.
1080+ 07C6                                     ;...Skip and download 11 Regs
1081+ 07C6                                     ;...plus COMAND
1082+ 07C6 C0              JMP   LOOP51        ;   Keep looking for SIO=0
1083+ 07C7 69B7            CALL  EE_WEN        ;WRITE-Enable the EEPROM
1084+ 07C9                                     ;...           (&&&, 4/17/90)
1085+ 07C9             ;
1086+ 07C9             ;*-*-*- Download Regs 0 thru 10 and Update EEPROM -*-*-*
1087+ 07C9             ;------ First, pickup 4 DATA Nibls from the PDR-1 ------
1088+ 07C9 1C      LOOP52: MVSK  B,#EECBF      ;B-->EECBF(0)    (&&&b, 10/9/90)
1089+ 07CA 71              MOVI  @B,#1         ;1st Ready to Receive Nibble
1090+ 07CB 79              MOVI  @B,#9         ;2nd RRN with a READ Flag-Bit
1091+ 07CC                                     ;...           (&&&, 4/17/90)
1092+ 07CC 71              MOVI  @B,#1         ;3rd RRN for PDR-1 Sync
1093+ 07CD 6A07            CALL  RD_86         ;Output the 3 RRNs and input 4
1094+ 07CF                                     ;...data nibbles to IOBUF
1095+ 07CF 1B              MVSK  B,#IOBUF      ;B-->IOBUF
1096+ 07D0 686C            CALL  CPYXR1        ;Save copy of data at SWAP
1097+ 07D2             ;------ Now, Pickup 4 Valid Communication Nibbles ------
1098+ 07D2 1C              MVSK  B,#EECBF      ;B-->EECBF(0)
1099+ 07D3 71              MOVI  @B,#1         ;1st Ready to Receive Nibble
1100+ 07D4 7D              MOVI  @B,#$D        ;2nd RRN with a READ Flag-Bit
1101+ 07D5                                     ;...and an ADR Flag-Bit
1102+ 07D5 71              MOVI  @B,#1         ;3rd RRN for PDR-1 Sync
1103+ 07D6 6A07            CALL  RD_86         ;Output the 3 RRNs and input 4
1104+ 07D8                                     ;...Reg No. nibbles to IOBUF
1105+ 07D8 3B              MVSK  B,#REG_NO     ;B-->REG_NO
1106+ 07D9 25              MOV   A,@B^#2       ;ACC=REG_NO, B-->IOBUF(0)  (?.?)
1107+ 07DA 51              ADSK  #1            ;ACC=REG_NO+1 to avoid hammering
1108+ 07DB                                     ;...REG0 inadvertently (never
1109+ 07DB                                     ;...skips)
1110+ 07DB             ;------- Compare VCNs to REG_NO+1 and terminate --------
1111+ 07DB             ;----------- downloading unless all 4 match ------------
1112+ 07DB 21      LOOP53: CSKE  A,@B          ;Skip if IOBUF(i)=REG_NO+1
1113+ 07DC ED              AJMP  COMND?        ;   Jump if IOBUF(i)<>REG_NO+1
1114+ 07DD                                     ;   and discontinue downloading
1115+ 07DD 04              XISK  @B^#0         ;ACC=IOBUF(i)=REG_NO+1,
1116+ 07DE                                     ;...B-->IOBUF(i+1), skip if i=4
1117+ 07DE DB              JMP   LOOP53        ;   Check all 4 VCNs to insure
1118+ 07DF                                     ;   PD-1 is receiving valid data
1119+ 07DF                                     ;   from PDR-1
1120+ 07DF                                     ;...           (&&&e, 10/9/90)
```

```
1121+ 07DF 0B           MVSK B,#SWAP      ;B-->SWAP
1122+ 07E0 686C         CALL CPYXR1       ;Copy data non-destructively
1123+ 07E2                                ;...from SWAP to IOBUF
1124+ 07E2 3B           MVSK B,#REG_NO    ;B-->REG_NO
1125+ 07E3 05           MOV  A,@B^#0      ;ACC=REG_NO
1126+ 07E4 55           ADSK #5           ;Skip if Reg No.=11
1127+ 07E5 E7           AJMP NOT_11       ; Jump if Reg No.<11
1128+ 07E6 F5           AJMP RNO_11       ;Jump if Reg No.=11 (the 12th
1129+ 07E7                                ;...download is not written to
1130+ 07E7                                ;...EEPROM.  It's a COMAND to
1131+ 07E7                                ;...direct code execution)
1132+ 07E7 05    NOT_11: MOV A,@B^#0      ;ACC=REG_NO
1133+ 07E8 51           ADSK #1           ;ACC=1+REG_NO
1134+ 07E9 06           XCH  @B^#0        ;Update REG_NO, ACC=REG_NOold
1135+ 07EA         ;---------- Write new data to EEPROM(REG_NO) -----------
1136+ 07EA AA           CALL EE_WT        ;Write data in IOBUF to
1137+ 07EB                                ;...Register(ACC) of EEPROM
1138+ 07EB A2           CALL CHKTIM       ;Service RATE-Task if necessary
1139+ 07EC C9           JMP  LOOP52       ; Loop 'til REG11 is written
1140+ 07ED         ;
1141+ 07ED         ;------------ Trap VCN/REG_NO+1 Mismatches ------------
1142+ 07ED         ;The first occurrence of mismatch between any VCN and
1143+ 07ED         ;REG_NO+1 causes code execution to branch here.  VCN=12
1144+ 07ED         ;is interpreted as a signal to terminate downloading.
1145+ 07ED         ;SWAP(0) is assumed to be COMAND.
1146+ 07ED 1B    COMND?: MVSK B,#IOBUF    ;B-->IOBUF (all 4 VCNs must be
1147+ 07EE                                ;...12 to pass this test)
1148+ 07EE                                ;...            (&&&b, 10/9/90)
1149+ 07EE 00           CLR  A
1150+ 07EF 5C           ADSK #12          ;ACC=VCN for COMAND
1151+ 07F0 21    LOOP54: CSKE A,@B        ;Skip if IOBUF(i)=12
1152+ 07F1 67A0  J_RTND: JMP RTN_DT       ; Jump if IOBUF(i)<>12 and
1153+ 07F3                                ; discontinue downloading
1154+ 07F3 04           XISK @B^#0        ;ACC=IOBUF(i)=REG_NO+1,
1155+ 07F4                                ;...B-->IOBUF(i+1), skip if i=4
1156+ 07F4 F0           JMP  LOOP54       ; Check all 4 VCNs to insure
1157+ 07F5                                ; PD-1 is receiving valid data
1158+ 07F5                                ; from PDR-1     (&&&e, 10/9/90)
1159+ 07F5         ;
1160+ 07F5         ;*-*-*-* Jump to RESET if COMAND(0)=9; otherwise *-*-*-*
1161+ 07F5         ;*-*-*-*-*-*- return to MAIN through DS_TSK -*-*-*-*-*-*
1162+ 07F5 69F7  RNO_11: CALL EE_WDS      ;WRITE-Disable the EEPROM
1163+ 07F7                                ;...             (&&&, 4/17/90)
1164+ 07F7 6015         JMP  EE2RAM       ;Copy new EEPROM Regs into RAM
1165+ 07F9                                ;...(jumps back to BK2IO)
1166+ 07F9 0B    BK2IO: MVSK B,#SWAP      ;B-->SWAP(0)=COMAND(0)
1167+ 07FA 00           CLR  A
1168+ 07FB 59           ADSK #9           ;ACC=9           (&&&, 10/9/90)
1169+ 07FC 21           CSKE A,@B         ;Skip if COMAND(0)=9
1170+ 07FD F1           JMP  J_RTND       ; Jump if COMAND(0)<>9 and
1171+ 07FE                                ; return to MODE0 thru DS_TSK
1172+ 07FE 6000         JMP  RESET        ;Jump to RESET, same as
1173+ 0800                                ;...POWER-ON (warm Restart)
1174+ 0800
1175+ 0800
1176+ 07FF                 .ORG $7FF
1177+ 07FF                 .END
1178+ 07FF                                ;Extra line to force an .END
```

SYMBOL TABLE
Type: Bit(RAM), Code, Data(RAM), No.(Const), Xtrnl(Hdwr)

| Label | Type:Value | Label | Type:Value | Label | Type:Value |
|---|---|---|---|---|---|
| ABK_DN | C:02E1 | ADBAK1 | C:02D8 | ADBAK2 | C:0485 |
| AD_DCM | C:043E | AD_DCT | C:0723 | AK_PLS | C:075A |
| ALLCLR | C:0014 | ALRM | D:0000 | ALRM1 | C:0369 |

| | | |
|---|---|---|
| ALRM2 ........C:03B5 | AL_TSK ........C:06CB | AMTH .........D:0019 |
| AXDSB ........D:0014 | A_ASDP ........C:04B6 | BATTRY .......D:0046 |
| BCD ..........D:0017 | BD_GMT ........C:04A4 | BG_AVG .......N:0002 |
| BG_ER ........D:0040 | BK2IO ........C:07F9 | BKGD .........D:0043 |
| BLNK .........N:000D | C444C ........C:00C5 | CAL_DT .......X:000A |
| CHKTIM .......C:00A2 | CHRP .........D:0059 | CHRPLN .......N:0006 |
| CK_ALR .......C:057E | CK_LIM .......C:0074 | CK_TIM .......C:0332 |
| CNTR .........D:0002 | COMND? ........C:07ED | CONVRT .......C:00A4 |
| COPYIO .......C:0042 | CPTOIO ........C:005C | CPY2IO .......C:00A8 |
| CPYXR1 .......C:006C | CPYXR3 ........C:0070 | CPY_IO .......C:00A6 |
| CPY_M3 .......C:0050 | CPY_M4 ........C:0053 | CPY_MR .......C:06FE |
| CTRL1 ........C:037E | CTRL2 ........C:03CB | CYCL2 ........N:0002 |
| DCRMNT .......C:01A5 | DEC_BG ........C:051D | DEC_PT .......D:002A |
| DELTA ........C:0186 | DISARM ........C:0651 | DLY_2 ........C:008F |
| DLY_3 ........C:008E | DN_LOD ........C:07BA | DOSDSP .......C:06F5 |
| DOS_OK .......C:05D2 | DO_RAT ........C:038E | DPRT_J .......C:0090 |
| DPRT_R .......C:0092 | DSAL .........D:0064 | DSCF .........X:0007 |
| DSPBF2 .......D:002B | DSPBF3 ........D:003B | DSPDOS .......C:06A5 |
| DSPRAT .......C:06B1 | DS_472 ........C:0136 | DS_COR .......C:0570 |
| DS_TSK .......C:06A3 | D_DS .........D:0070 | D_REG ........D:0039 |
| D_RT .........D:0030 | E2EWDS ........N:0000 | E2EWEN .......N:0003 |
| EE2RAM .......C:0015 | EECBF ........D:001D | EEREAD .......C:0200 |
| EEUPDT .......C:04DC | EEWBF ........D:0019 | EEWRT ........C:0209 |
| EE_DIS .......C:022B | EE_RD ........C:00AC | EE_RI ........N:0008 |
| EE_WDS .......C:01F7 | EE_WED ........C:0204 | EE_WEN .......C:01B7 |
| EE_WI ........N:0004 | EE_WT ........C:00AA | EXCHNG .......C:004D |
| EXP2 .........C:0553 | EXPOK1 ........C:024B | EXPOK2 .......C:02FC |
| E_DOSE .......X:000C | E_DSAL ........X:0001 | E_GMDT .......X:0009 |
| E_INCP .......X:0003 | E_MXRT ........X:000D | E_PRSN .......X:0004 |
| E_RTAL .......X:0002 | E_TARA ........X:000B | FDIV16 .......C:02B9 |
| FLAC .........D:003C | FLAG .........D:0001 | FLGS .........D:0009 |
| FLSH .........D:0058 | FLT_DS ........C:0314 | FLT_PT .......C:016C |
| FLT_TC .......C:01BF | FMUL10 ........C:023E | FMUL16 .......C:00AE |
| FX_RXT .......C:0564 | GMTOK1 ........C:03F6 | GMTOK2 .......C:0490 |
| GM_DT .........D:0074 | GOTMSD ........C:0176 | GPR1 .........D:0015 |
| GPR2 .........D:0016 | GPR3 .........D:003E | GPR4 .........D:003F |
| HEX2DK .......C:013C | HEXMLT ........C:027B | ICN_OK .......C:06E9 |
| ICONS ........D:000F | ID_STR ........X:0005 | INCHRP .......D:0054 |
| INCRS? .......C:03DB | INCTAR ........C:05AC | INCTIM .......C:0390 |
| INPORT .......D:0028 | INT12 ........C:0402 | INT21 ........C:01A1 |
| INT23 ........C:0404 | INT32 ........C:01A3 | INTRVL .......D:003A |
| INT_OK .......C:040F | IN_PRG ........C:0501 | IOBUF ........D:001C |
| IO_TSK .......C:0751 | J_4EVR ........C:04CB | J_AKPL .......C:07AD |
| J_CKAL .......C:052B | J_CKT1 ........C:004E | J_CKT2 .......C:01CB |
| J_CKT3 .......C:0249 | J_CKT4 ........C:02A9 | J_CKT5 .......C:0441 |
| J_CKT6 .......C:070A | J_INOK ........C:03D9 | J_MAN1 .......C:06AC |
| J_MAN2 .......C:06C3 | J_NTMO ........C:0493 | J_RTND .......C:07F1 |
| J_WAT6 .......C:05DD | J_WDMT ........C:04D8 | L3_OLD .......D:0008 |
| LB_RTN .......C:04A8 | LD_NDS ........C:00B2 | LD_NRI .......C:00B3 |
| LD_NRR .......C:00B4 | LIM12 ........N:0004 | LIM16 ........C:0407 |
| LIM23 ........N:0001 | LOOP1 ........C:000E | LOOP10 .......C:0163 |
| LOOP11 .......C:016E | LOOP12 ........C:0188 | LOOP13 .......C:01AE |
| LOOP14 .......C:01F8 | LOOP15 ........C:01C5 | LOOP16 .......C:0211 |
| LOOP17 .......C:0221 | LOOP18 ........C:0237 | LOOP19 .......C:0251 |
| LOOP2 .........C:0085 | LOOP20 ........C:0258 | LOOP21 .......C:0283 |
| LOOP22 .......C:028A | LOOP23 ........C:02C6 | LOOP24 .......C:02C9 |
| LOOP25 .......C:02D9 | LOOP26 ........C:02F1 | LOOP27 .......C:0319 |
| LOOP28 .......C:0350 | LOOP29 ........C:0397 | LOOP3 ........C:008A |
| LOOP30 .......C:0411 | LOOP31 ........C:0417 | LOOP32 .......C:047E |
| LOOP33 .......C:04F5 | LOOP34 ........C:0506 | LOOP35 .......C:054B |
| LOOP36 .......C:0557 | LOOP37 ........C:0581 | LOOP38 .......C:058F |
| LOOP39 .......C:0598 | LOOP4 ........C:010D | LOOP40 .......C:05B2 |
| LOOP41 .......C:05C5 | LOOP42 ........C:05D6 | LOOP43 .......C:05EC |
| LOOP44 .......C:05F9 | LOOP45 ........C:0643 | LOOP46 .......C:067F |
| LOOP47 .......C:045A | LOOP48 ........C:0466 | LOOP49 .......C:0790 |
| LOOP5 .........C:012D | LOOP50 ........C:079C | LOOP51 .......C:07C0 |
| LOOP52 .......C:07C9 | LOOP53 ........C:07DB | LOOP54 .......C:07F0 |
| LOOP6 .........C:0142 | LOOP7 ........C:0146 | LOOP8 ........C:014F |
| LOOP9 .........C:015A | LO_NIB ........D:0014 | LSNOK ........C:042C |
| LSN_OK .......C:032D | LSRD1 ........C:0261 | LSRD2 ........C:0292 |
| LSTDGT .......C:029B | LSTDIG ........C:026A | LSTNB2 .......N:002F |

| | | |
|---|---|---|
| LSTNB7 ......N:007F | LSTREG ......N:0070 | MAIN ........C:0476 |
| MAIN1 ......C:04CE | MATH ........D:0029 | MAXRT ......D:0034 |
| MD2TMR ......D:0038 | MNTISA ......D:000B | MODE ........D:000A |
| MOVFPH ......C:02F0 | MSNOK1 ......C:01CE | MSNOK2 ......C:031E |
| MSNOK3 ......C:041C | MSW_1 ......C:0618 | MV_FPH ......C:00B0 |
| NCRY1 ......C:00DF | NCRY2 ......C:039C | NCRY3 ......C:05B7 |
| NOT_11 ......C:07E7 | NOT_16 ......C:06D3 | NO_CNT ......C:03F3 |
| NO_DP ......C:0120 | NO_MSN ......C:0437 | NO_REQ ......C:0667 |
| NO_SSN ......C:042F | NT_MD3 ......C:065B | NUMRAL ......C:01E0 |
| N_ADD1 ......C:0160 | N_ASD ......C:05B8 | N_BKGD ......C:051E |
| N_BP11 ......C:0370 | N_BP12 ......C:03BC | N_BP21 ......C:0374 |
| N_BP22 ......C:03C1 | N_CNCL ......C:0395 | N_CNTS ......C:051C |
| N_DONE ......C:02E7 | N_DOS ......D:0070 | N_EVNT ......C:00E4 |
| N_ICON ......C:068B | N_INT3 ......C:03FB | N_PUSH ......C:035E |
| N_RAT ......D:0030 | N_RST1 ......C:037B | N_RST2 ......C:03C8 |
| N_RTAL ......C:05A8 | N_TARA ......C:0784 | N_TMO ......C:04CC |
| N_UPDT ......C:04DD | OVFLW? ......C:0457 | OVRNG ......C:0244 |
| O_DOS ......D:0060 | O_RAT ......D:0020 | PERIOD ......N:0005 |
| PRGOPT ......D:0044 | PRSNLY ......D:0041 | QUIT ........C:04C1 |
| RATDSP ......C:06EE | RAT_M ......D:0050 | RAT_T ......D:0024 |
| RD_86 ......C:0207 | REG_NO ......D:003C | RESET ......C:0000 |
| RM_NEW ......C:052D | RM_OLD ......C:0525 | RNO_11 ......C:07F5 |
| RSI_MN ......N:0002 | RTAL ........D:0004 | RTA_DS ......C:063B |
| RTCF ........X:0008 | RTN1 ........C:01B0 | RTN2 ........C:03D7 |
| RTN3 ........C:0385 | RTNPTR ......D:0068 | RTN_DT ......C:07A0 |
| RT_AL ......C:0594 | RT_COR ......C:0538 | RT_FIX ......C:06C5 |
| RT_TSK ......C:06AE | RXTGE1 ......C:0547 | RXT_OK ......C:0567 |
| R_EXP ......N:0004 | R_MNT ......N:0008 | SAMODE ......N:000C |
| SER_NO ......X:000E | SER_RD ......C:0231 | SER_WT ......C:0218 |
| SHFTD ......C:0084 | SHFTR ......C:0550 | SHFTU ......C:0088 |
| SIG3 ........C:02A5 | SIG_3 ......C:0273 | SI_N11 ......C:07AC |
| SI_N12 ......C:07BE | SKRCH ......D:0069 | SPCCHR ......C:01F0 |
| SRCHR ......D:003B | SRCH_F ......C:009B | SSNOK ......C:0426 |
| SSN_OK ......C:0327 | SUBDN1 ......C:02D1 | SUBDN2 ......C:055F |
| SUBDN3 ......C:058A | SUBDN4 ......C:05A1 | SWAP ........D:000C |
| SYNKRO ......C:03A3 | SYN_OK ......C:04EC | SY_NOW ......C:03A9 |
| S_PTRN ......C:009D | TARA ........D:0079 | TARA_1 ......C:05B3 |
| TB_EXP ......D:0041 | TB_MNT ......D:0042 | TC2MTH ......C:070C |
| TIME ........D:0010 | TIMER ......C:04B3 | TRT2FL ......C:02AB |
| T_CNT ......D:0049 | T_DSP ......D:0078 | UNISEG ......C:01EA |
| UNITS ......D:000E | UPDATE ......D:0045 | UP_LOD ......C:078E |
| U_RQST ......C:064D | WAIT1 ......C:03A4 | WAIT2 ......C:03D3 |
| WAIT3 ......C:04E5 | WAIT4 ......C:04F0 | WAIT5 ......C:0605 |
| WAIT6 ......C:0610 | WARBLE ......D:0003 | WRTDSP ......C:0109 |
| WTSPCL ......C:010B | WT_86 ......C:0217 | WT_DMT ......C:076B |
| ZERO ........C:0080 | ZER_DT ......X:0000 | Z_BEEP ......C:0653 |
| Z_CHK ......C:046B | | | tasm: Number of errors = 0

What is claimed is:

1. Portable dosimeter apparatus for measuring radiation dosage and dosage rates comprising:

a housing;

a battery detachably mounted within said housing;

a geiger tube mounted within said housing, said geiger tube causing geiger pulses to be generated at a rate determined by the levels of radiation to which said geiger tube is exposed;

processing circuitry within said housing coupled to said geiger tube, said processing circuitry including:

means for counting the number of geiger pulses generated by said geiger tube, and means for converting the number of geiger pulses thus counted into a quantitative measure of radiation dosage and radiation dosage rates;

display means mounted to said housing and coupled to said processing circuitry for displaying the quantitative measure of the radiation sensed by said geiger tube; and power supply means included within said housing for converting energy stored in said battery to electrical power suitable for operating said geiger tube, processing circuitry, and display means, said power supply means including:

a low voltage power supply circuit for converting energy stored in said battery to a prescribed low voltage suitable for powering said pulse counting circuit, said processing circuitry, and said display means, and a high voltage power supply circuit for converting said prescribed low voltage generated by said low voltage power supply circuit to a prescribed high voltage suitable for powering said geiger tube, said high voltage power supply circuit including:

ac voltage generating means for generating a first ac voltage and a second ac voltage from said prescribed low voltage generated by said low voltage power supply circuit, a transformer having a primary winding having first and second terminals, said first terminal being coupled to said first ac voltage and said second terminal being coupled to said second ac voltage, said transformer further having a second winding having a turns ratio relative to said primary winding of N, feedback control means coupled to said ac voltage generating means for comparing an output voltage generated by said high voltage power supply circuit to a reference voltage and for adjusting said first ac voltage in a way that causes said output voltage to be maintained at said prescribed high voltage; said feedback control means adjusting said first ac voltage such that the phase of the first ac voltage relative to the second ac voltage varies as a function of the comparison between said output voltage and said reference voltage, a voltage multiplier circuit coupled to said secondary winding for multiplying the voltage appearing at said secondary winding by a prescribed factor in order to generate said output voltage, and capacitive storage means for receiving said output voltage from said voltage multiplier circuit and providing said output voltage to said geiger tube.

2. The portable dosimeter apparatus as set forth in claim 1 wherein said means for counting the number of geiger pulses comprises a pulse counting circuit configured to count and store the number of geiger pulses generated by said geiger tube.

3. The portable dosimeter apparatus as set forth in claim 2 wherein said means for converting the number of geiger pulses into a quantitative measure of radiation dosage and radiation dosage rates comprises:

a microprocessor circuit coupled to said pulse counting circuit, and a memory circuit coupled to said microprocessor circuit, said memory circuit having a processing program stored therein for controlling a processing sequence carried out by said microprocessor circuit, said processing sequence causing said microprocessor circuit to convert the stored number of geiger pulses obtained from said pulse counting circuit to a measure of radiation dosage and radiation dosage rate.

4. The portable dosimeter apparatus as set forth in claim 3 further including high impedance communication port means within said housing for dielectrically coupling data signals to and from said microprocessor circuit.

5. The portable dosimeter apparatus as set forth in claim 3 wherein said microprocessor circuit operates at a low clock rate that promotes low power consumption, and said pulse counting circuit is configured to consume power only when counting a geiger pulse, the energy stored in said battery being able to continuously power said portable dosimeter for a period of at least 500 hours.

6. The portable dosimeter apparatus as set forth in claim 3 wherein said processing program is sufficiently compact to permit it to be stored in no more than 2 kbytes within said memory circuit.

7. The portable dosimeter apparatus as set forth in claim 1 wherein said ac voltage generating means includes first and second dual-input exclusive OR gates, each exclusive OR gate having an output terminal that outputs the first and second ac voltages respectively, and connects these voltages to the respective terminals of said primary winding, each exclusive OR gate further having an input terminal connected to receive a clock signal, the second exclusive OR gate having another input terminal connected to said prescribed low voltage, the first exclusive OR gate having another input terminal connected to said feedback control means, whereby said feedback control means controls the phase of the first ac voltage relative to the second ac voltage coupled to the respective terminal of the primary winding of said transformer.

8. The portable dosimeter apparatus as set forth in claim 1 wherein said prescribed low voltage comprises a voltage of approximately 5 volts, and said prescribed high voltage comprises a voltage of approximately 550 volts.

9. The portable dosimeter apparatus as set forth in claim 1 wherein said display means comprises a digital display circuit adapted to display at least a 3-digit floating point number with a multiplier symbol, said multiplier symbol comprising one of two symbols, a first symbol representing a "$\mu$" symbol, and a second symbol representing a "m" symbol, said $\mu$ and m symbols being displayable on a single digit display by selectively energizing two of three icons, a first icon comprising the top and middle leg of the "m", a second icon comprising the left and right legs of the "m", and a third icon comprising the bottom of the "$\mu$", whereby an "m" is displayed by energizing said first and second icons, and a "$\mu$" is displayed by energizing said second and third icons.

10. The portable dosimeter apparatus as set forth in claim 1 further including audible alarm means for generating an audible alarm in the event a selected one of said measure of radiation dosage or radiation dosage rate exceeds a preselected threshold.

11. The portable dosimeter apparatus as set forth in claim 10 wherein said alarm means is for further generating an audible alarm in the event said prescribed high voltage generated by said high voltage power supply circuit changes by more than a prescribed amount.

12. The portable dosimeter apparatus as set forth in claim 1 wherein said high voltage power supply circuit includes regulating means for regulating said prescribed high voltage to within $\pm 5\%$ of a specified high voltage.

13. The portable dosimeter apparatus as set forth in claim 1 wherein said display means includes a liquid crystal display (LCD) affixed to said housing, and an LCD driver circuit, said LCD driver circuit including means for driving selected portions of said LCD so that at least a three digit floating point number with automatic ranging through the units of either microRads, milliRads or Rads, or microRads/h, milliRads/h or Rads/h, may be selectively displayed.

14. The portable dosimeter apparatus as set forth in claim 13 wherein said LCD driving means is for further displaying respective symbols representing either a "$\mu$" or an "m" on the same location of said LCD, said $\mu$ and m symbols being displayable by through selective display of two of three icons, a first icon comprising the top and middle leg of the "m", a second icon comprising the left and right legs of the "m", and a third icon comprising the bottom of the "$\mu$", whereby an "m" is displayed by display of the first and second icons, and a "μ" is displayed by display of the second and third icons.

15. The portable dosimeter apparatus as set forth in claim 1 further including audible alarm means for generating an audible alarm in the event the radiation dosage or dosage rates exceed a prescribed threshold.

16. The portable dosimeter apparatus as set forth in claim 15 wherein said processing circuitry includes
   means for detecting at least two alarm conditions, a first alarm condition being indicated whenever the determined radiation dosage exceeds a preselected dosage threshold, and a second alarm condition being indicated whenever the determined radiation dosage rate exceeds a preselected dosage rate threshold;
   either of said first or second alarm conditions triggering said audible alarm;
   said first alarm condition also triggering a first visual alarm, displayed on said display means, indicating the occurrence of said first alarm condition; and
   said second alarm condition likewise triggering a second visual alarm, displayed on said display means, indicating the occurrence of said second alarm condition.

17. The portable dosimeter apparatus as set forth in claim 16 wherein said processing circuitry further includes means for detecting a low battery condition and signaling such condition on said display means.

18. The portable dosimeter apparatus as set forth in claim 1 wherein said battery comprises a battery having a voltage of approximately 1.5 volts.

* * * * *